United States Patent [19]

McKenna et al.

[11] Patent Number: 4,507,752
[45] Date of Patent: Mar. 26, 1985

[54] IN-PLACE INDEX COMPRESSION

[75] Inventors: John J. McKenna, Kingston; John M. Thompson, Lake Katrine, both of N.Y.

[73] Assignee: International Business Machines Corporation, Armonk, N.Y.

[21] Appl. No.: 468,815

[22] Filed: Feb. 22, 1983

[51] Int. Cl.³ .............................................. G06F 1/00
[52] U.S. Cl. ................................................. 364/900
[58] Field of Search ............................. 340/347 DD; 364/200 MS File, 900 MS File

[56] References Cited

U.S. PATENT DOCUMENTS 4,464,650  8/1984  Eastman et al. ............... 364/200 X Primary Examiner—Raulfe B. Zache
Attorney, Agent, or Firm—Edwin Lester

[57] ABSTRACT

The present invention provides in a data processing system storing a plurality of discrete entities, each identified by a single parameter within a monotonic parameter spectrum, resident at an addressable location and locatable by searching a system maintained hierarchical index mapping parameters onto location addresses, a method of compressing the index by the system, which method is interruptable to permit valid searching of the index and executes in a variable length ordered sequence of processing cycles, each comprising a variable length sequence of two part iterations, each iteration comprising the selective performance of each of an ordered fixed sequence of basic operations, wherein each full cycle initially operates on successive index levels in the direction opposite to that in which the index is searched while performing the first part of each iteration and thereafter operates on successive levels in the reverse direction performing the second part of each iteration, parameter relocation at a level being performed by duplicating a parameter at its target location in a first part of the iteration at that level and deleting the original presence of the parameter in the second part of that iteration.

37 Claims, 23 Drawing Figures

FIG.7
FIG.8
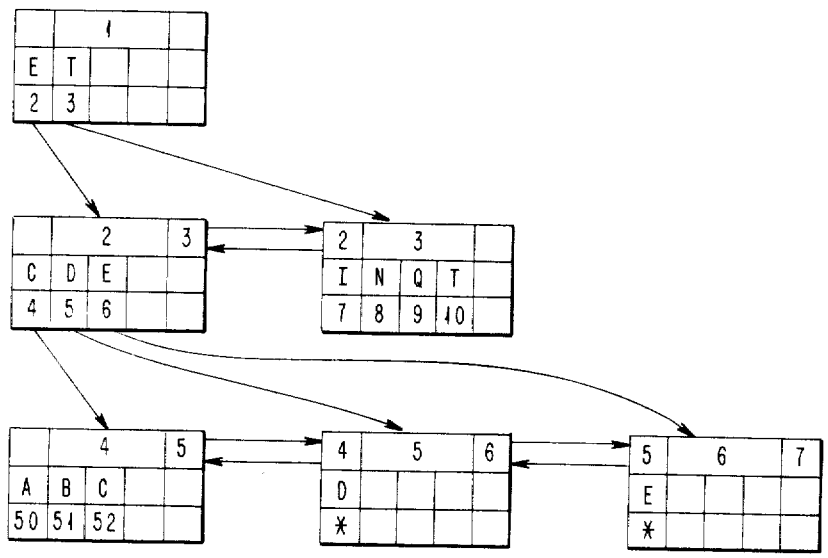
FIG.9
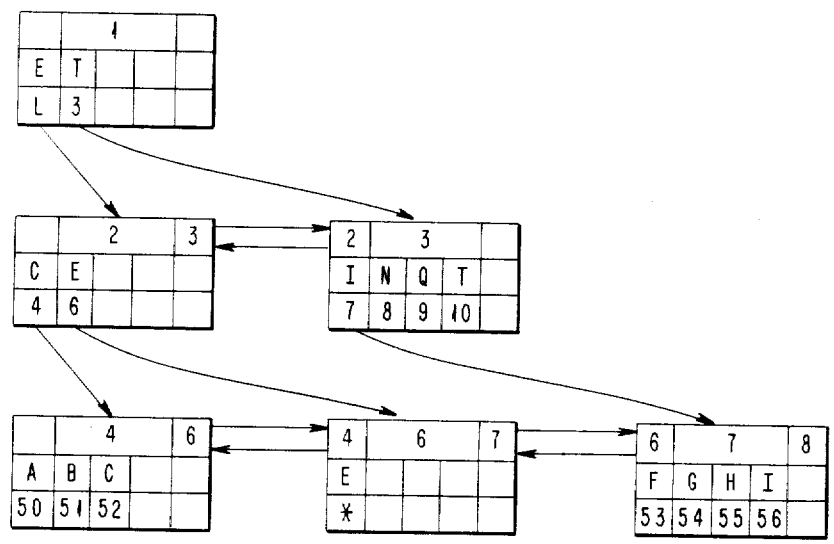
FIG.10

IN-PLACE INDEX COMPRESSION

The present invention relates to methods of upkeep of hierarchical indices in and by data processing systems with particular reference to the macro operations of compression, insertion and deletion.

BACKGROUND

It is normal for a data processing system to support many data entities or files called for by the potential user by identity whereas the data processing system needs to know the address, usually in peripheral storage, at which the data entity or at least the start of the data entity is stored. Since the system allocates storage, the system also maintains an index in which it records the addresses at which it has stored data entities in association with the identities of those data items. In other words, an index is a machine maintained mapping of data identity onto data location. The main function performed in relation to an index is searching and to speed searching, hierarchical indices are normal in systems of any appreciable capacity. In a hierarchical index, there are plural sequential levels of mapping extending from an entry level or apex to an exit level or base. Each level maps onto the next sequential level so that the extent of the next level requiring processing during a search is limited.

However, alteration of a hierarchical index is much more time consuming than is alteration of the equivalent single level index since, again in the worst case, an alteration, always at the base level, may propagate "upwards" through all the levels up to and including the apex. Conventionally, the index is not available for its main function—searching—while it is being updated and its integrity is not maintained, if it is not maintained updated. Further, updating by insertion and deletion tends to create a most irregular index structure, and it is the function of the upkeep macro operation—compression—to restore, periodically, the regularity of the index structure. Compression is the most time consuming of the upkeep operations. For examples of conventional hierarchical index upkeep operations, please refer to:

U.S. Pat. No. 3,643,226
U.S. Pat. No. 3,611,316
U.S. Pat. No. 3,916,316
U.S. Pat. No. 3,651,483
UK Pat. No. 1,336,817

Ideally we would like to provide a hierarchical index which can be searched while it is being updated. Although we have not succeeded in achieving this end in absolute terms, we have devised an index which can (a) be searched at virtually any point during compression of the index, (b) be updated by insertion or deletion at regularly ocurring break points during compression of the index and (c) accommodate compression restart at the point at which it was interrupted.

It is pointed out that an approach to these aims can be achieved by duplicating the index in such a way that one copy of the index is available for searching, insertion and deletion; while the other copy is being compressed, but this arrangement, apart from absorbing storage space, implies that neither copy is fully maintained.

In the case of the present invention, there is no duplication and the single index is, in terms, fully maintained.

SUMMARY OF THE INVENTION

From one aspect the present invention provides a method of maintaining said multi-level index by said system comprising the steps of executing a sequence of processing cycles wherein each cycle progresses through the index levels in a first and then a second direction, selectively performing at each level of the index, while performing a processing cycle in said first direction, a first subset of basic operation iterations, including basic operations for duplicating the presence of an original parameter, and selectively performing at each level of the index, while performing a processing cycle in said second direction, a second subset of basic operation iterations including basic operations for deleting the original presence of said duplicated parameter.

From another aspect, the present monitor provides a method of compressing said index by said system, by the execution of a variable length ordered sequence of processing cycles, each said cycle comprising a variable length sequence of basic operation iterations, each said iteration comprising the selective performance of basic operations of a first subset and a non-overlapping second subset of said basic operations of an ordered fixed sequence of said basic operations, wherein each said full cycle progresses through all said index levels, in a first direction, performing said first subset of basic operation iterations and subsequently, in a second direction, performing a said second subset of said basic operation iterations, basic operations in said first subset duplicating the presence of an original parameter, basic operations in the said second subset deleting the original presence of the said duplicated parameter.

If in addition, in the compression method, the permitted iterations are defined by an action vector table, each vector having a vector element corresponding to each basic operation, arranged in sequence order, effective in relation to the contents of the moveable operating window in the index spanning three logically adjacent blocks at one index level together with the blocks containing the parent entries of the aforesaid three blocks, the current action vector selection being determined by the contents of the current window, it is possible to resume compression automatically from the point at which it was interrupted.

As far as interruption of compression for insertion or deletion is concerned, this has to be restricted to those points in the compression process at which the processing is at rest at the base level between cycles of compression.

A preferred embodiment of the present invention will now be described twice, firstly in general functional terms with reference to the accompanying drawings and, thereafter, insofar as the main compression operation is concerned, in more detailed and specific terms.

BRIEF DESCRIPTION OF THE DRAWINGS

In the drawings,

FIGS. 7 and 8 are sequential diagrams illustrating the deletion of entries from an index;

FIGS. 9 to 22 are sequential diagrams illustrating the manner of compression processing of the dislocated index of FIG. 2.

FUNCTIONAL DESCRIPTION OF A PREFERRED EMBODIMENT

In order to simplify the description, certain assumptions have been adopted which assumptions are not limitations imposed upon the invention. The assumptions are as follows:

(a) the environmental data processing system includes a processor, working storage, bulk storage organized into an addressable fixed length block format, the capability of reading addressed records into working storage and of writing records from working storage back into bulk storage and an operating system capable of calling program routines for execution and of accessing control blocks and stored control tables;

(b) the internal format of a block forming an element of an index comprises a header defining the block together with a forward pointer and a backward pointer, each being the address of a logically adjacent block, the header being followed by data fields;

(c) the operating system can establish, on demand, a stack or chain of blocks by appropriate writing of the backward pointer of each block allotted to the chain (N.B. This means that the same pointer acts as a forward pointer in the chain but as a backward pointer in the index);

(d) data files comprise chains of records addressed in terms of leading record of the chain, the address being in bulk storage, the addresses being finite in number and representable by a fixed length binary field;

(e) data files are identified by keys, a key being a unique number in a spectrum of numbers varying from, in theory, zero to a maximum finite value representable by a fixed length binary field. This maximum finite value, all ones or 'FF', serves the specific function of eliminating searching at a level, is not used as a true key and is denoted "T" herein;

(f) the index block size is such that it will accommodate five record address fields and five record key fields (Since the number of fields used does not affect the processes under the invention, the more detailed second description, to follow, is preferred in terms of three record address fields and three record key fields); and (g) a lower key is entered to the left of a higher key and the base level is written into working storage at the bottom and the succeeding levels progressively upwardly.

Figure 1:
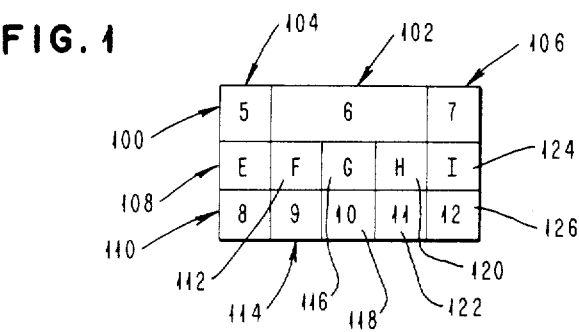
FIG. 1 is a diagram of an index block.

However, for the purposes o the following description, keys will be represented by A, B, C . . . , A less than B less than C, the index blocks will be numbered 1, 2, 3 and the backward and forward pointers and addresses will be represented by the number of the target block. Thus, referring to FIG. 1, a typical block forming part of the index and disclosed in more detail in the second description comprises a header 100 including a block identity 102 which is notional in that it is easier to describe assuming the header to include this identity, 6 in this case, although it will not be so marked as the system does not require this information, a backward pointer 104, to record 5 in this case, a forward pointer 106, to record 7 in this case, and five paired fields 108; 110; 112; 114; 116; 118; 120; 122; and 124; 126. Field 108, 112, 116, 120 and 124 are key fields, in this case E, F, G, H and I and fields 110, 114, 118, 122 and 126 are address fields pointing to records, in this case to records 8, 9, 10, 11 and 12 respectively. Thus, key E is associated with record 8, key F with record 9, and so on. In all save the base level of the index, the address fields will point to blocks in the index while, in the base level of the index, the address fields will point to records in bulk storage.

Figure 2:
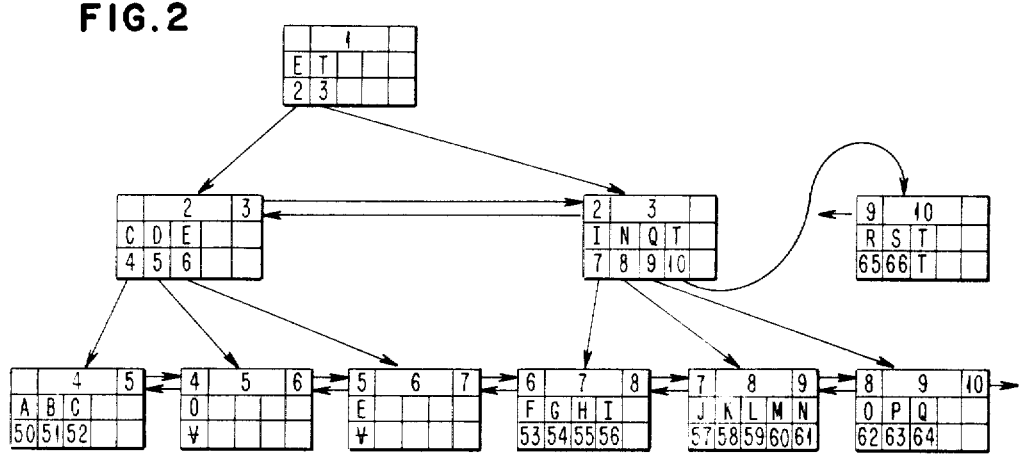
FIG. 2 is a diagram of a very simple dislocated index.

Referring to FIG. 2, it will be seen that, after many insertions and deletions, the logical form of the index may occupy more levels and more blocks that are theoretically required. The particular index illustrated comprises three levels, an apex level consisting of block 1, a second level consisting of blocks 2 and 3 and a base level consisting of blocks 4 to 10 and locates data files identified by keys A to C and F to T. Data files identified by keys D and E have been deleted that, as removal of their keys from the index would leave empty blocks, the keys remain but are marked "deleted" as indicated by * in the corresponding address fields. The initial records of data files A to C and F to T are respectively records 50 to 66 in bulk storage. Key T, the terminator, has no bulk storage address as it is never used to identify a data file and is shown associated with record address field T mostly to make it clear, in the drawings, that it differs fundamentally from the other keys A to S. The index blocks at each level are chained within that level by the backward and forward pointers as shown and re-emphasized by the arrows, through, obviously, as block 1 at the apex level is unique, in this case, there is no other block to which to chain it. It will be seen that the highest key in block 4, the lowest or left-most block in the base level, is C and this key forms the lowest or left-most entry in the lowest or left-most block 2 in the second level and is associated with an address field pointing to block 4 and re-emphasized by an arrow. The highest key in block 2 is E and this forms the lowest or left-most entry in the lowest (here unique) block 1 at the apex level and is associated with an address field pointing to block 2 and re-emphasized by an arrow, even though data file E has been deleted. Thus it will be appreciated that the apex level in this index maps the key space A to T onto the two blocks 2 and 3 at the second level, A to E onto block 2 and F to T onto block 3. Block 2 maps the partial key space A to E onto blocks 4, 5 and 6 at the base level, A to C onto block 4, D onto block 5 and E onto block 6, while block 3 maps the remaining key space F to T onto blocks 7 to 10 at the base level, F to I onto block 7, J to N onto block 8, O to Q onto block 9 and R to T onto block 10. The base level maps the total keyspace onto bulk storage.

The prime use of the index is searching and with the index as shown, searching is conventional. Suppose the address 55 of the data file known by key H is required, the system presents H to the index. H is compared with the lowest or left-most key in the apex level and if it is greater than that key, it is compared with the next key in ascending order until it compares equal to or less than. Because the terminator key T is used at each level, at least a compare less than must always be attained. As soon as the presented key H compares equal to or less than, as it will in this case with the terminator T, searching is transferred to the block at the second level to which the address 3 associated with the key T points. The new block is searched in exactly the same way, and, in this case, a compare equal to or less than will be obtained for the first entry I therein and searching is again transferred downwardly to the next lower level, in this case to block 7, which is the base level. When searching record 7 has reached the third entry, compare equal to or less than will be obtained and, because searching is at the base level, searching terminates. Since H is in the index, which need not be so for insertion as will become apparent later, a compare equal will be obtained, i.e., a HIT and the associated address 55 is read out.

Figure 3:
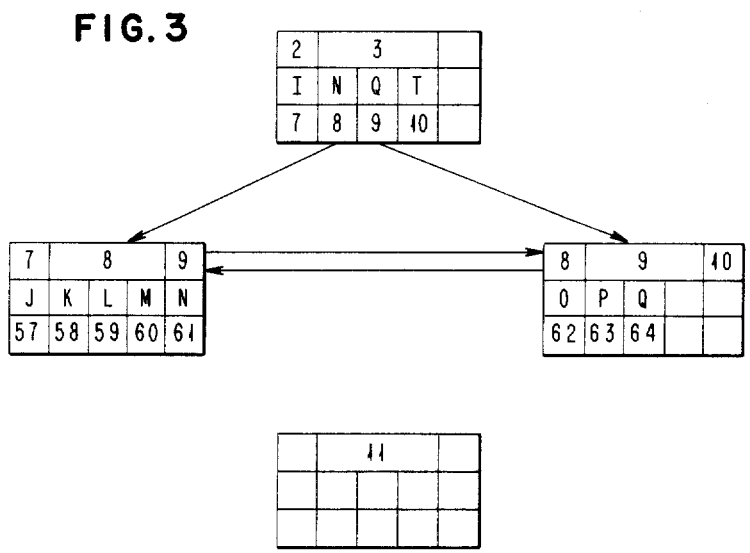
FIGS. 3 to 6 are sequential diagrams illustrating the insertion of entries into an index.
Figure 4:
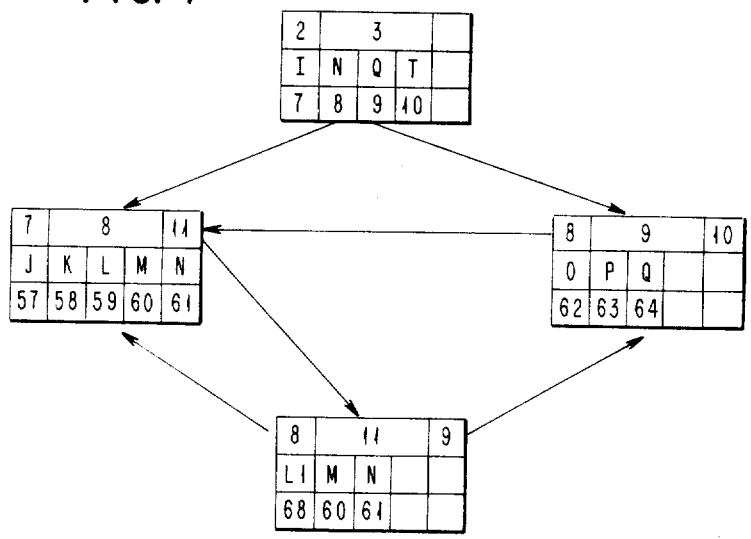
Figure 5:
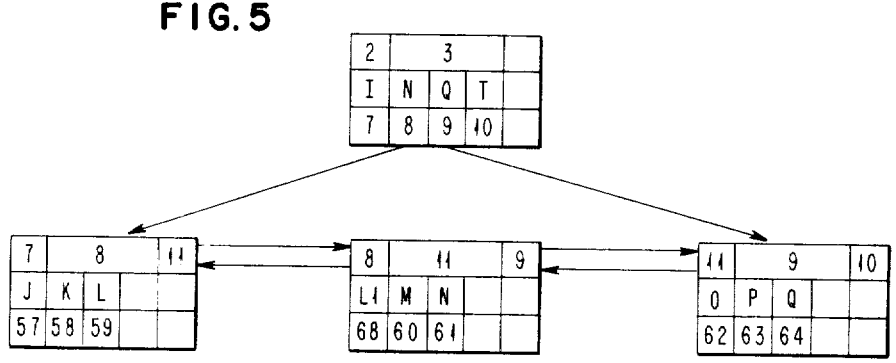
Figure 6:
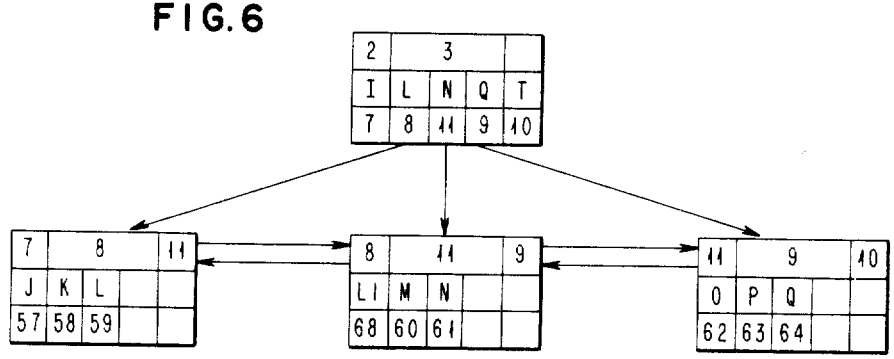

Assume a new data file is generated, it will be necessary to insert a corresponding entry into the index. If the new data file is identified by key C1, C less than C1 less than D, the index is searched as described above, producing a miss on D in base level block 5. Record 5 is not full and C1 displaces entry D to the right in block 5, the corresponding bulk storage address being written into block 5. No other changes are required. However, suppose the key of the new record is L1, L less than L1 less than M, compare equal to or less than will be obtained for key M in block 8 at the base level. In this case, a new block is required to be inserted in the index. The new record will be obtained from a so called "free-chain" or stack of blocks and more will be said about this later. Assume the new block is block 11 and is, by definition, empty. Consider FIG. 3, which shows a subsection of FIG. 2 including blocks 3, 8 and 9 only, together with the totally disassociated empty block 11. The first step is to copy M; 60, N; 61 into the next two slots in block 11 and to write the backward and forward pointers in block 11 to be 8 and 9 respectively. L1 and its associated address, say 68, is written into the first slot in block 11 displacing entries M; 60, N; 61. The next step, is to change the forward pointer in block 8 to point to block 11, removing entries M, 60, N; 61 from block 8, producing a state of affairs representable by FIG. 4. This is followed by changing the backward pointer in block 9 to point to block 11 producing a state of affairs representable by FIG. 5. The next step is to adjust the second level to match the changes made at the base level and, since block 3 is not full, no further new blocks are required. If block 3 had been full, it would also have needed to be split. However, all that is required in this case is to rewrite block 3 to the form shown in FIG. 6.

The only time during the insertion operation that the index is vulnerable to loss of data is at the end of the first step and then the loss is merely loss of the entry being inserted. Since the insertion is not complete, the new entry is perforce recorded elsewhere in the working registers of the system as is conventional and the operation can be restarted. Once the second step is completed, the index is no longer vulnerable, thanks to the forward pointer structure and the search convention.

Deletion is merely a function of changing entries, the index structure itself not being adjusted. Supposing the L1 entry, just inserted, is to be deleted, only block 11 will be changed to the form shown in FIG. 7 by shifting entries M, 60, N; 61 to the left. If the N entry were then to be deleted, it would be marked deleted since it is the highest key in block 11 so that block 11 alone is adjusted to the form shown in FIG. 8.

The previously described insertion and deletion operations will indicate how rapidly a segmented index structure, such as that shown in FIG. 2, can be reached. It is thus most important to be able to compress the index to return it to its minimal form and this operation will now be considered in some detail starting from the form of the index shown in FIG. 2.

However, it is appropriate to comment on the free chain blocks. Most data processing systems do not create blocks singly. The operation would be exceedingly wasteful. When one block has to be created, a plurality of such blocks are created in a form which is already chained together by pointers. The present arrangements postulate such a chain to have been created, the leading block of this so called free-chain being pointed to by a pointer in a control block. For a process to obtain a fresh block, all that is required is for a number of pointers to be rewritten. The forward pointer in the control block will be rewritten to point to the next but one block in the free chain. The incorporation of the block thus removed from the free chain into the index already having been described. Blocks are added to the head of the free chain by compression processes, as will be described, an it can be said that the free chain is a by-product of compression.

Compression is performed in working storage directly on the index. No copies are made. A slice of the index is transferred to working storage, the slice containing the three leftmost blocks at each level of the index where such exist. In the present example, there is only one apex block and two blocks in the second level so that the slice will contain blocks 1, 2, 3, 4, 5 and 6. In addition, the process will have access to two control blocks, one containing the index profile and the other the index status and three fixed control tables, respectively, a progress vector table, a condition vector table and an action vector table. The control blocks and tables are all detailed in the second description and only the salient points of each of these will be referred to in this initial description. The index profile will point to the leading free chain block and also to the leftmost apex block, which, in this case, is the lone block 1. The index status control block will point to the index profile address in working storage and to its bulk storage location.

Compression is an iterative process that sweeps across the index from left to right, i.e., from low key to high key, in a series of cycles, each of which starts and finishes at the base level and operates on each of the levels in turn both on the way up and on the way back down again. From a given starting point at the base level, a cycle is started which ascends level by level to the apex level and then returns, level by level back to the base level. It is not necessary that any work be done at any level, but if useful work can be done at a level, it is performed. A cycle which performs no work, causes the starting point to be moved. The determination as to whether or not useful work can be done is made by generating a progress vector from the contents of the index at the level and position under consideration, so that the process is self controlling. However, greater efficiency can be obtained by adding constraints to the process which constraints are specified in the second description, the main one of which that matters for present purposes being a limitation of further processing at a higher level in such a way as to delay further processing for as long as possible in order to maximize the changes made in one processing cycle rather then have the corresponding changes spread over a number of cycles. This limitation is invoked in the first cycle to be detailed hereinafter and will be specified at its first occurrence. Further, the operations that can be performed at any level in any cycle are the same, although not all of the operations are required and those operations that are not required are not performed. The operations must be performed in a fixed sequential order, the leading operations in the sequential order being performed on the upward extent of the cycle and the remaining operations on the return or downwards extent of the cycle. In other words, assuming useful work could be performed at all three levels of the index shown in FIG. 2, from some starting position, the appropriate ones of the leading operations in the sequential order will be performed on the base level, followed by the second level, and finally on the apex level, whereafter the remaining appropriate operations will be performed on the apex level, followed by the second level and finally the base level again.

There are eight operations which, were they all to be performed, would have to be performed in the following order:

(1) SFT: shift, by copying only, as many entries as possible, both keys and addresses, to the left from one block to the next previous block. Clearly, the number of entries that can be shifted is subject to a double limit, the spare capacity of the lefthand block of the pair and the number of the valid entries in the righthand block of the pair. The lower limit applies.

(2) UNC: rewrite the forward pointer of the lefthand block of the pair to point, not to the next righthand block but to the next but one righthand block.

(3) UPP: rewrite the free-chain pointer in the index profile to point to the righthand block of the pair and save the old value of that pointer.

(4) UPF: rewrite the backward pointer in the righthand block of the pair to point to the old leading free chain block so that the righthand block now becomes the new leading free chain block.

(5) UPB: write new entries into the next higher index level to show the changes just made to the lower level.

(6) DEL: remove from the next higher level the entry which pointed at a block just transferred to the free-chain.

(7) UNB: rewrite the backward pointer in the next but one right hand block to point to the left hand block.

(8) REM: remove the entries from the right hand block that were shifted into the left hand block by copying in operation SFT.

It is pointed out that although the form to which a block is to be altered is compiled in the manner started, the actual rewriting of the block is delayed to the end of compilation. UPB and DEL are operations determined by vectors generated at one level but effective on the next higher level. Progress determination at the next higher level must take UPB and DEL into account so that UPB and DEL belong to the outward half of the cycle and, in a sense, belonging to processing at two levels provided the point at which a cycle extends. UNB and REM are alternatives. UNB finally disconnects a block from the index so that REM is unnecessary if UNB is called for.

Thus an action vector is an eight element vector, the state of each element determining whether or not the corresponding operation SFT, UNC, UPP, UPF, UPB, DEL, UNB, REM is to be performed for this level in the cycle. The action vector table contains a set of action vectors and depending on the progress and/or condition vector generated, one action vector is accessed from the action vector table and controls the operations to be performed.

The progress and condition vectors are generated from the contents of the blocks forming two adjacent levels of the slice, the three adjacent blocks, if they exist, at the level at which the cycle is operating and the three adjacent blocks, if they exist, at the next higher level, of which, the left hand block must be the parent, i.e., must point to, the left hand block of the slice at the operating level of the cycle. The terminology, parent and child is useful. It is also useful to regard the middle block of the slice at the cycle operating level as the source block, it being the source of the left shifted entries, if any, the left most block being the index block.

A progress vector is a six element vector, an element taking the values 1 or 0 depending on the truth or otherwise of the following statements:

(i) the number of blocks in the slice at the current level is 3;

(ii) the number of blocks in the slice at the current level is 2 or 3;

(iii) the source block is empty;

(iv) the index block is full;

(v) supply exceeds demand: there are more entries in the source block than there are free slots in the index block;

(vi) the current level is the apex level.

The progress vector table is an association table searched by the generated progress vector and producing either an address to the action vector table or a signal to the system to relocate the slice to the next right most position.

A condition vector is a seven element vector, an element taking the value of 1 or 0 depending on the truth or otherwise of the following statements:

(i) the number of blocks in the slice at the current level is 3;

(ii) the number of blocks in the slice at the current level is 2 or 3;

(iii) the key in the parent block of the index block which points to the index block is not less than the highest key in the index block;

(iv) the highest key in the index block is less than the lowest key in middle, or potential source block, at the current level of the slice;

(v) the forward pointer in the index block equals the address pointer of the parent of the source block directed at the source block;

(vi) the pointer to the leading free-chain block in the index profile does not equal the address pointer of the parent of the source block directed at the source block;

(vii) the backward pointer of the source block equals the address pointer of the parent of the index block directed at the index block.

The condition vector table is an associative table searched by the generated condition vector producing an address to the action vector table or an indication that the progress vector is to be used to control processing. The condition vectors also control recovery from compression interruption.

All three kinds of vectors are described in much greater detail in the second description. It is sufficient for present purposes to note that both progress and condition vectors can be generated solely from the contents of what can be regarded as an operating window in the current slice or plane of the index and, since movement of the window and slice as well as selection of action vectors depend solely on the progress and condition vectors generated, together with any assumed limitations, the process of compression is self controlling. This is most important when it comes to considering recovery from interruption of the compression process. Interrupt of the compression process for valid searching is possible because of the orderly pattern of the compression cycles, the pointer structure and the order in which the operations determined by the action vectors are executed. Since the upward phase of a cycle only adds to the index and nothing material is deleted until the additions have been made, it is always possible to trace a valid route through the index from apex to base.

FIG. 10 shows the effective initial slice for starting compression of the index when currently in the form shown in FIG. 2. The condition, progress and action tables are detailed in the second description and the presently assumed limitation, of the various possible limitations also detailed in the second description, is that a compression cycle progresses to a higher level if and only if the parent entry pointing to the index block is the rightmost entry in the parent block.

The progress vector generated from the window in its initial position containing blocks 2, 3, 4, 5 and 6 is [1 1 1 0 0 0] which points at action vector 18 [0 1 1 1 0 1 1 0]=[SFT, UNC, UPP, UPF, UPB, DEL, UNB, REM] which means that of the possible eight operations available, only the second, third, fourth, sixth and seventh are to be performed. The second, third and fourth operations change pointers to a state at which block 5 appears to belong to the free chain as viewed by the index profile and block 4 but still belongs to the index as viewed by blocks 2 and 6. The sixth operation is effective on the second level and, but for the limitation would enable extension of the processing cycle to the second level to be investigated. However, even with D, 5 deleted from block 2 and E6 left shifted in response to the sixth operation, the parent entry C, 4 of the index block 4 at the base level is not the right most entry in block 2, the parent block of the index block, so that the cycle is blocked from further processing at this level and is similarly blocked at the apex level. Thus the cycle returns, executing the remaining seventh operation which rewrites the backward pointer in block 6 to point to block 4 so that block 5 now belongs solely to the free chain, from whichever point it is viewed.

Figure 11:
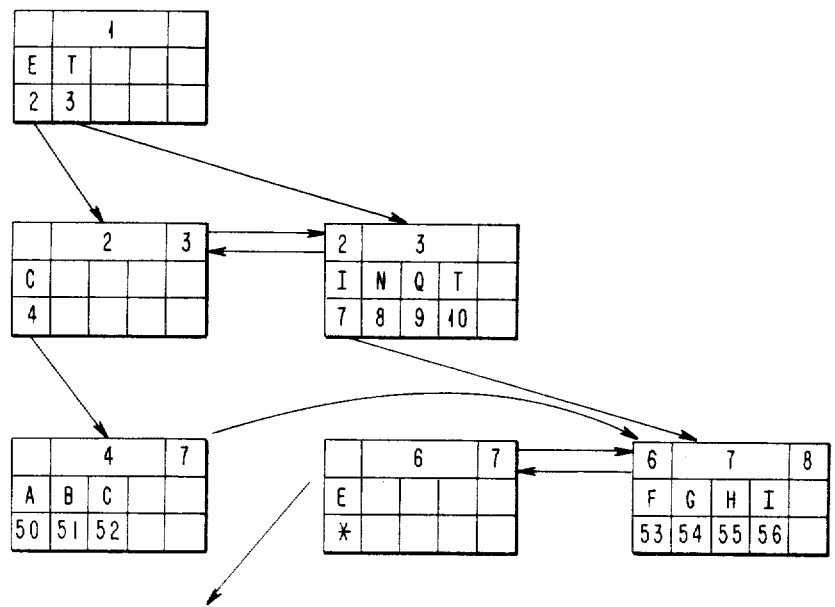

The first cycle is complete and has removed block 5 from the index and, hence, from the slice. Block 7 is now moved into the slice and the second processing cycle can be investigated as shown in FIG. 11. The progress and action vectors generated are exactly the same as those generated for the first processing cycle as would be expected since the portions of the slice considered are the same. However, when DEL is executed, the non-extension limitation no longer applies since with both entries D,5; E,6 in record 2 deleted, entry C,4 is now the rightmost entry in block 2 and further processing is no longer blocked. The window is moved up a level and now contains only blocks 1, 2, and 3, block 2 being the index block so that the generated progress vector becomes [0 1 0 0 0 0] pointing at action vector 22 [1 1 1 1 1 1 0 0]=[SET, UNC, UPP, UPF, UPB, DEL, UNB, REM].

Figure 12:
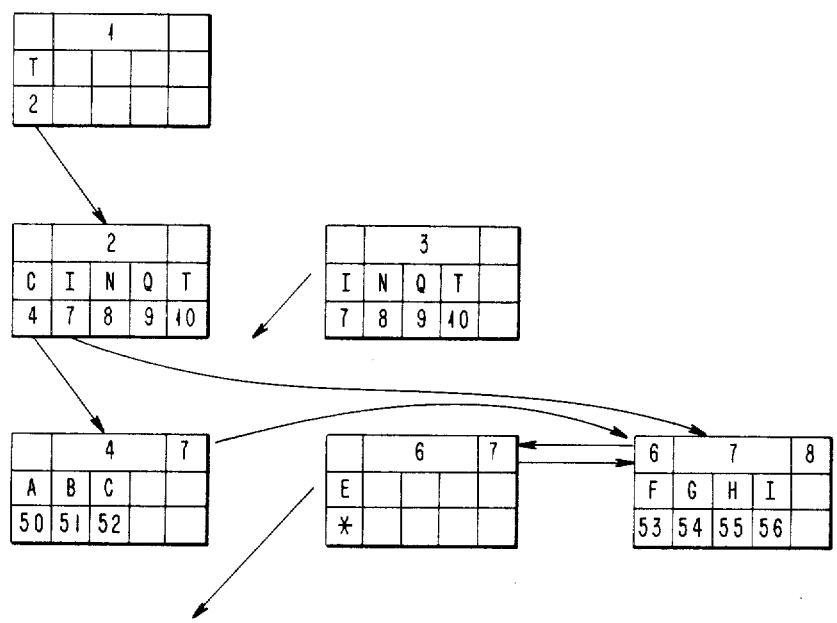

This set of operations will copy all the contents of block 3 into block 2 and transfer block 3 to the free chain. However, it also produces an index structure which is called a null apex situation shown in FIG. 12, for which block 1 is wholly redundant and is removed to the free chain, reducing the index levels from 3 to 2, block 2 now becoming the leftmost apex block. Thus, the profile now points to block 1 as the leading free chain block and block 2 as the leftmost apex block. Block 1 points to block 3 which points to block 6, all in the free chain. The removal of blocks 1 and 3 to the free chain take place before the final operation at the base level (UNB, rewriting the backward pointer in block 7 from 6 to 4) is performed completing the cycle.

Figure 13:
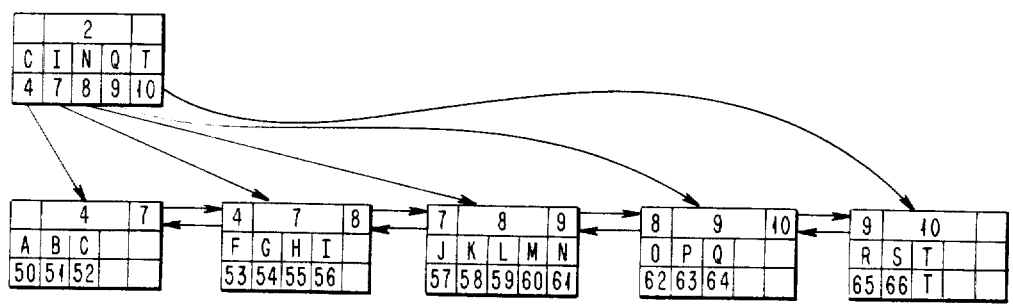
Figure 14:
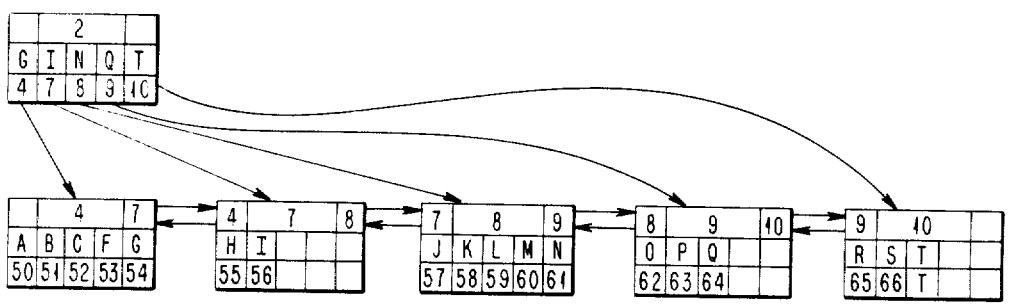
Figure 15:
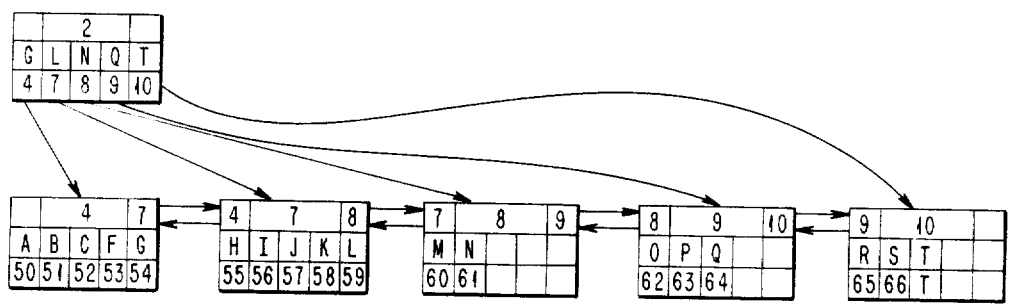

The picture of the index is now shown in FIG. 13, with blocks 2, 4, 7 and 8 in the current window. The ensuing processing cycles follow a basic pattern of copying entries to the left as and when possible, recording the changes in block 2 and deleting the copied entries from the base level. Thus, for example, the progress vector for the first cycle generated from the window containing blocks 2, 4, 7, 8 is [1 1 0 0 1 0] accessing action vector 19 which is [1 0 0 0 1 0 0 1] specifying, as expected [SFT, UPB, REM] producing an index state as shown in FIG. 14. On generating a progress vector for the same window, vector [1 1 0 1 0 0] is obtained which specifies that the window should be moved to contain blocks 2, 7, 8, 9. The next progress vector generated is [1 1 0 0 1 0] producing action vector [1 0 0 0 1 0 0 1] specifying a processing cycle which is exactly the same as the previous full processing cycle producing an index state as shown in FIG. 15. Now again a progress vector [1 1 0 1 0 0] is obtained moving the window to contain blocks 2, 8, 9 10. The next processing cycle will be different since supply no longer exceeds demand and block 9 will become redundant since all of its entries can be transferred to block 8. The progress vector generated is [1 1 0 0 0 0] accessing action vector 20 which is [1 1 1 1 1 1 1 0], and since it is the last true processing cycle of the whole compressing operation, it will be traced out in full with reference to FIGS. 16 to 22, which are restricted to showing only the contents of the window, 1G, containing blocks 2, 8, 9 and 10.

Figure 16:
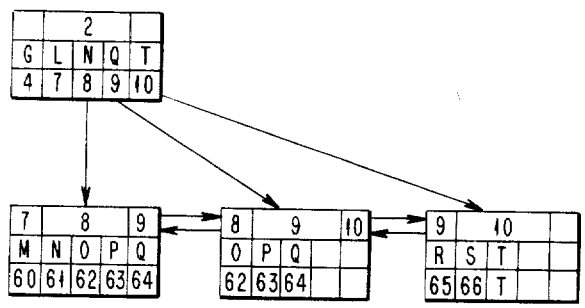

The specified operations, in order are:

SFT producing an index window state as shown in FIG. 16

Figure 17:
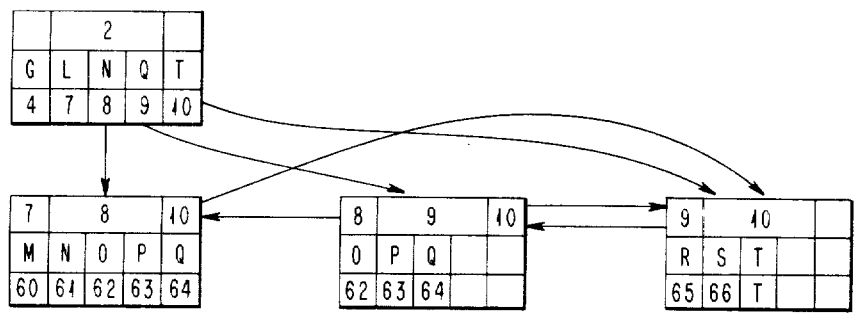

UNC producing an index window state as shown in FIG. 17

UPP producing a profile change which is not shown

Figure 18:
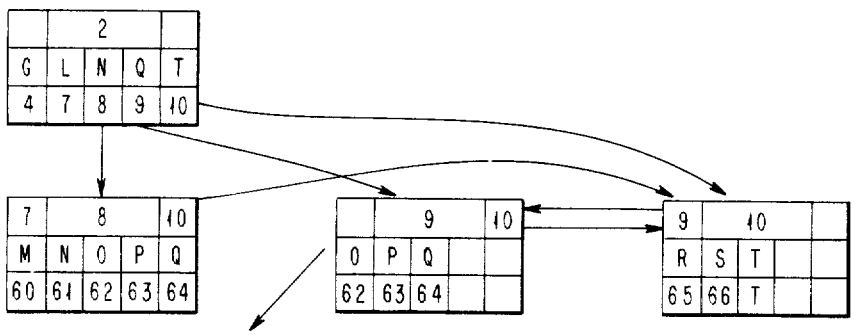

UPF producing an index window state as shown in FIG. 18

Figure 19:
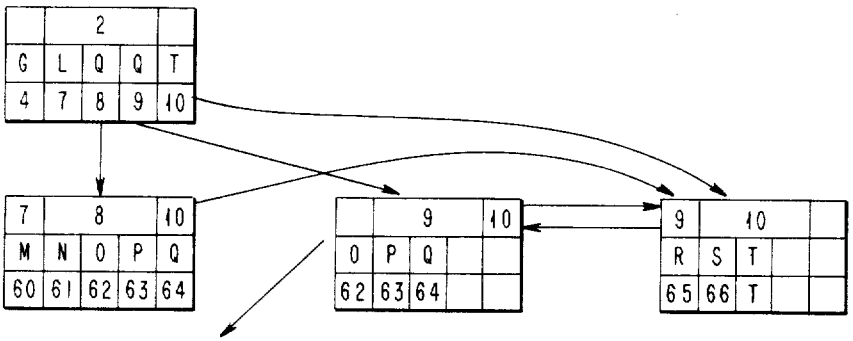

UPB producing an index window state as shown in FIG. 19

Figure 20:
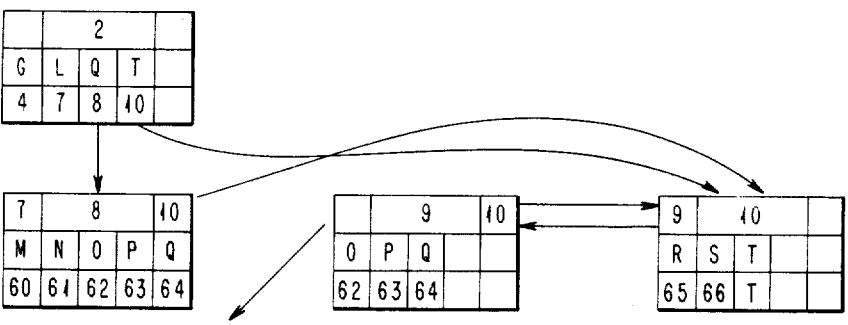

DEL producing an index window state as shown in FIG. 20

Figure 21:
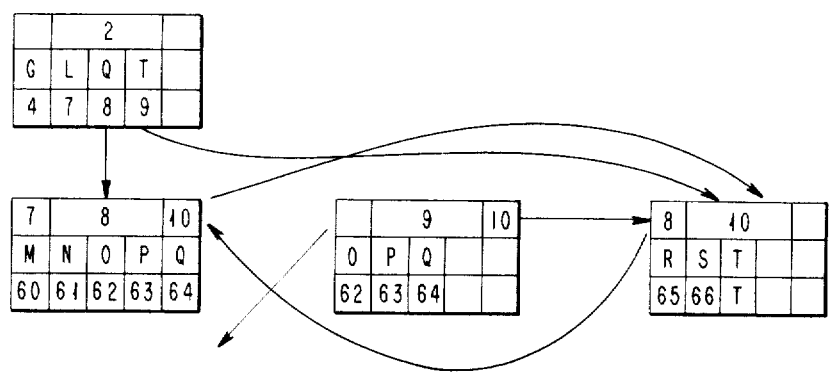
Figure 22:
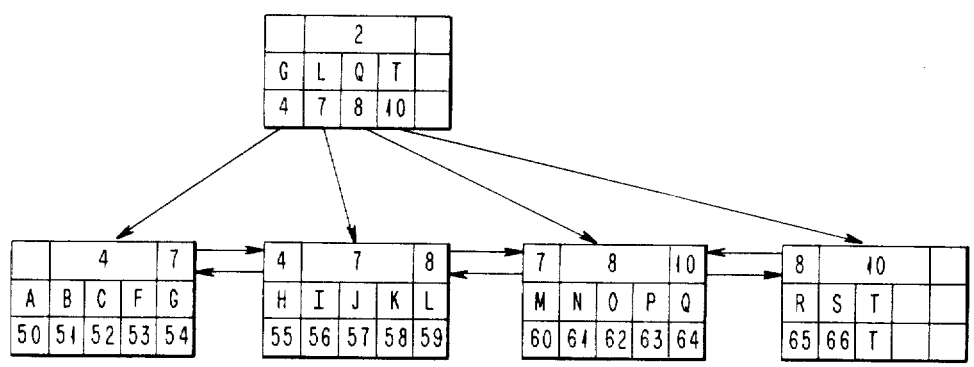

UNB producing an index window state as shown in FIG. 21

REM is not performed as block 9 is now wholly removed from the index into the free chain.

At the end of this processing cycle, the generated progress vector will be [0 1 0 1 1 0] which requires the window to be moved. The new window contains blocks 2, 8 and 11 generating a progress vector [0 1 0 1 0 0] again requiring the window to be moved. Since the moved window will contain only blocks 2 and 10, the next generated progress vector will be [0 0 ө ө ө ө] where only the first two elements have any realistic meaning though the remaining elements are defaulted to zero and signal that the compression process is complete, leaving the index in the state shown in FIG. 22.

Since one of the prime objectives of the present arrangement is to be able to interrupt compression at any point in the process in order to perform a valid index search, it will be appreciated that tenacity of access to blocks until the very last moment is a key factor in achieving the objective. In more general terms, the factor can be stated to comprise, within any processing cycle, however many times extended, all copying and linking in of blocks is completed before any deletion and unlinking is performed due to the strict order of effective execution of a finite set of possible operations at each level of processing within a processing cycle and the restriction of the performance of operations in the latter part of the order exclusively to the return extent of the cycle.

The same mechanism that controls the cycles, also enables the compression process to be restarted at the point at which it was stopped. The full details are provided in the second description so that it will be sufficient for present purposes to outline the restart process and to provide a few examples.

If one turns to FIG. 2 and the initial window location illustrated in FIG. 10 and containing blocks 2, 3, 4, 5 and 6 and generates a condition vector, one would obtain [1 1 1 1 1 1 1] which, if used to access an action vector would access the action vector [0 0 0 0 0 0 0 0], indicating, in effect, that no interrupted processing cycle traverses this window and no operations need to be performed to restart a processing cycle, at least from this window position.

Figure 23:
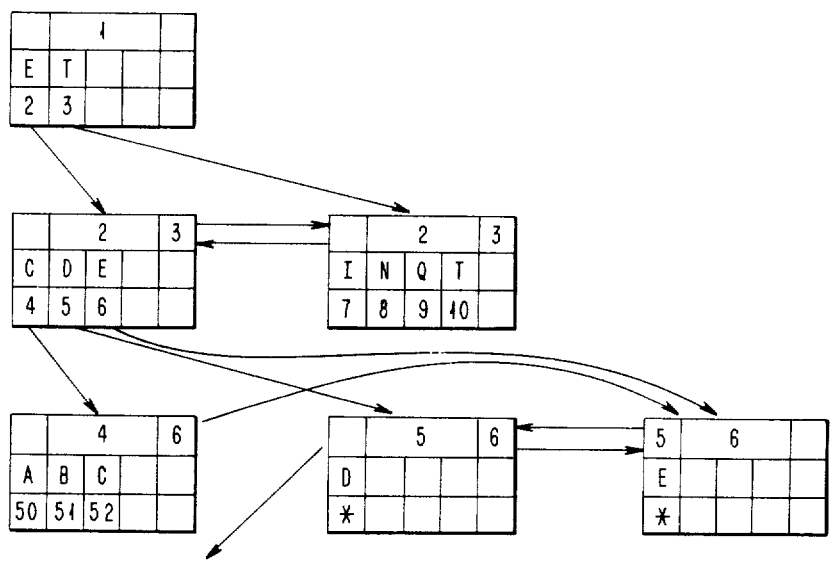
FIG. 23 is a diagram illustrating the condition of a slice of the index of FIG. 2 traversed by an interrupted processing cycle.

The action vector which started the described processing cycle from this window position was [0 1 1 1 0 1 1 0] and, supposing processing had been interrupted after execution of the fourth vector element UPF, the window would have the configuration illustrated in FIG. 23. If a condition vector were generated from this form of window it would be [1 1 1 1 0 0 0] which would access the action vector [0 0 0 0 0 1 1 0]. Execution of this action vector would return the window state illustrated in FIG. 22 to that illustrated in FIG. 11 which is exactly what would have happened, had the original action vector not been interrupted. This applied to any level which is affected by an interruption.

Remembering that the progress vector generated at the base level essentially indicates an effective compression can start at this point or that it cannot and the starting point should be moved to the right, it will be appreciated that an interrupted compression process can be resumed by tracing the progress and condition vectors until the highest action invoking condition vector is generated. This condition vector determines the position, level and action required on resumption. The assumption has been made that compression interruption was made for searching purposes, searching not changing the index. If interruption is made for insertion or deletion, the compression process is interrupted only between cycles at the base level. Insertion or deletion may dislocate the index in an area already theoretically compressed so the resumption technique may be different. Compression could be restarted at the beginning, i.e., at the left had end of the base level of the index or the place at which compression was halted could be logged in a control block or elsewhere to demark the point of resumption.

SECOND DESCRIPTION OF THE COMPRESSION PROCESS OF THE EMBODIMENT

The following description which also relates to the same embodiment of the invention makes no reference to the preceding drawings but incorporates state definition tables and vector tables in the body of the description.

1. Introduction

The embodiment detailed in this second description differs from that previously described only in that each directory block is assumed to have three slots rather than five slots, i.e., the capacity to hold only three key fields and three address fields. This reduced assumption simplifies the description and emphasizes that the compression process does not depend on the number of slots in a directory block.

2. State Variables

DEFINE

| | |
|---|---|
| n | :: The number of hierarchical levels of an index |
| i | :: A generalized hierarchical index level, such that $<= i <= n$ |
| x(i) | :: The entry at the current position in the collating key sequence of the index on index level (i) |
| y(i) | :: The first index entry forward of x(i) on index level (i) |
| z(i) | :: The first index entry forward of y(i) on index level (i) |
| w(i) | :: A generalized member of the set ( x(i),y(i),z(i) ) |
| X(i) | :: The index block at the current position in the index hierarchy on level (i) - identically, the index block containing x(i) |
| Y(i) | :: The first index block forward of X(i) on index level (i) |
| Z(i) | :: The first index block forward of Y(i) on index level (i) |
| W(i) | :: A generalized member of the set ( X(i),Y(i),Z(i) ) |
| OL(W(i)) | :: The offset of the highest key entry in W(i) |

State Variables and Their Relationships

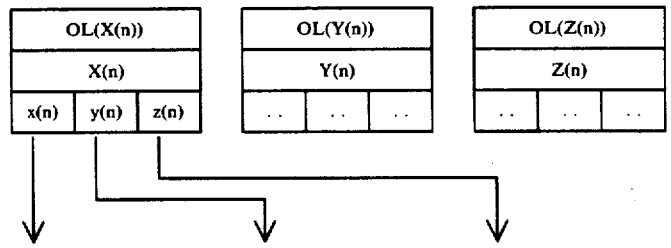

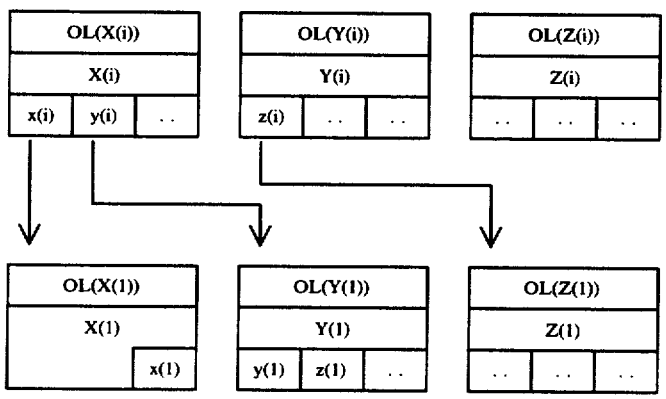

DEFINE
NB(i) :: minimum ( 3, the number of index blocks in the horizontal access path of the index from X(i) to the last index block on the hierarchical level inclusive)

In other words,
NB(i) :: cardinality (W(i))
B(W(i)) :: The address of the buffer containing W(i)
L(W(i)) :: The logical block number (LBN) of W(i)
BA(W(i)) :: A generalized member of the set of vectors
( (B(X(i)),L(X(i))),(B(Y(i)),L(Y(i))),(B(Z(i)),L(Z(i))) )
THEREFORE
cardinality (BA(W(i))) = NB(i)

INTERMEDIATE RESULTS

Some indexing structures have a single block at the top indexing level. For such structures the following relation always applies.

$$NB(n) = 1 \quad (1)$$

For some forms of indexing structures, the relation (1) is only sometimes true. However, for both forms, the APEX block is defined to be the first (the logically leftmost) index block on level (n), the APEX level. The APEX block is the first index block accessed to satisfy a hierarchical keyed search of the indexing structure.

State Descriptors for Index Blocks

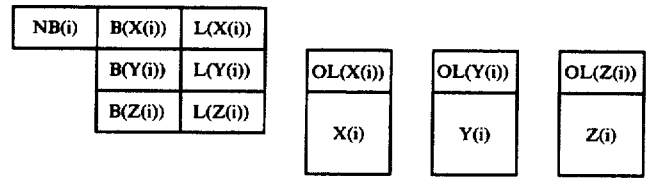

Note the equivalent form

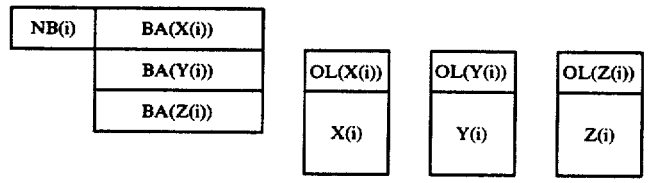

DEFINE :: minimum ( 3, the number of index entries in the horizontal access path of the index from x(i) to the last index entry on the hierarchical level inclusive)

In other words
NE(i) :: cardinality (w(i))
E(w(i)) :: The address of the buffer containing the index entry for the high key entry in W(i-1)
    NOTE: The above is a powerful definition which describes the hierarchical indexing relationship between entries on an index level (i) and blocks on the next lower (i-1) index level.
O(w(i)) :: The offset of w(i) within E(w(i))
EA(w(i)) :: A generalized member of the set of vectors
( (E(x(i)),O(x(i))),(E(y(i)),O(y(i))),(E(z(i)),O(z(i))) )
THEREFORE
cardinality (EA(w(i))) = NE(i) = cardinality (BA(W(i-1))) = NB(i-1)
BOUNDARY CONDITION -continued For i = 1,
O(x(1))   :: OL(X(1))   and trivially, E(w(1)) = B(w(1))
Using the logical ordering of (W) and (w) in space, extablish the
interchangable notation
BA(W) :: BA(j) such that BA(X) :: BA(1), BA(Y) :: BA(2), BA(Z) :: BA(3)
EA(w) :: EA(j) such that EA(x) :: EA(1), EA(y) :: EA(2), EA(z) :: EA(3)

State Descriptors for Index Entries

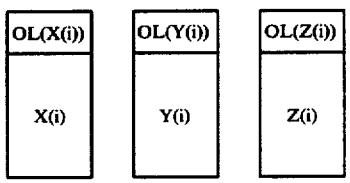

Note the equivalent form

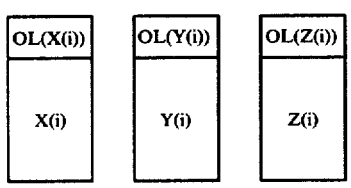

INTERMEDIATE RESULTS

(1) INDEX BLOCK STRUCTURE

Information about an index block is initially obtained from the block itself on the DASD medium. The index block must have a structure which provides the access method information about the contents of the index block, as well as its relationship to other blocks in the indexing structure. The following describes the (assumed) index block format:

| BLOCK: | HEADER | ENTRY | ENTRY | ... | ENTRY |
|---|---|---|---|---|---| where

| HEADER: | FORWARD BLOCK POINTER | BACKWARD BLOCK POINTER | OFFSET TO LAST ENTRY | INDEX ENTRY LENGHT |
|---|---|---|---|---|
|  | (F) | (BWD) | (OL) | (EL) |

| ENTRY: | FLAGS | KEY | VERTICAL BLOCK POINTER | DATA (OPTIONAL) |
|---|---|---|---|---|

(V)

The total length of the index block must be less than or equal to the length of an atomic I/O operation. The FLAGS field in the index entry contains at least a low level entry indicator, and a deleted entry (placeholder) indicator (EDEL).

(2) THE INDEX PROFILE

The attributes of the indexing structure are maintained on the DASD medium in an index profile. The following fields are required to be in the index profile for index compression:

1. Key-Length (KEYL): the indexing structure key length (unless statically defined)
2. APEX-LBN (APEXL): the block number of the first block at the APEX level.
3. Index-Freechain (FC): the block number of the first element of the index block freechain.
4. Index-Freechain-Shadow (FCs): the block number of the index block freechain shadow (recovery) field. This points to what was the first element of the freechain when a new element is being added.
5. APEX-Level-Recovery-Segment (ALRS): A three element array containing the pseudo index entries (comprised of block numbers only) which allow failure recovery on the APEX level.
6. Incomplete-Compression (IC): this indicates that a prior index compression did not complete successfully.

(3) INDEX STRUCTURE ACCESS METHOD SEARCH RULES

Access methods search the indexing structure in two ways, hierarchically and horizontally. Let 'search key' mean the key which is to be found in the index. Let 'test key' mean each key which is examined in the index blocks and compared to the search key.

Horizontal search is simply a scan of the bottom indexing level, starting from the left-most block on the level. The scan consists of comparing each test key in the block to the search key, and using the forward horizontal index block pointer (F function), whenever the end of a block is reached. The scan continues until a test key is greater than or equal to the search key. The first block on an indexing level has a backward horizontal index block pointer (BWD function) of zero. Similarily, the right most block on an indexing level has a forward horizonal index block pointer (F function) of zero. An additional requirement for this type of search is that the access method has (or can obtain) the block number of the leftmost block on the bottom indexing level. This type of searching is commonly used when the keys are to be retrieved sequentially in ascending order.

A hierarchical search consists of a scan across the APEX indexing level for a test key value greater than or equal to that of the search key. When this key is obtained, its vertical pointer (V function) contains the block number for the left-most block that should be searched on the next lower indexing level. The search continues on that (lower) indexing level. The search is completed after scanning the lowest level of the indexing structure. This search method is commonly used when the key requests are random in nature. Both index search methods imply that the indexing structure have a 'stopper' entry. This entry has the highest possible key value in the index (binary ones—equivalently, hexadecimal F, denoted x'F').

(4) THE INDEX FREECHAIN

Neither search rule uses the index block backward horizontal pointer (BWD function). This field is used by the access method for insert and deletion activity in the indexing structure, and as the linkage for an index block freechain. The index block freechain is created by the index compression mechanism, and these blocks are available to the access method for expansion of the indexing structure. The index profile points to the head of the freechain (FC). The freechain is a single linked list where the next available index block number is contained in the current index block's backward horizontal pointer field. The end of the index block freechain is indicated by the index block whose backward horizontal pointer contains the block number of itself.

(5) THE NULL INDEX BLOCK

This is simply an index block with no valid entries. This includes implementations for which the minimum content of an index block is a single index entry which is marked deleted. The definition of an empty index block then, acknowledges at least the presence of a single index entry within it and can be expressed as follows: (EDEL(OL(W(i)))=ON) AND (OL(W(i))- =LENGTH(HEADER)) : : An empty index block, $i=1$.

Since even empty index blocks contain 1 (and only 1) index entry, all index blocks must contain at least 1 entry. Thus, for a given index level there cannot be more index blocks than index entries. In other words, $$NB(i) < = NE(i) \text{ for all } i \quad (2)$$

Within the context of index compression, there is another state which defines an empty index block. Index compression is the process of moving index entries from Y(i) to X(i) on each index level (i), until X(i) is full of entries or all entries in Y(i) have been moved into X(i). Thus, an empty index block is also a Y(i) such that all entries in Y(i) are also in X(i). (All entries in Y(i) have been moved into X(i)). Both kinds of empty index blocks are collectively called NULL index blocks.

Index compression can be viewed as the process of generating NULL index blocks and then removing them from the index structure.

NULL index blocks are removed from the index hierarchy and placed in a pool of logical blocks called a FREECHAIN. Removing a block from an index involves removing the block from both of the horizontal index access paths and the vertical index access path.

The blocks placed on the FREECHAIN by index compression are later available for reuse when needed by index access methods. Again, the index compression process can be thought of as the process of generating NULL index blocks (the process of building or enlarging the index FREECHAIN).

(6) THE NULL APEX

A NULL APEX is defined as an APEX, the first X(n), such that NE(n)=1, n>1. In other words, a NULL APEX is a lone APEX level block addressing a lone lower level block. X(n−1) can replace X(n) as the APEX block. Reducing n by 1 generates a new X(n), reducing the hierarchical access path by one level.

3. Process Parameters

Index compression is a process involving both physical states and process parameters. The process parameters are enumerated.

The last 3 process parameters are binary valued functions.

| DEFINE | |
|---|---|
| EL(i) | The length of an index entry on level (i) |
| Omax(i) | The maximum possible offset of an entry in W(i) |
| MOD(i,j) | W(j) modified on index level (i) |
| DEL(i) | Signal deletion of y(i) |
| HKM(i) | High key in X(i) modified |

INTERMEDIATE RESULTS

Let MOD(i,1) be that function (buffer modification) which represents modification of X(i) during index compression on index level (i).

Let MOD(i,2) and MOD(i,3) have similar representations for Y(i) and Z(i), respectively.

The movement of index entries into X(i) is accomplished by the modification of X(i) to physically contain the entries. So, when entry movement does not generate a NULL block, MOD (i,1) signifies the movement of entries into X(i) and MOD(i,2) signifies the removal of the shifted entries from Y(i). When entry movement does generate a NULL block MOD(i,1) signifies the placement of index entries into X(i) and the removal of Y(i) from the forward horizontal index access path; MOD(i,3) signifies the removal of Y(i) from the backward horizontal index access path. Additionally, let DEL(i+1) signify the removal of Y(i) from the vertical index access path (the deletion of a single index entry, y(i+1)—the one for Y(i), on level (i+1)).

Process Parameters for Index Compression

| | | | | | |
|---|---|---|---|---|---|
| — | — | | | | |
| | — | | OL(X(i)) | OL(Y(i)) | OL(Z(i)) |
| | — | | | | |
| — | — | | X(i) | Y(i) | Z(i) |
| | — | | | | |
| | — | | | | |
| | DEL(i) | MOD(i,j) | HKM(i) | EL(i) | Omax(i) |

DEFINITION: Pc(i) :: The Plane of Compression on index level (i)

| | | | | | |
|---|---|---|---|---|---|
| | EA(x(i+1)) | | | | |
| | EA(y(i+1)) | | | | |
| | EA(z(i+1)) | | | | |
| | DEL(i+1) | MOD(i+1,j) | HKM(i+1) | — | — |
| NB(i) | BA(X(i)) | | | | |
| | BA(Y(i)) | | OL(X(i)) | OL(Y(i)) | OL(Z(i)) |
| | BA(Z(i)) | | | | |
| NE(i) | EA(x(i)) | | X(i) | Y(i) | Z(i) |
| | EA(y(i)) | | | | |
| | EA(z(i)) | | | | |
| | DEL(i) | MOD(i,j) | HKM(i) | EL(i) | Omax(i) |

For fixed (i), note the equivalent form, Pc

| | | | | | |
|---|---|---|---|---|---|
| | PE | PO | | | |
| | RPE | RPO | | | |
| | — | | | | |
| | PDEL | PMOD | PHKM | — | — |
| NB | B(X) | L(X) | | | |
| | B(Y) | L(Y) | OL(X) | OL(Y) | OL(Z) |
| | B(Z) | L(Z) | | | |
| NE | E(x) | O(x) | X | Y | Z |
| | E(y) | O(y) | | | |
| | E(z) | O(z) | | | |
| | DEL | MOD(j) | HKM | EL | Omax |

Also equivalent is

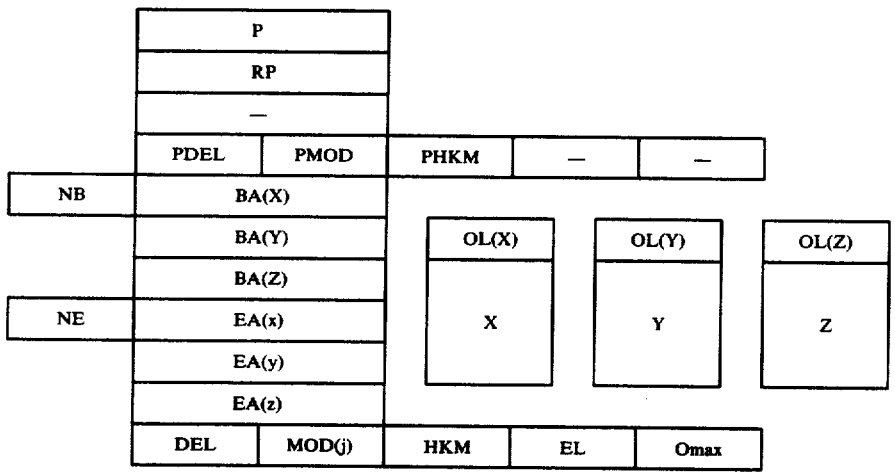

Where the following equivalence relationships apply

| | | |
|---|---|---|
| PE | :: $E(x(i+1))$ | Buffer containing parent of current block, $X(i)$ |
| RPE | :: $E(y(i+1))$ | Right-hand parent entry buffer |
| PO | :: $O(x(i+1))$ | Offset of parent entry |
| RPO | :: $O(y(i+1))$ | Offset of right-hand parent entry |
| P | :: (PE,PO) | The parent entry for $X(i)$ |
| RP | :: (RPE,RPO) | The right hand parent entry |
| PDEL | :: $DEL(i+1)$ | Delete right-hand parent entry |
| PMOD | :: $MOD(i+1,1)$ | $X(i+1)$ modified |
| PHKM | :: $HKM(i+1)$ | High key in $X(i+1)$ modified |
| NB | :: $NB(i)$ | Number of blocks in $Sc(n)$ on current level |
| W | :: $W(i)$ | Index block on current level |
| w | :: $w(i)$ | Index entry on current level |
| B(W) | :: $B(W(i))$ | Index block buffer pointer |
| L(W) | :: $L(W(i))$ | Index block logical block number |
| BA(W) | :: (B(W),L(W)) | Block W processor/DASD storage location |
| NE | :: $NE(i)$ | Number of entries in $Sc(n)$ for current level |
| E(w) | :: $E(w(i))$ | Index entry buffer pointer |
| O(w) | :: $O(w(i))$ | Index entry offset in buffer |
| EA(w) | :: (E(w),O(w)) | Entry w processor storage location |
| DEL | :: $DEL(i)$ | Delete right-hand entry, $y(i)$ |
| MOD(j) | :: $MOD(i,j)$ | J th block in $Sc(n)$ for current level modified |
| HKM | :: $HKM(i)$ | High key in $X(i)$ modified |
| EL | :: $EL(i)$ | Index entry length for the current level |
| Omax | :: $Omax(i)$ | Index block capacity for blocks on current level |
| OL(W) | :: $OL(W(i))$ | Index block usage (offset of last entry) |
| DEFINE | | |
| F(W) | :: | The forward index access path from block W |
| BWD(W) | :: | The backward index access path from block W |
| V(W) | :: | The vertical index access path to block W |
| HK(W) | :: | The key of the last entry in block W |
| LK(W) | :: | The key of the first entry in block W |
| K(P) | :: | The key of P |
| FC | :: | The index freechain pointer in the index profile |
| FCs | :: | The previous freechain pointer (freechain shadow) in the index profile |

INTERMEDIATE RESULTS

THE EXISTENCE OF BLOCKS (Y) and (Z)
For an arbitrary index level,
(3) block (Y) exists if and only if V(Y) is defined
(4) block (Z) exists if and only if block (Y) exists and $F(Y)\neq 0$ DETERMINING NB
If both (Y) and (Z) exist then NB=3
If only (Y) exists then NB=2
If neither (Y) nor (Z) exist then NB=1

IMPLIED RESTRICTIONS ON ENTRY SHIFT OPERATIONS

Entry shift can only transfer entries into block (X) from block (Y).

Entry shift can occur if and only if block (X) is not full and block (Y) is not empty.

Entry shift involves only those entries in block (Y) which are not also in block (X).

DEFINITION: Sc(n) :: The Compression Space of an index of hierarchical depth (n)

|      | DEL(n+1) |         |          |          |          |
|------|----------|---------|----------|----------|----------|
| NB(n)| B(X(n))  | L(X(n)) |          |          |          |
|      | B(Y(n))  | L(Y(n)) | OL(X(n)) | OL(Y(n)) | OL(Z(n)) |
|      | B(Z(n))  | L(Z(n)) |          |          |          |
| NE(n)| E(x(n))  | O(x(n)) | X(n)     | Y(n)     | Z(n)     |
|      | E(y(n))  | O(y(n)) |          |          |          |
|      | E(z(n))  | O(z(n)) |          |          |          |
|      | DEL(n)   | MOD(n,j)| HKM(n)   | EL(n)    | Omax(n)  |
| NB(i)| B(X(i))  | L(X(i)) |          |          |          |
|      | B(Y(i))  | L(Y(i)) | OL(X(i)) | OL(Y(i)) | OL(Z(i)) |
|      | B(Z(i))  | L(Z(i)) |          |          |          |
| NE(i)| E(x(i))  | O(x(i)) | X(i)     | Y(i)     | Z(i)     |
|      | E(y(i))  | O(y(i)) |          |          |          |
|      | E(z(i))  | O(z(i)) |          |          |          |
|      | DEL(i)   | MOD(i,j)| HKM(i)   | EL(i)    | Omax(i)  |
| NB(1)| B(X(1))  | L(X(1)) |          |          |          |
|      | B(Y(1))  | L(Y(1)) | OL(X(1)) | OL(Y(1)) | OL(Z(1)) |
|      | B(Z(1))  | L(Z(1)) |          |          |          |
| NE(1)| E(x(1))  | O(x(1)) | X(1)     | Y(1)     | Z(1)     |
|      | E(y(1))  | O(y(1)) |          |          |          |
|      | E(z(1))  | O(z(1)) |          |          |          |
|      | DEL(1)   | MOD(i,j)| —        | EL(1)    | Omax(1)  |
| n    |          |         |          |          |          |

The compression process involves certain elements of control beyond state description. These elements of control include sensitivity to progress, recoverability, auxiliary resources, and the state machine. The control elements are enumerated.

4. The Physical State Transformations Of Index Compression

The compression process is a transformation of an index through a series of physical states. The physical states traversed each support an incremental unit of progress for the compression process as a whole. The DEFINITION: Csc(n) :: The Compression Control Block Structure for an Index of Depth (n)

Control Information Segment .......
| CF-COMPRESSION PROGRESS FLAG |
| MF-FORWARD MOTION PROGRESS FLAG |
| HFL-HIGHEST FAILING LEVEL |

Recovery Control Segment ........
| CCM-COMPRESSION CONDITION MASK (n element arry) |
| CAM-COMPRESSION ACTION MASK (n element array) |
| CPM-COMPRESSION PROGRESS MASK (n element array) |

Auxiliary Resource Control Segment
Index Profile Element (IPE) ...
| PB-PROFILE BUFFER ADDRESS |
| PL-PROFILE BLOCK LBN |

Compression Space Segment .......
| Sc(n) | index compression process appears as a cycle of ordered transformations (state changes) occurring on each level of the index simultaneously. Each compression cycle begins on the bottom index level at the current block from a STEADY STATE (equilibrium) condition. Transformations are performed on the current index level until a transformation is required which affects the next higher index level, at which point the plane of compression, Pc(i), is moved up one level, where the compression cycle continues (from the steady state condition or from a recognized non-steady state condition generated by normal lower level compression processing).

The process of starting a compression cycle on a level and moving Pc(i) upward continues until the highest index level (n) is processed. This part of the transformation cycle is called 'disruption-adjustment' because each level of the index is transformed further away from the steady state condition during this part of the process.

When disruption-adjustment is complete, the 'resynchronization' part of the cycle begins. Starting at the APEX level, further transformations are applied to the level until the steady state condition is again reached. At this point Pc(i) is moved down one level and transformations continue in like fashion on the level below.

One cycle of state transformations in the compression process is complete when all index levels again reach the steady state condition.

The compression process is fully recoverable if each transformation (state change) on each level can be uniquely determined from a finite set of state relationships, called condition vectors, and if the (n) condition vectors are orthogonal (mutually independent). Recovery is then accomplished by determining where the compression process failed (finding the unique condition vector describing the non-steady state condition) and continuing the compression cycle from that point. The Condition Vector is described in section 6 (RECOVERY FROM FAILURE).

Each condition vector is a series of index relationships which simultaneously hold and uniquely determine the progress of compression on a given index level. The set of all condition vectors uniquely determines the progress of compression on all levels. The set of variables required to articulate the index relationships on a given level are called 'recovery coordinates'.

The recovery coordinates for each index level contribute to the condition vector for the level. As will be shown, for each index level (each member of the set of vectors), the recovery coordinates are dependent on the current plcement of Pc(i) in the compression space Sc(n) and not on any prior or future placement. Therefore, each member of the set of Recovery Coordinate n-tuples is independent. The condition vectors are thus, orthogonal. When a steady state condition is observed on the low index level (i=1) and no prior compression process failure has occured, a new vector, the Progress Vector, is constructed for the level and the Progress Vector is used, rather than the Condition Vector for determining the variation on compression processing for the current level. So, the basic difference between the Condition Vector and the Progress Vector is that the Condition Vector is the mechanism for evaluating the intregrity of the index structure, and the Progress Vector is the mechanism for evaluating the compressability of the index at current position (with respect to key value). The Progress Vector is described in section 7 (COMPRESSION CYCLE GENERATION).

DEFINE (the Recovery Coordinates)
The value of NB
The equivalence of K(P) and HK(X)
WHEN NB > 1
The relative magnitudes of HK(X) and LK(Y)
The equivalence of F(X) and V(Y)
The equivalence of FC and V(Y)
The equivalence of BWD(Y) and V(X)

Each of the physical states and transformations of index compression are described in section 4.1 (MID LEVEL STATES) for the restrictive assumption (NB>2), i.e., (Y) is not the last block on the index level. Similarly, End Level transformations (1<=NB<=2) are shown in section 4.2 (END LEVEL STATES)

Figures for APEX Level transformations (i=n) are shown in section 4.3 (APEX LEVEL STATES)

The uniqueness of the Condition Vectors for the set of states is demonstrated by the Condition Vector Table of section 6.1 (CONDITION VECTORS—THE CVT).

MID LEVEL STATES (NB > 2)
STATE 0 - The Steady State

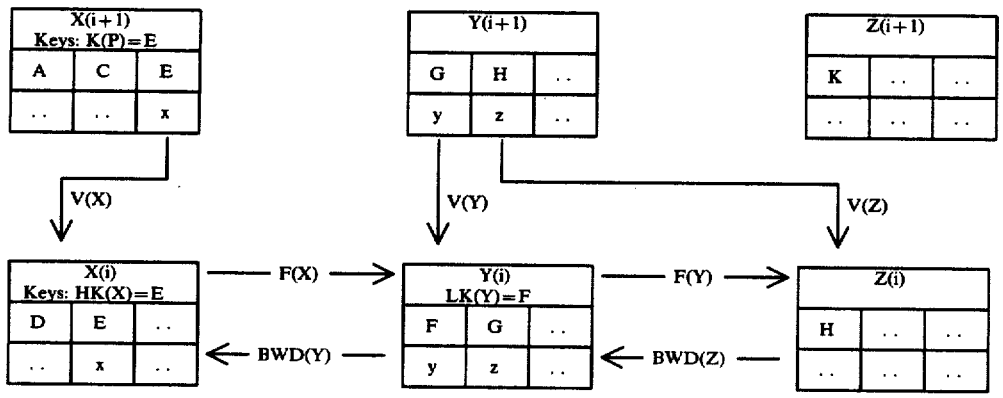

THE STEADY STATE RECOVERY COORDINATES:
K(P)   > = HK(X)   NB > 2
HK(X)  <   LK(Y)

-continued

F(X) = V(Y)
FC ¬ = V(Y)
BWD(Y) = V(X)

Before and after each index compression cycle, all index levels exhibit the steady state.

Entry Compression - STATE 1,
Entry Compression Leaves Y Non-empty

The first state transformation of compression on an index level is the movement of entries from Y into X. If Y is not rendered empty, block X is updated to contain a new high key entry.

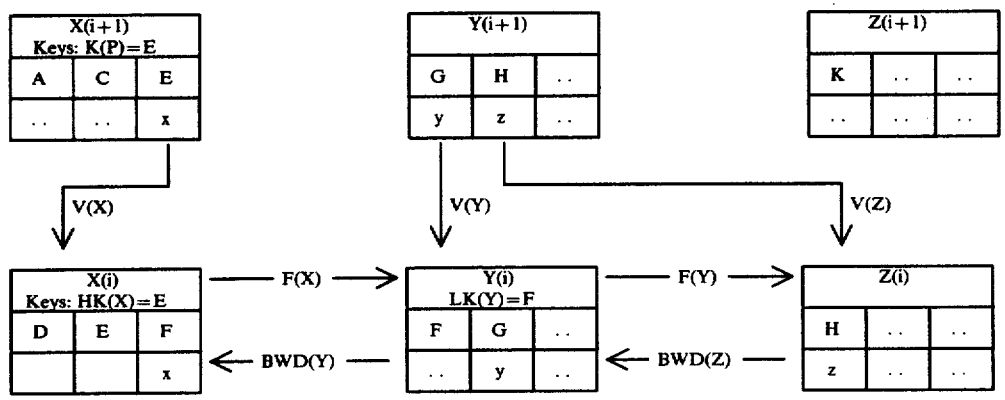

THE STATE 1 RECOVERY COORDINATES:
K(P)    <    HK(X)  NB > 2
HK(X)   <    LK(Y)
F(X)    =    V(Y)
FC      ¬ =  V(Y)
BWD(Y)  =    V(X)

Entry Compression - STATE 2,
Parent Entry (P) Update Propagation
NB > 2 On Parent Level Compression to produce STATE 1 on an index level requires that the parent entry for X is updated to reflect the new high key of X. Pc(i) is moved upward in the structure and the update is made as part of disruption-adjustment on that level. If this entry update involves the last entry in that block, again, a parent entry update is required. This action in turn may create the STATE 2 condition on the next higher index level, and so on up the index structure.

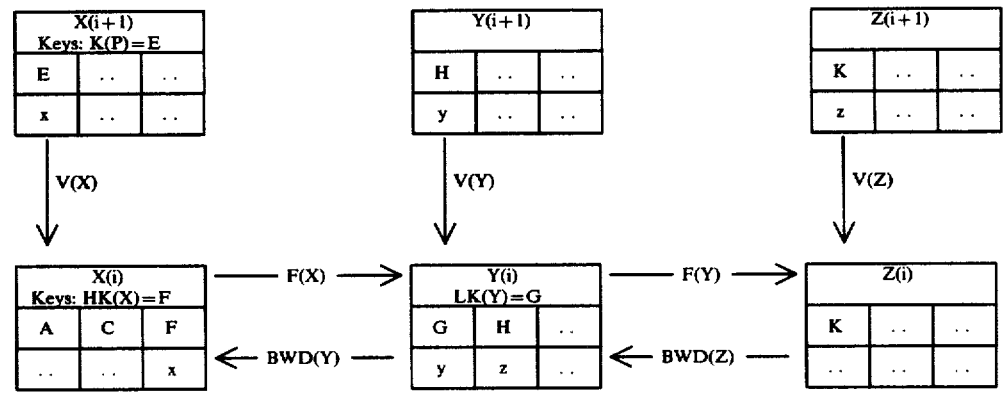

NOTE: For this figure, the parent index level after transforming from STATE 1 is shown on the bottom row.

THE STATE 2 RECOVERY COORDINATES:
K(P)    <    HK(X)  NB > 2
HK(X)   <    LK(Y)
F(X)    =    V(Y)
FC      ¬ =  V(Y)
BWD(Y)  =    V(X)

Entry Compression - STATE 12, Parent Entry (P)
Update Propagation NB = 2 on Parent Level When the STATE 2 condition would normally occur, but the parent index level contains only two blocks (the parent index level is in an End Level state) STATE 2 becomes STATE 12.

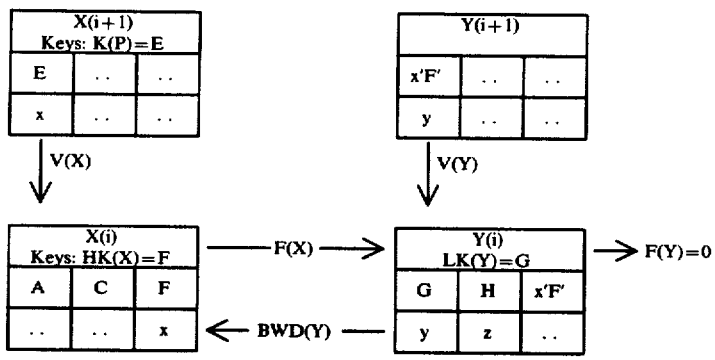

NOTE: For this figure, the parent index level after transforming from STATE 1 is shown on the bottom row.

THE STATE 12 RECOVERY COORDINATES:
K(P)      <   HK(X)      NB = 2
HK(X)     <   LK(Y)
F(X)      =   V(Y)
FC        =   V(Y)
BWD(Y)    =   V(X)

Entry Compression - STATE 3, Parent Entry (P) Update for X Complete

The condition on the original compression level after parent entry update is shown below. For the next step of the compression process, the entries shifted from block Y during compression on the original index level must be removed.

Resynchronization begins.

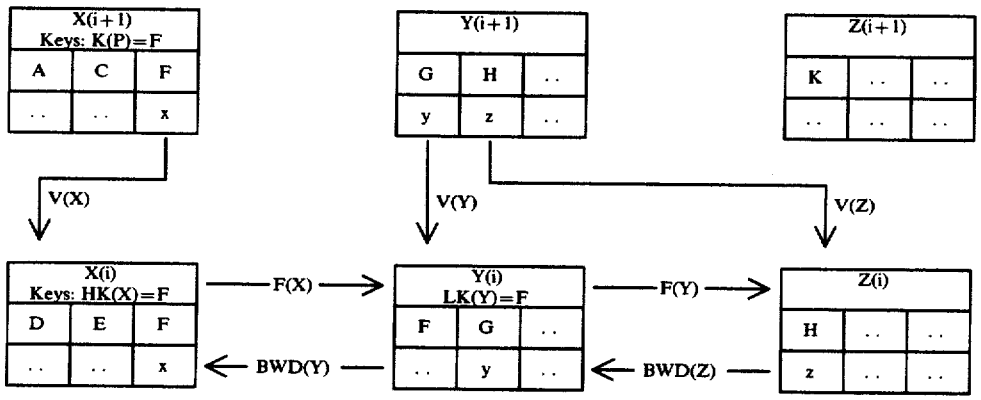

THE STATE 3 RECOVERY COORDINATES:
K(P)      >=  HK(X)      NB > 2
HK(X)     ¬<  LK(Y)
F(X)      =   V(Y)
FC        ¬=  V(Y)
BWD(Y)    =   V(X)

Entry Compression - Return to STATE 0,
Shifted Entries Removed From Y

The removal from Y of the entries shifted into X brings the original compression level back to steady state.

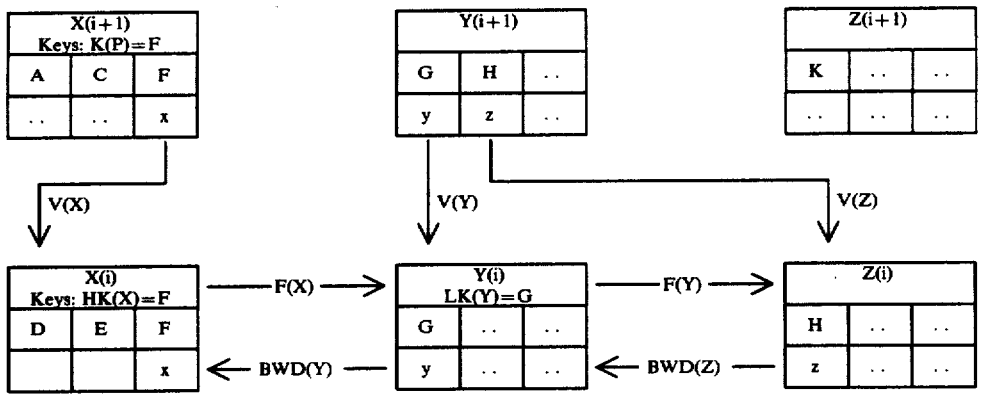

THE STATE 0 RECOVERY COORDINATES:
```
K(P)    >=  HK(X)      NB > 2
HK(X)   <   LK(Y)
F(X)    =   V(Y)
FC      ¬=  V(Y)
BWD(Y)  =   V(X)
```

The following states occur when compression on an index level involves the removal of a block from the index structure:

Block Compression - STATE 4, Y Initially Empty

The first state transformation of block compression on an index level is the removal of block Y from the forward horizontal access path of the index.

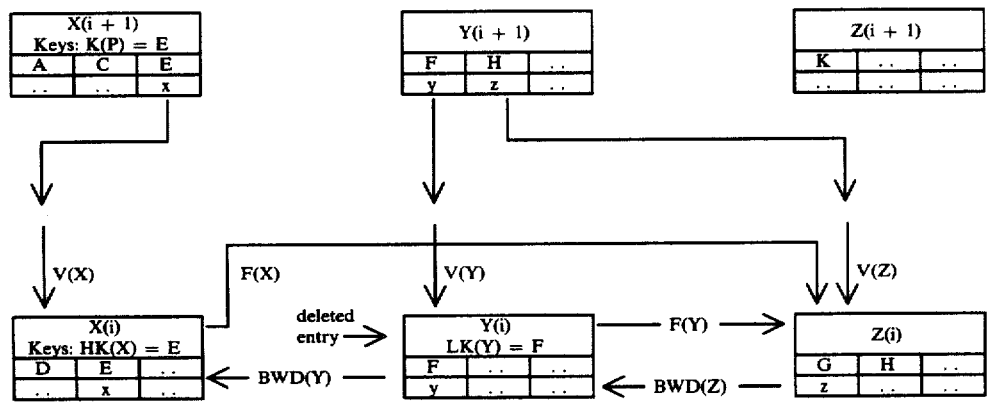

THE STATE 4 RECOVERY COORDINATES:
```
K(P)    >=  HK(X)   NB > 2
HK(X)   <   LK(Y)
F(X)    ¬=  V(Y)
FC      ¬=  V(Y)
BWD(Y)  =   V(X)
```

Block Compression - STATE 5, Freechain Disruption

The next state transformation places an empty Y on the index freechain (FC), saving the old index freechain pointer in the freechain shadow field (FCs) of the index profile.

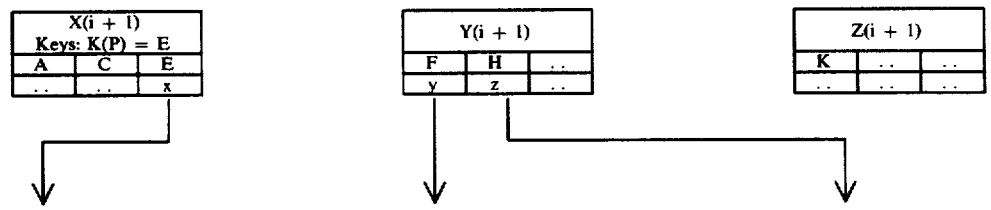

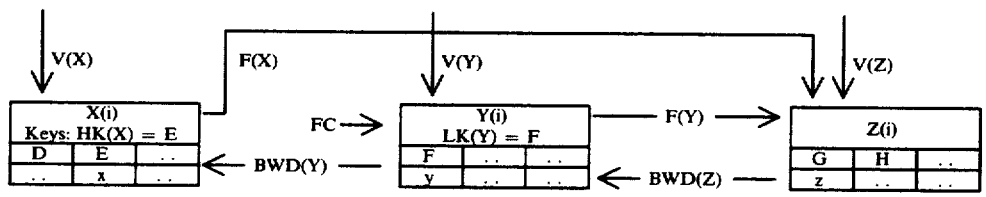

THE STATE 5 RECOVERY COORDINATES:
K(P)      >=    HK(X)  NB > 2
HK(X)     <     LK(Y)
F(X)      ¬=    V(Y)
FC        =     V(Y)
BWD(Y)    =     V(X)

Block Compression - State 6, Freechain Adjustment

The next state transformation adjusts the freechain continuity by setting the block backward pointer for Y to FCs (the previous head of the freechain).

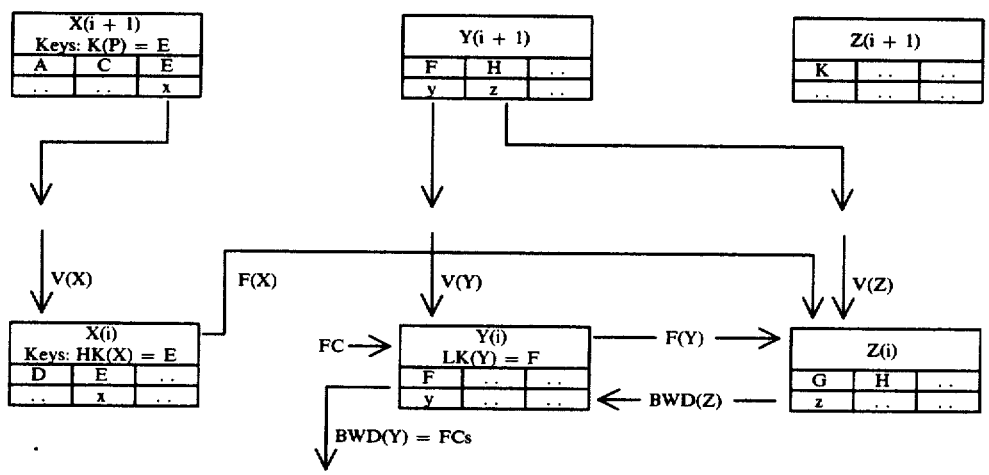

THE STATE 6 RECOVERY COORDINATES:
K(P)      >=    HK(X)  NB > 2
HK(X)     <     LK(Y)
F(X)      ¬=    V(Y)
FC        =     V(Y)
BWD(Y)    ¬=    V(X)

Block Compression - STATE 7, Parent Entry Removed

The next state transformation deletes the parent entry for Y on the level above the original compression level. If the parent entry is the only entry in its block, the entry is removed by removing the block (states 4–6 on the upper level). If The parent entry for Y is not the only entry in its block, the entry removal generates state 7.

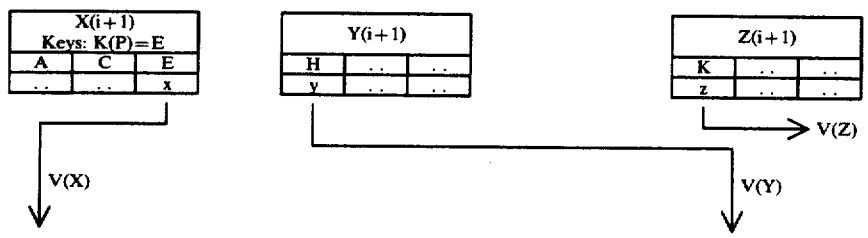

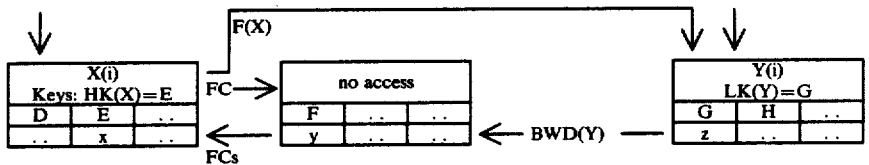

THE STATE 7 RECOVERY COORDINATES:
K(P)    >=   HK(X)  NB > 2
HK(X)   <    LK(Y)
F(X)    =    V(Y)
FC      ¬=   V(Y)
BWD(Y)  ¬=   V(X)

Block Compression - STATE 13, Parent Entry Removed
End Level Approach (NB reduced to 2)

When the STATE 7 condition would normally occur but the deletion of the parent entry for block (Y) causes a reduction in NB, End Level processing is imminent. This condition is denoted by STATE 13.

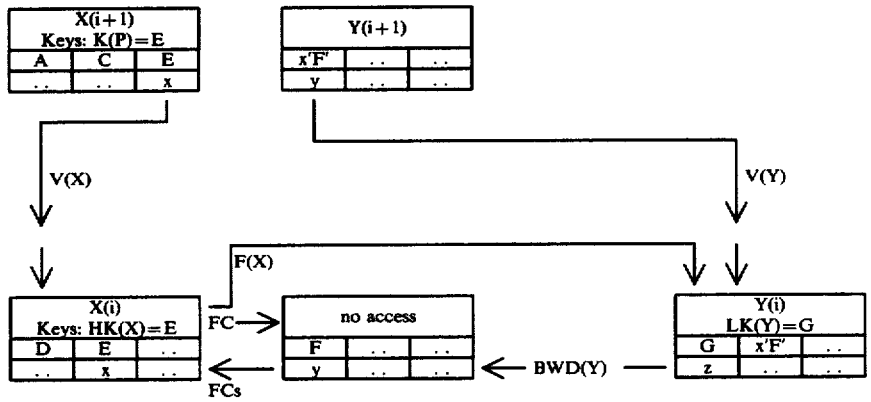

THE STATE 13 RECOVERY COORDINATES:
K(P)    >=   HK(X)  NB = 2
HK(X)   <    LK(Y)
F(X)    =    V(Y)
FC      ¬=   V(Y)
BWD(Y)  ¬=   V(X)

Block Compression - Return to STATE 0,
Old Y Removed From Backward Horizontal Access Path This transformation removes the freechained block from the backward horizontal access path by updating the backward block pointer of the new Y block, resuming the steady state condition.

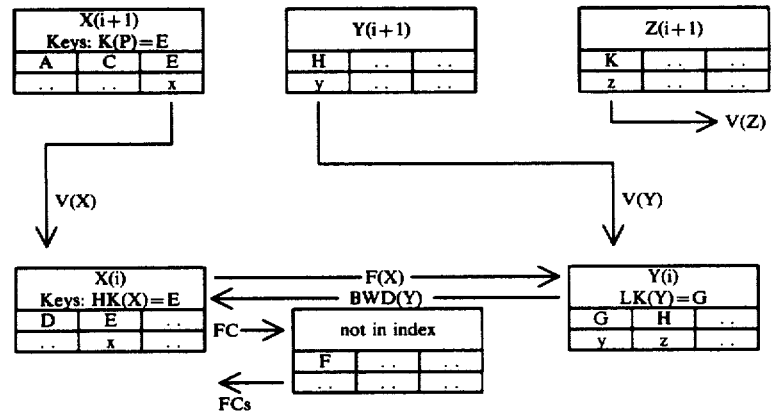

THE STATE 0 RECOVERY COORDINATES:

```
K(P)     >=   HK(X)  NB > 2
HK(X)    <    LK(Y)
F(X)     =    V(Y)
FC       ¬=   V(Y)
BWD(Y)   =    V(X)
```

Block Compression - STATE 14,
The End Level Steady State (NB reduced to 2)
Old Y Removed From Backward Horizontal Access Path The transformation from STATE 13 to remove the freechained block from the backward horizontal access path produces STATE 14, a steady state condition for End Level processing.

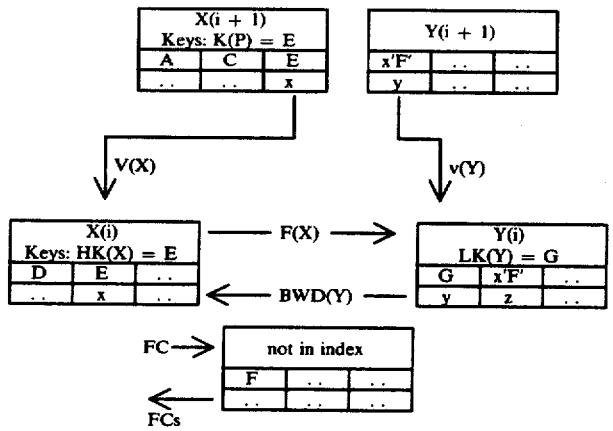

THE STATE 14 RECOVERY COORDINATES:
```
K(P)    >=   HK(X)  NB = 2
HK(X)<       LK(Y)
F(X)    =    V(Y)
FC      ¬=   V(Y)
BWD(Y)       V(X)
```

Entry-Block Compression - STATE 8, Y Emptied

The first state transformation of entry-block compression on an index level is the movement of entries from Y into X. Y is rendered empty, so the forward horizontal access path is also adjusted at the same time block X is written containing the shifted entries

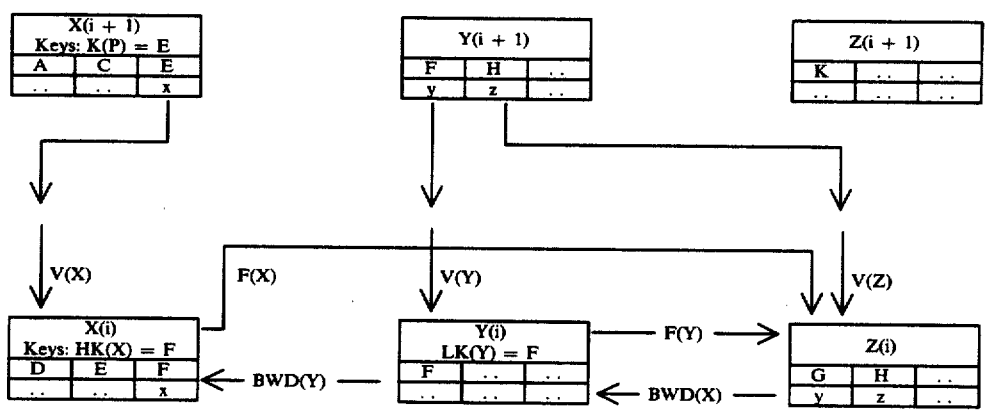

THE STATE 8 RECOVERY COORDINATES:
```
K(P)     <    HK(X)  NB > 2
HK(X)    ¬<   LK(Y)
F(X)     ¬=   V(Y)
FC       ¬=   V(Y)
BWD(Y)   =    V(X)
```

Entry-Block Compression - STATE 9,
Freechain Disruption

The next state transformation places an emptied Y on the index freechain (FC), saving the old index
freechain pointer in the freechain shadow field (FCs) of the index profile.

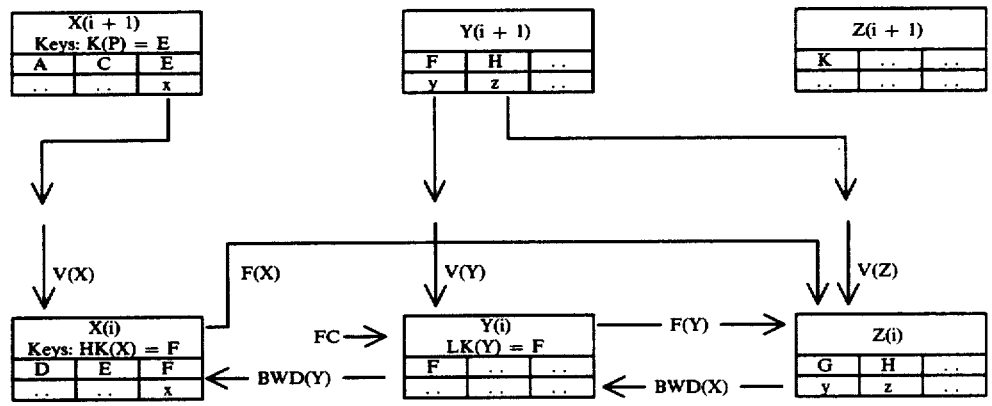

THE STATE 9 RECOVERY COORDINATES:
K(P)     <    HK(X)  NB > 2
HK(X)    ¬<   LK(Y)
F(X)     ¬=   V(Y)
FC       =    V(Y)
BWD(Y)   =    V(X)

Entry-Block Compression - STATE 10,
Freechain Adjustment

The next state transformation adjusts the freechain continuity by setting the block backward pointer for
Y to FCs (the previous head of the freechain).

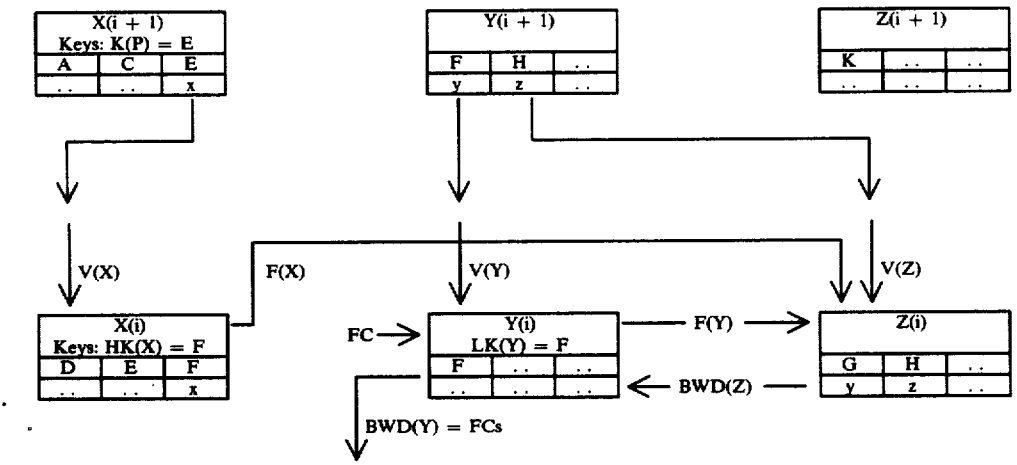

THE STATE 10 RECOVERY COORDINATES:
K(P)     <    HK(X)  NB > 2
HK(X)    ¬<   LK(Y)
F(X)     ¬=   V(Y)
FC       =    V(Y)
BWD(Y)   ¬=   V(X)

Entry-Block Compression - STATE 11,
Discrete Parent Blocks
Parent Entry For Y Not A Singleton Entry If both parent entries for X and Y are not in the same index block and no entry compression will be
performed on the parent level, the next state transformation updates the parent entry for X to
have the new high key value of X. The removal of the parent entry for Y is then a separate transformation
occurring during the resynchronizaton phase of compression on that level (from the STATE 1 or STATE 15 condition).

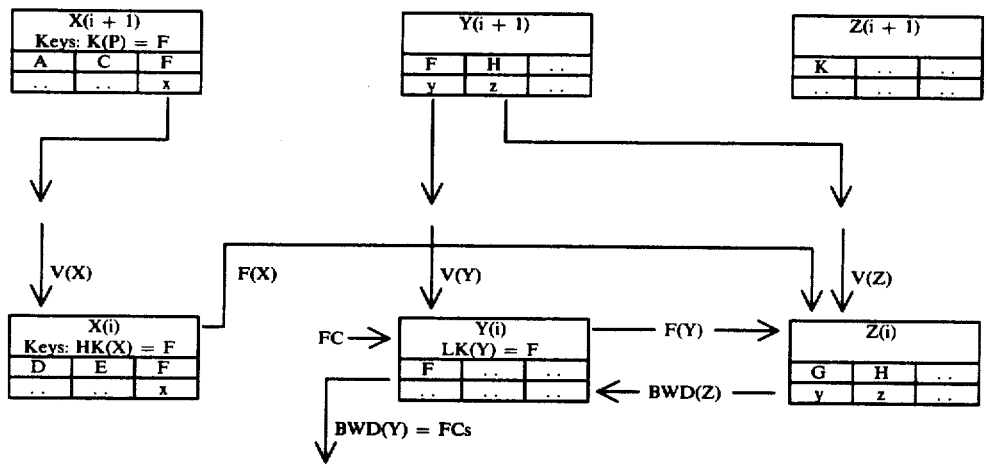

THE STATE 11 RECOVERY COORDINATES:
```
K(P)     >=   HK(X)  NB > 2
HK(X)    ¬<   LK(Y)
F(X)     ¬=   V(Y)
FC       =    V(Y)
BWD(Y)   ¬=   V(X)
```

Entry-Block Compression - STATE 1 Equivalence,
Discrete Parent Blocks - (y) Not A Singleton Entry
Parent Entry update Propagation (NB > 2 on Parent Level)

When STATE 11 occurs on an index level and the parent entry for X is again last in its block, a parent entry update is again required. The resultant state is identical to STATE 1, created by shifting one entry from Y into X. For this state to occur, block Y must contain more than one entry. (Otherwise, deleting y involves removing Y). Parent entry (of X) updates continue as long as the parent entry for X remains last in its block. (STATE 2 or STATE 12 may occur on upper index levels.)

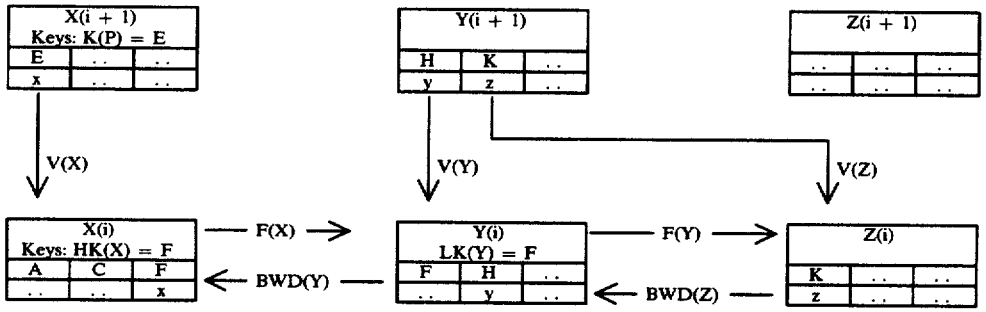

Note: For this figure, the parent index level after transforming to STATE 11 is shown on the botton row THE STATE 10 RECOVERY COORDINATES:
```
K(P)     <    HK(X)  NB > 2
HK(X)    ¬<   LK(Y)
F(X)     =    V(Y)
FC       ¬=   V(Y)
BWD(Y)   =    V(X)
```

Entry-Block Compression - STATE 15, Discrete Parent
Blocks - (y) Not A Singleton Entry Parent Entry
update Propagation (NB = 2 on Parent Level)

When STATE 11 occurs on an index level and the parent entry for X is again last in its block, a parent entry update is again required. When the Parent level has only two blocks, the STATE 15 condition is then observed. For this state to occur, block Y must contain more than one entry. (Otherwise, deleting y involves removing Y). Parent entry updates continue as long as the parent entry for X remains last in its block. (STATE 12 may occur on upper index levels.)

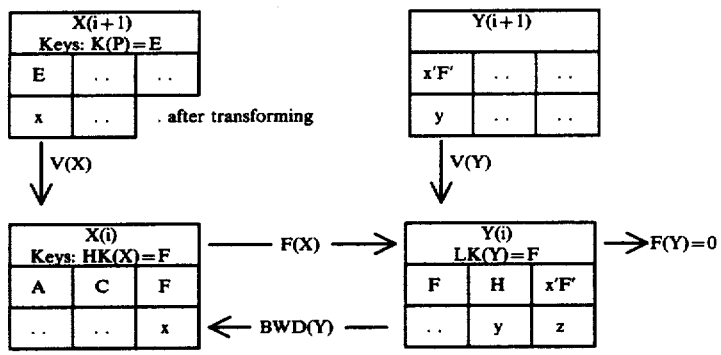

NOTE: For this figure, the parent index level after
transforming to STATE 11 is shown on the bottom row.

THE STATE 15 RECOVERY COORDINATES:
K(P)      <     HK(X)   NB = 2
HK(X)    ¬<    LK(Y)
F(X)      =     V(Y)
FC        ¬=    V(Y)
BWD(Y)   =     V(X)

Entry-Block Compression - STATE 7 Equivalence,
Parent Entries In Same Block

When the parent entries for both X and Y are in the same block, any parent entry update for a new high
key value in X is accomplished simultaneously with the deletion of the parent entry for Y (and any
entry compression into X occurring on that level). This state is thus, equivalent to STATE 7. Note that
when the deletion of the parent for block (Y) involves a reduction in the value of NB (approach to
End Level processing), STATE 7 equivalence is replaced by STATE 13 equivalence.

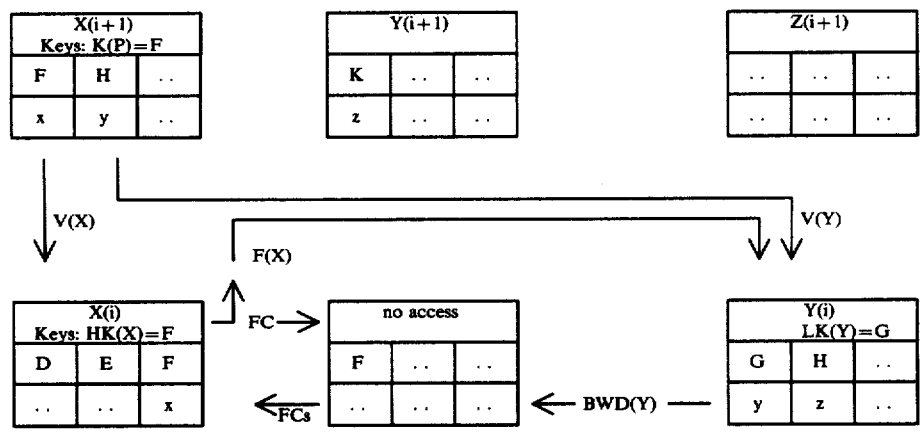

THE STATE 7 RECOVERY COORDINATES:
K(P)      >=    HK(X)   NB > 2
HK(X)    <     LK(Y)
F(X)      =     V(Y)
FC        ¬=    V(Y)
BWD(Y)   ¬=    V(X)

Entry-Block Compression - Return to STATE 0.
Y Removed From Backward Horizontal Access Path This transformation removes the freechained block from the backward horizontal access path by updating
the backward block pointer of the new Y block, resuming the steady state condition.

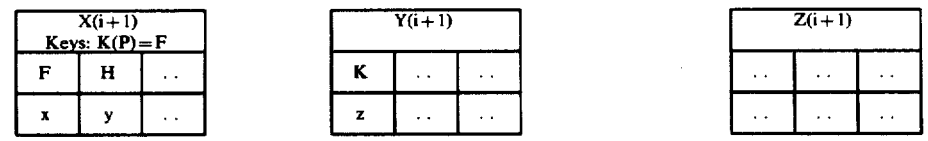

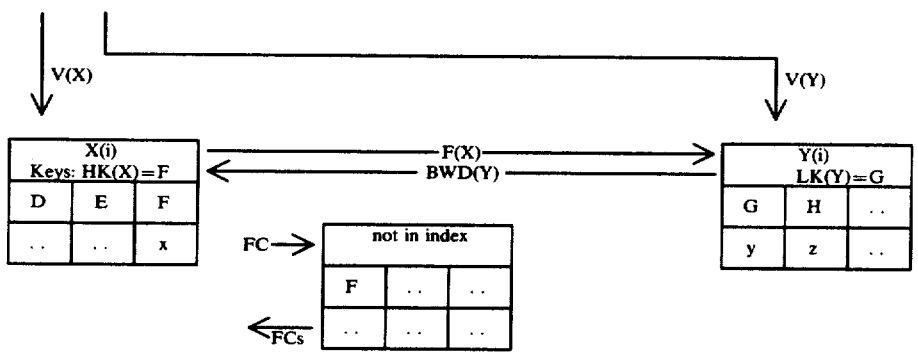

THE STATE 0 RECOVERY COORDINATES:
K(P)     >=   HK(X)   NB > 2
HK(X)    <    LK(Y)
F(X)     =    V(Y)
FC       ¬=   V(Y)
BWD(Y)   =    V(X)

Entry-Block Compression - State 14,
The End Level Steady State (NB reduced to 2)
Old Y Removed From Backward Horizontal Access Path Transformation from STATE 11 (or when the STATE 7 condition would normally be observed) when NB is reduced to 2 generates STATE 14, a steady state condition for End Level processing.

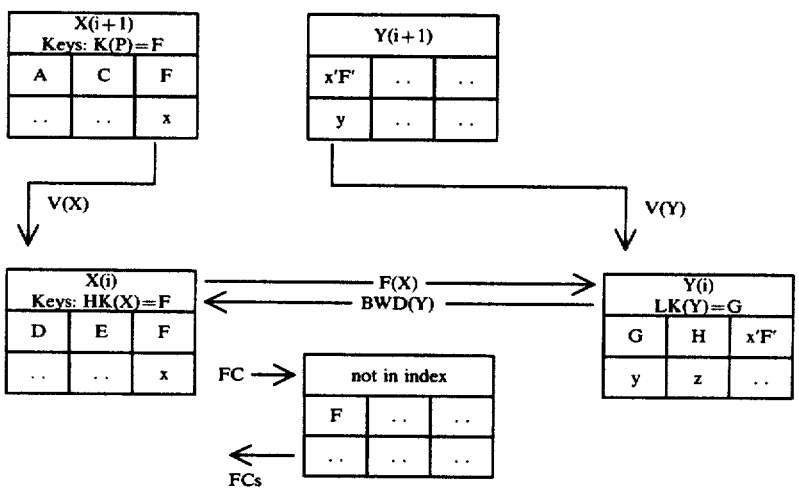

THE STATE 14 RECOVERY COORDINATES:
K(P)     >=   HK(X)   NB = 2
HK(X)    <    LK(Y)
F(X)     =    V(Y)
FC       ¬=   V(Y)
BWD(Y)   =    V(X)

End Level States (NB ¬> 2)

The physical states and transformations of index compression for End Level processing are described in this section. Note that some state transformations observed for Mid Level compression processing (Block Compression) are eliminated for end level processing because block (Y) can never be initially empty when it is the last block on an index level (it must contain at least the x'F'entry).

STATE 14 - The Steady State, End Level Processing

-continued

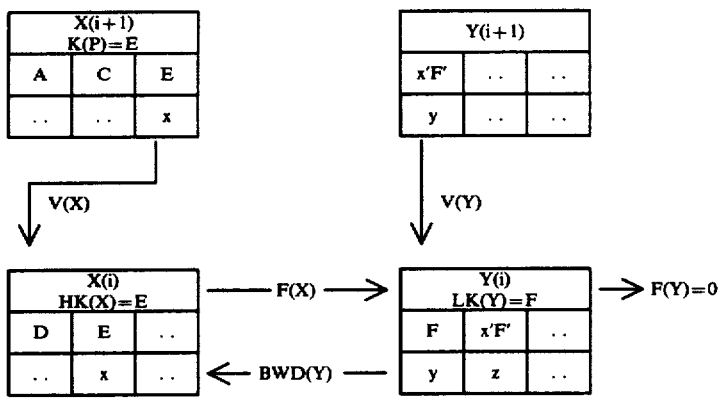

THE STATE 14 RECOVERY COORDINATES:
K(P)    >=    HK(X)    NB = 2
HK(X)   <     LK(Y)
F(X)    =     V(Y)
FC      ¬=    V(Y)
BWD(Y)  =     V(X)

Entry Compression - STATE 15 Equivalence,
End Level Processing,
Entry Compression Leaves Y Non-empty The first state transformation of compression on an index level is the movement of entries from Y into X. If Y is not rendered empty, block X is updated to contain a new high key entry.

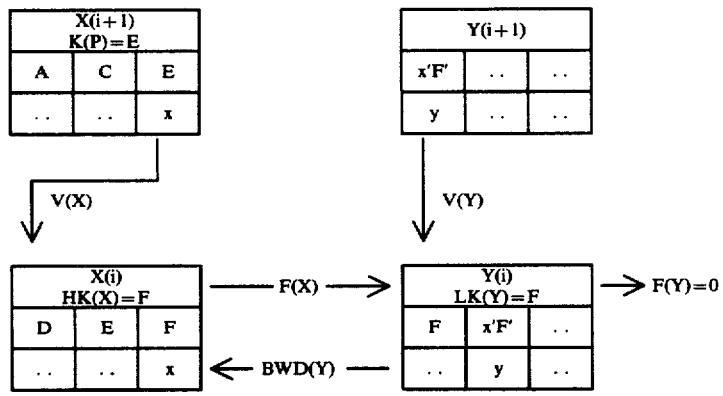

THE STATE 15 RECOVERY COORDINATES:
K(P)    <     HK(X)    NB = 2
HK(X)   ¬<    LK(Y)
F(X)    =     V(Y)
FC      ¬=    V(Y)
BWD(Y)  =     V(X)

Entry Compression - STATE 12 Equivalence
End Level Processing
Parent Entry (P) Update Propagation Compression to produce STATE 15 on an index level requires that the parent entry for X is updated to reflect the new high key of X. Pc(i) is moved upward in the structure and the update is made as part of disruption-adjustment on that level. If this entry update involves the last entry in that block, again, a parent entry update is required. This action in turn may create the STATE 12 condition on the next higher index level, and so on up the index structure.

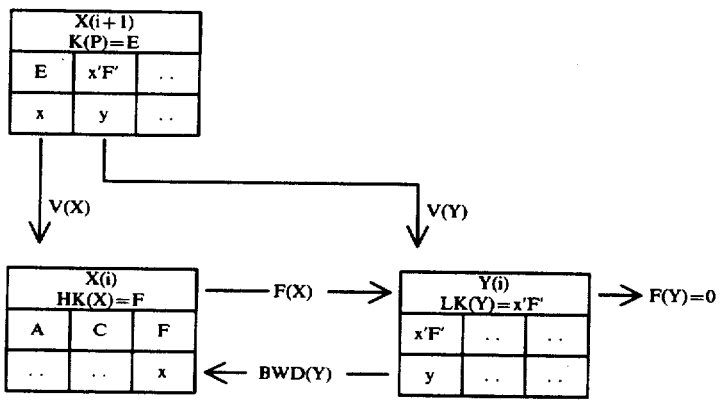

NOTE: For this figure, the parent index level after transforming from STATE 15 is shown on the bottom row.

THE STATE 12 RECOVERY COORDINATES:
```
K(P)     <    HK(X)  NB = 2
HK(X)    <    LK(Y)
F(X)     =    V(Y)
FC       ¬=   V(Y)
BWD(Y)   =    V(X)
```

Entry Compression - STATE 16,
End Level Processing
Parent Entry (P) Update for X Complete The condition on the original compression level after parent entry update is shown below. For the next step of the compression process, the entries shifted from block Y during compression on the original index level must be removed.
Resynchronization begins.

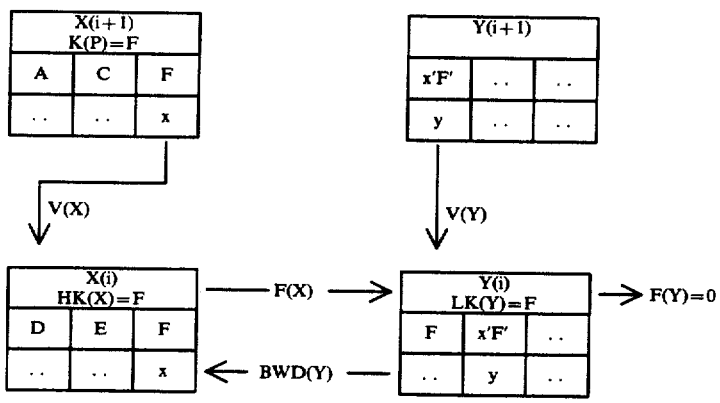

THE STATE 16 RECOVERY COORDINATES:
```
K(P)     >=   HK(X)  NB = 2
HK(X)    ¬<   LK(Y)
F(X)     =    V(Y)
FC       ¬=   V(Y)
BWD(Y)   =    V(X)
```

Entry Compression - Return to STATE 14,
End Level Processing
Shifted Entries Removed From Y The removal from Y of the entries shifted into X brings the original compression level back to steady state.

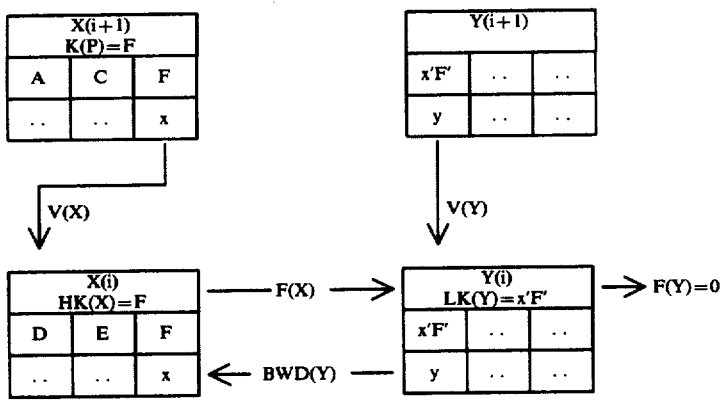

THE STATE 14 RECOVERY COORDINATES:
K(P)    >=   HK(X)  NB = 2
HK(X)   <    LK(Y)
F(X)    =    V(Y)
FC      ¬=   V(Y)
BWD(Y)  =    V(X)

The following states occur when compression on the end of an index level involves the removal of the last block on the level.

Entry-Block Compression - STATE 17,
End Level Processing
Y Emptied

The first state transformation of entry-block compression on an index level is the movement of entries from Y into X. Y is rendered empty, so the forward horizontal access path is also adjusted at the same time block X is written containing the shifted entries.

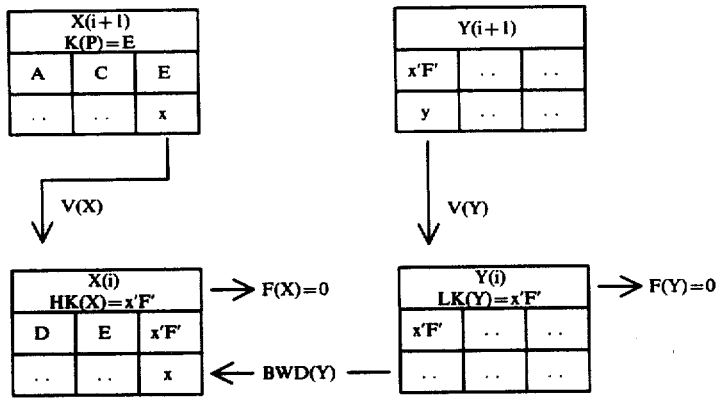

THE STATE 17 RECOVERY COORDINATES:
K(P)    <    HK(X)  NB = 2
HK(X)   ¬<   LK(Y)
F(X)    ¬=   V(Y)
FC      ¬=   V(Y)
BWD(Y)  =    V(X)

Entry-Block Compression - STATE 18,
End Level Processing
Freechain Disruption

* The next state transformation places an emptied Y on the index freechain (FC), saving the old index
  freechain pointer in the freechain shadow field (FCs) of the index profile.

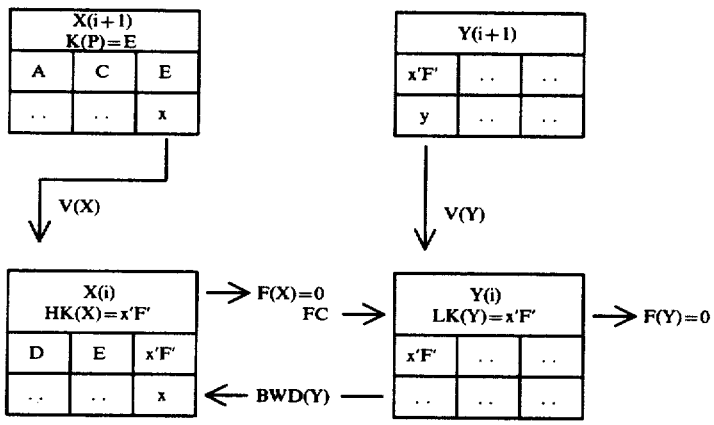

THE STATE 18 RECOVERY COORDINATES:
K(P)      <     HK(X)  NB = 2
HK(X)    ¬<    LK(Y)
F(X)      ¬=    V(Y)
FC         =     V(Y)
BWD(Y)  =     V(X)

Entry-Block Compression - STATE 19,
End Level Processing
Freechain Adjustment

The next state transformation adjusts the freechain continuity by setting the block backward pointer for Y to FCs (the previous head of the freechain).

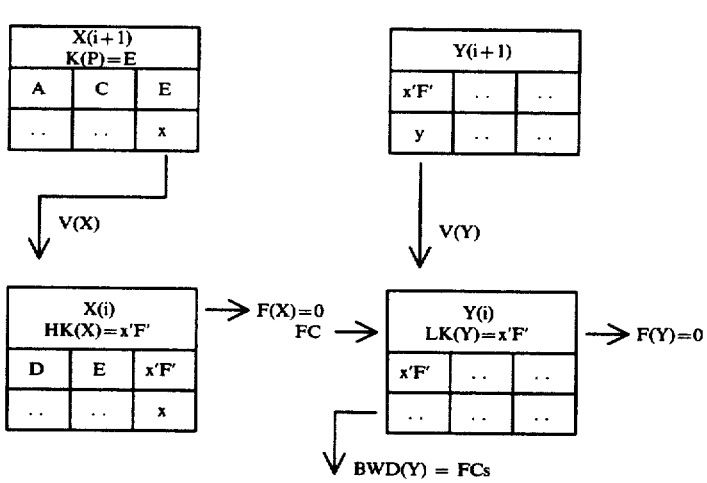

THE STATE 19 RECOVERY COORDINATES:
K(P)      <     HK(X)  NB = 2
HK(X)    ¬<    LK(Y)
F(X)      ¬=    V(Y)
FC         =     V(Y)
BWD(Y)  ¬=    V(X)

Entry-Block Compression - The Completion State (20)
End Level Processing
Parent Entries In Same Block When the parent entries for both X and Y are in the same block, Any parent entry update for a new high key value in X is accomplished simultaneously with the deletion of the parent entry for Y. The entire index level has been processed and the completion state is reached.

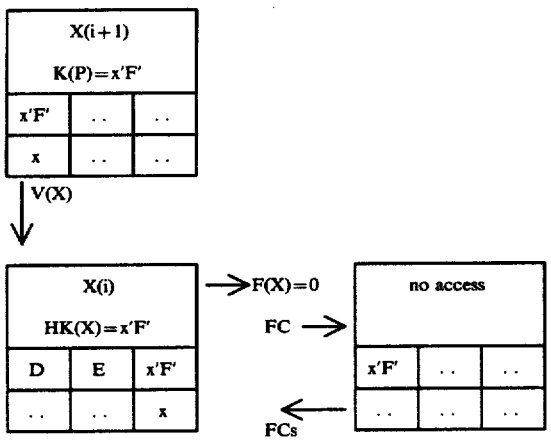

THE STATE 20 RECOVERY COORDINATES:
K(P)    >= HK(X)    NB = 1

Note that when NB = 1, several recovery coordinates become meaningless. In this case, the meaningless recovery coordinates have designated values (for notational consistency):

HK(X)   ¬<   LK(Y)
F(X)    ¬=   V(Y)
FC      ¬=   V(Y)
BWD(Y)  ¬=   V(X)

APEX Level States (i = n)

Note that for APEX level states there are no key values maintained in the index profile pseudo entries. For all APEX level states, the Recovery Coordinate K(P) >= HK(X) is defined to always be true.

STATE 0 - The Steady State
NB > 2
APEX Level Processing

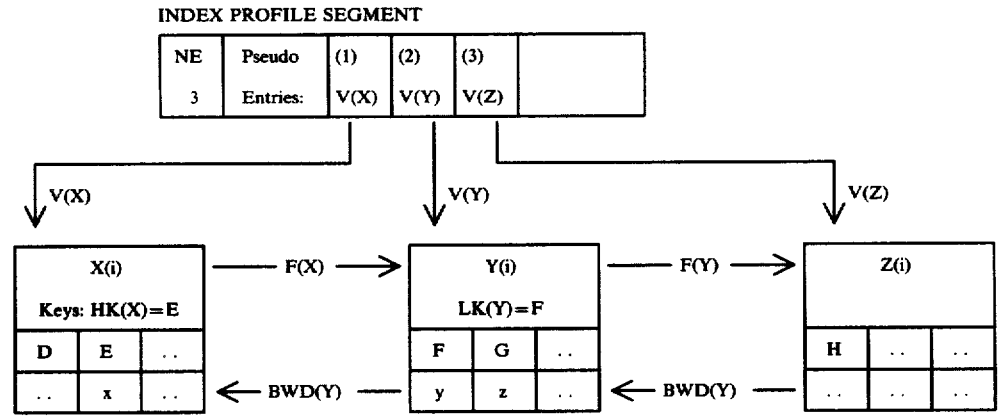

THE STEADY STATE RECOVERY COORDINATES:
K(P)    >=   HK(X)   NB > 2
HK(X)   <    LK(Y)
F(X)    =    V(Y)
FC      ¬=   V(Y)
BWD(Y)  =    V(X)

Before and after each index compression cycle, the APEX level exhibits the steady state.

STATE 3 Equivalence - Entry Compression Leaves Y Non-empty
NB > 2
APEX Level Processing The first state transformation of entry compression on the APEX level is a movement of entries from Y into X. There is no parent level update processing required for the APEX level. For the next step of -continued the compression process, the entries shifted from block Y during compression of the APEX level must be removed. Resynchronization begins.

INDEX PROFILE SEGMENT

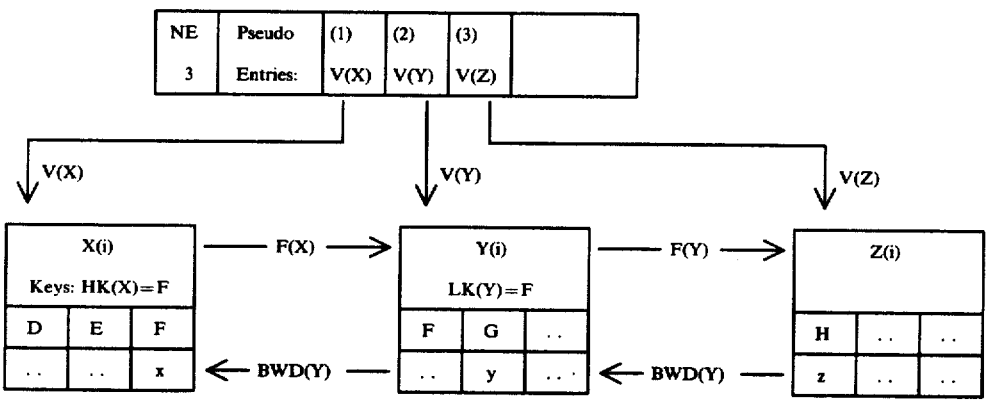

THE STATE 3 RECOVERY COORDINATES:
K(P)    >=   HK(X)   NB > 2
HK(X)   ¬<   LK(Y)
F(X)    =    V(Y)
FC      ¬=   V(Y)
BWD(Y)  =    V(X)

Entry Compression - Return to STATE 0
NB > 2
APEX Level Processing

The removal from Y of the Entries shifted into X brings the APEX level back to steady state.

INDEX PROFILE SEGMENT

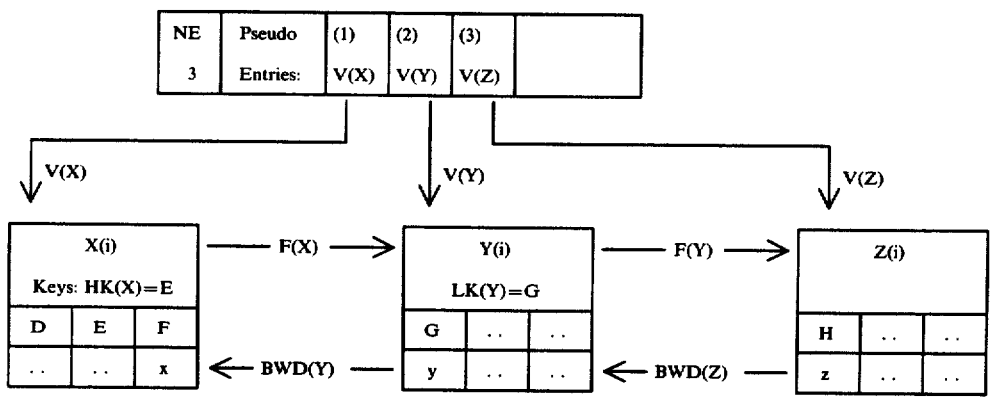

THE STEADY STATE RECOVERY COORDINATES:
K(P)    >=   HK(X)   NB > 2
HK(X)   <    LK(Y)
F(X)    =    V(Y)
FC      ¬=   V(Y)
BWD(Y)  =    V(X)

The following states occur when compression on the APEX level involves the removal a block from the index structure:

Block Compression - STATE 4 Equivalence,
Y Initially Empty
NB > 2
APEX Level Processing The first state transformation of block compression on the APEX level is the removal of block Y from the forward horizontal access path of the index.

INDEX PROFILE SEGMENT

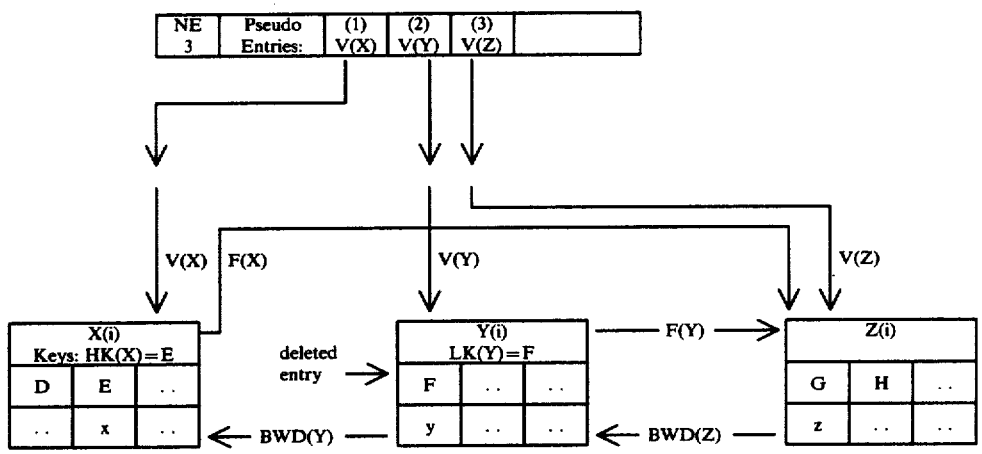

THE STATE 4 RECOVERY COORDINATES:
```
K(P)    >=  HK(X)    NB > 2
HK(X)    <  LK(Y)
F(X)    ¬=  V(Y)
FC      ¬=  V(Y)
BWD(Y)   =  V(X)
```

Block Compression - STATE 5 Equivalence, Freechain Disruption NB > 2 APEX Level Processing The next state transformation places an empty Y on the index freechain (FC), saving the old index freechain pointer in the freechain shadow field (FCs) of the index profile.

INDEX PROFILE SEGMENT

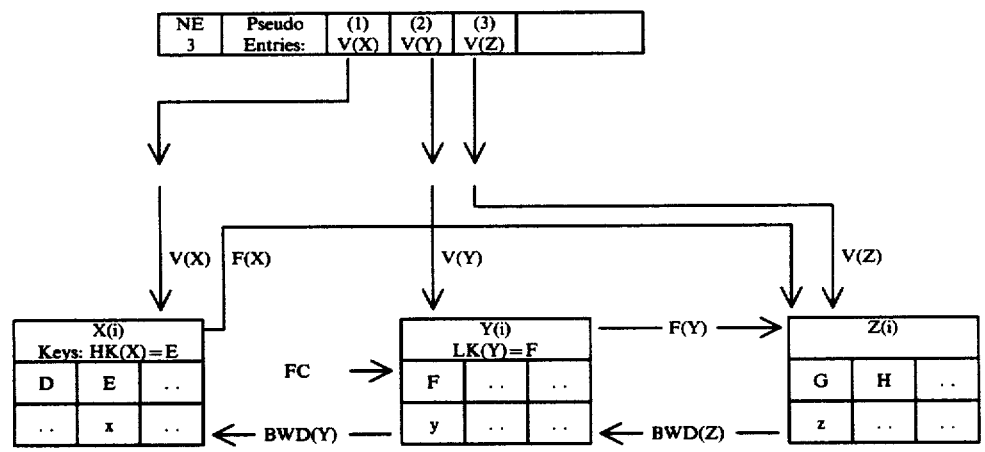

THE STATE 5 RECOVERY COORDINATES:
```
K(P)    >=  HK(X)    NB > 2
HK(X)    <  LK(Y)
F(X)    ¬=  V(Y)
FC       =  V(Y)
BWD(Y)   =  V(X)
```

Block Compression - STATE 6 Equivalence,
Freechain Adjustment
NB > 2
APEX Level Processing The next state transformation adjusts the freechain continuity by setting the block backward pointer for Y to FCs (the previous head of the freechain).

INDEX PROFILE SEGMENT

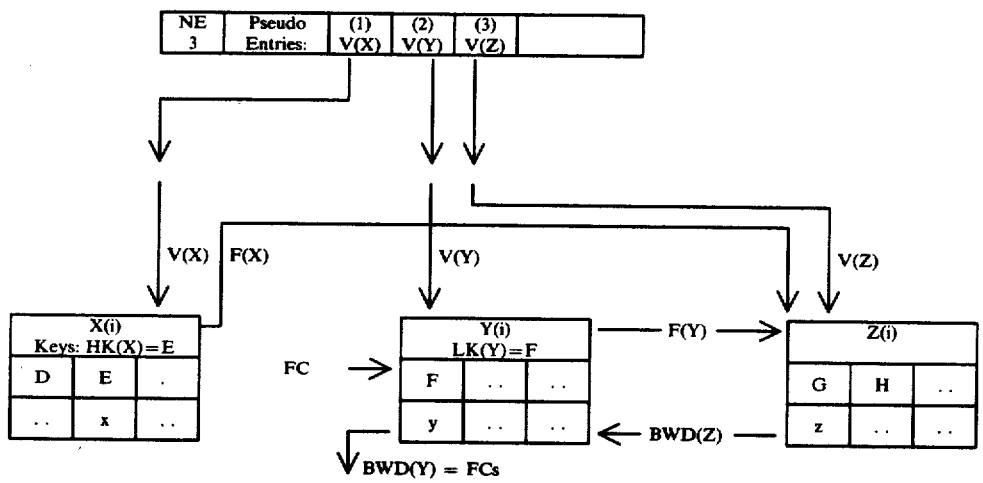

THE STATE 6 RECOVERY COORDINATES:
K(P)    >=  HK(X)    NB > 2
HK(X)    <  LK(Y)
F(X)    ¬=  V(Y)
FC      =   V(Y)
BWD(Y)  ¬=  V(X)

Block Compression - State 7 Equivalence,
Parent Entry Removed
NB > 2
APEX Level Processing The next state transformation deletes the parent entry for Y from the index profile. This state is produced only when there are initially more than three index blocks at the APEX level.

INDEX PROFILE SEGMENT

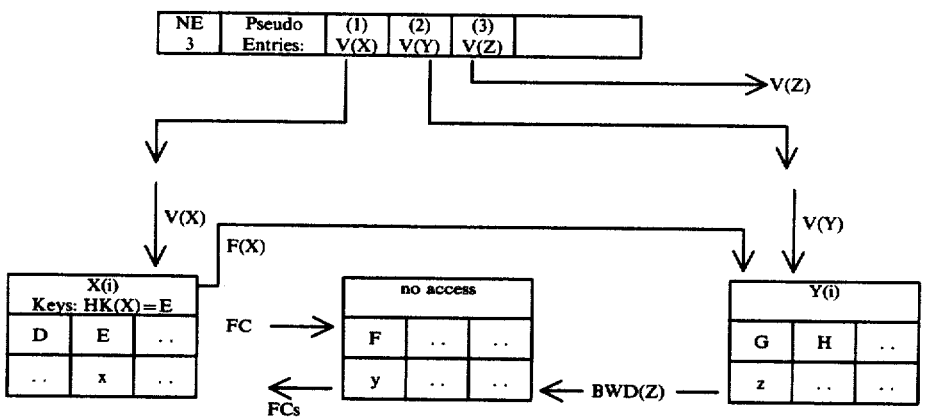

THE STATE 7 RECOVERY COORDINATES:
K(P)    >=  HK(X)    NB > 2
HK(X)    <  LK(Y)
F(X)    =   V(Y)
FC      ¬=  V(Y)
BWD(Y)  ¬=  V(X)

Block Compression - STATE 13 Equivalence,
Parent Entry Removed
End level Approach (NB reduced to 2)
APEX Level Processing When the STATE 7 condition would normally occur, but the deletion of the parent entry for block (Y) from the index profile causes a reduction in NB, End Level processing is imminent. This condition is denoted by STATE 13.

INDEX PROFILE SEGMENT

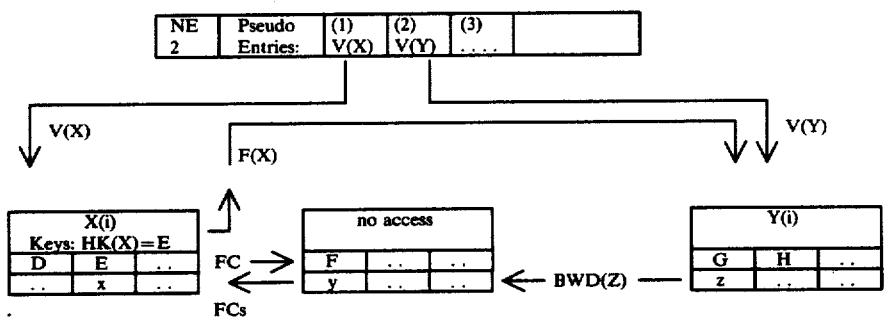

THE STATE 13 RECOVERY COORDINATES:
K(P)     >=    HK(X)   NB = 2
HK(X)    <     LK(Y)
F(X)     =     V(Y)
FC       ¬=    V(Y)
BWD(Y)   ¬=    V(X)

Block Compression - Return to STATE 0,
Old Y Removed From Backward Horizontal Access Path
NB > 2
APEX Level Processing This transformation removes the freechained block from the backward horizontal access path by updating the backward block pointer of the new Y block, resuming the steady state condition.

INDEX PROFILE SEGMENT

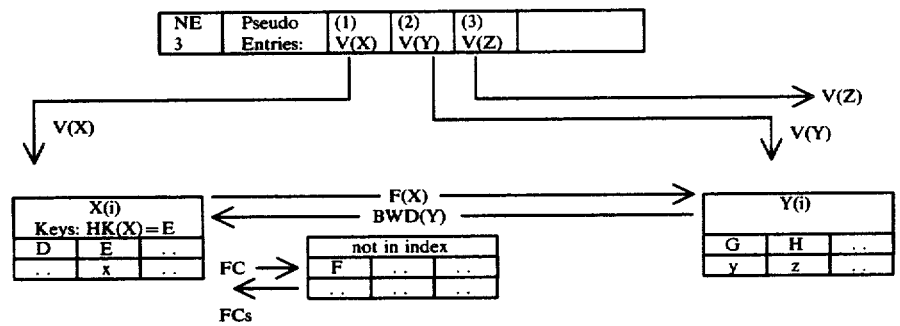

THE STEADY STATE RECOVERY COORDINATES:
K(P)     >=    HK(X)   NB > 2
HK(X)    <     LK(Y)
F(X)     =     V(Y)
FC       ¬=    V(Y)
BWD(Y)   =     V(X)

Block Compression - STATE 14 Equivalence,
The End Level Steady State (NB reduced to 2)
APEX Level Processing The transformation to remove the freechained block from the backward horizontal access path, produces STATE 14, a steady state condition, whenever the number of blocks (NB) is reduced to two.

INDEX PROFILE SEGMENT

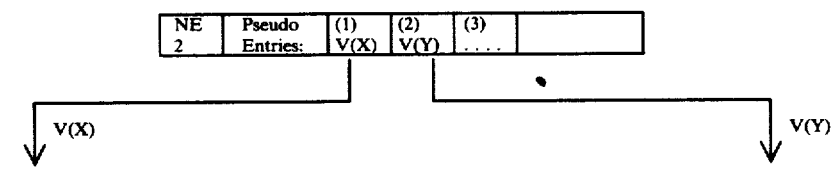

-continued

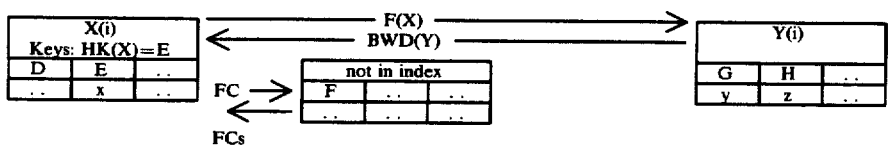

THE STATE 14 RECOVERY COORDINATES:
K(P)     >=    HK(X)  NB = 2
HK(X)    <     LK(Y)
F(X)     =     V(Y)
FC       ¬=    V(Y)
BWD(Y)   =     V(X)

Entry-Block Compression - STATE 21, Y Emptied
NB > 2
APEX Level Processing

The first state transformation of entry-block compression on the APEX level is the movement of entries from Y into X. Y is rendered empty, so the forward horizontal access path is also adjusted at the same time block X is written containing the shifted entries.

INDEX PROFILE SEGMENT

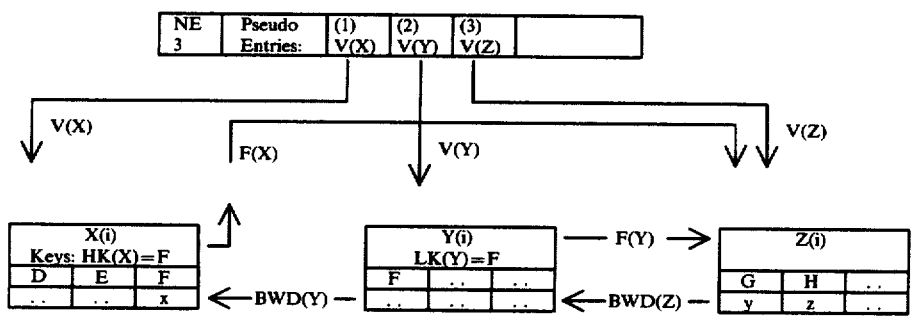

THE STATE 21 RECOVERY COORDINATES:
K(P)     >=    HK(X)  NB > 2
HK(X)    ¬<    LK(Y)
F(X)     ¬=    V(Y)
FC       ¬=    V(Y)
BWD(Y)   =     V(X)

Entry-Block Compression - STATE 22,
Freechain Disruption
NB > 2
APEX Level Processing The next state transformation places an emptied Y on the index freechain (FC), saving the old index freechain pointer in the freechain shadow field (FCs) of the index profile.

INDEX PROFILE SEGMENT

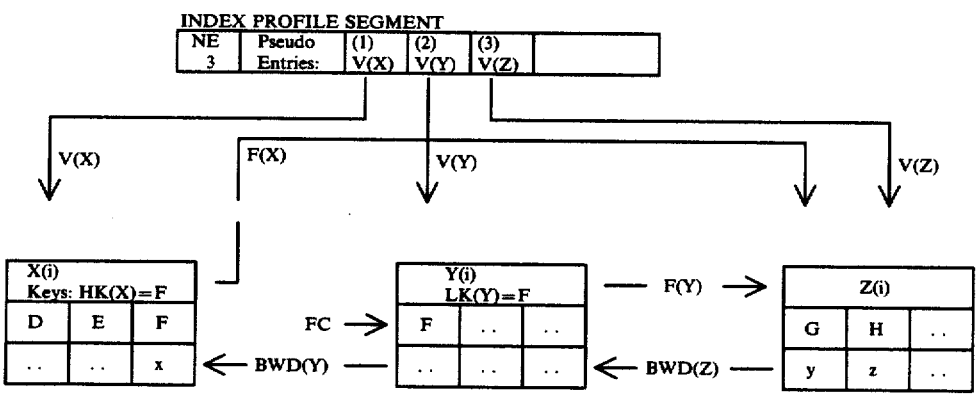

THE STATE 22 RECOVERY COORDINATES:
K(P)     >=    HK(X)     NB > 2
HK(X)    ¬<    LK(Y)
F(X)     ¬=    V(Y)

```
FC        =  V(Y)
BWD(Y)    =  V(X)
```

Entry-Block Compression - STATE 11 Equivalence,
Freechain Adjustment
NB > 2
APEX Level Processing The next state transformation adjusts the freechain continuity by setting the block backward pointer for Y to FCs (the previous head of the freechain).

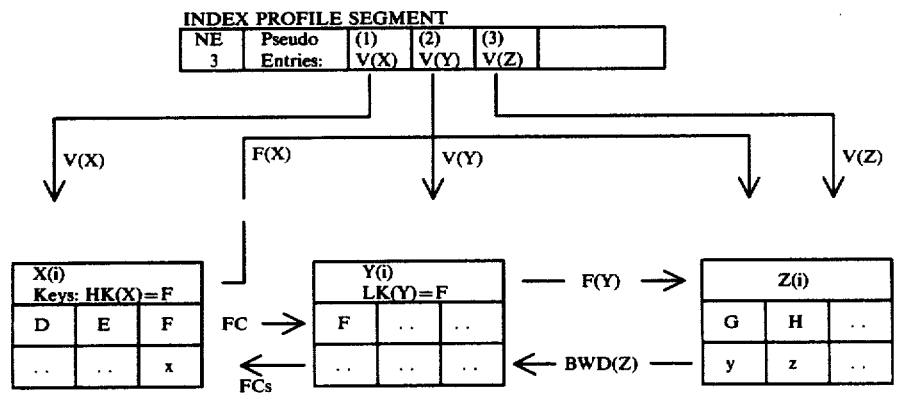

THE STATE 11 RECOVERY COORDINATES:
```
K(P)      >=  HK(X)      NB > 2
HK(X)     ¬<  LK(Y)
F(X)      ¬=  V(Y)
F.C       =   V(Y)
BWD(Y)    ¬=  V(X)
```

Entry-Block Compression - STATE 7 Equivalence,
NB > 2
APEX Level Processing

The next state transformation involves the removal of the parent entry for block Y from the index profile. This state is produced only when there are more than three blocks at the APEX level. Otherwise, when NB is reduced, STATE 13 would be produced. Resynchronization begins.

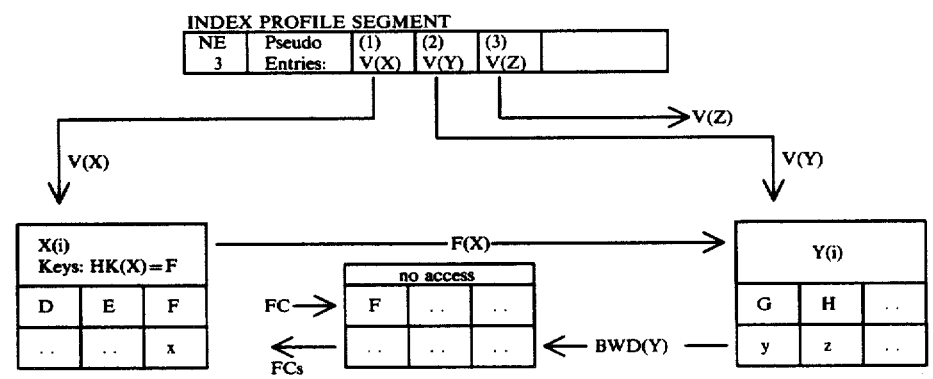

THE STATE 7 RECOVERY COORDINATES:
```
K(P)      >=  HK(X)      NB > 2
HK(X)     >   LK(Y)
F(X)      =   V(Y)
FC        ¬=  V(Y)
BWD(Y)    ¬=  V(X)
```

Entry-Block Compression - Return to STATE 0,
Y Removed From Backward Horizontal Access Path
NB > 2
APEX Level Processing -continued This transformation removes the freechained block from the backward horizontal access path by updating the backward block pointer of the new Y block, resuming the steady state condition.

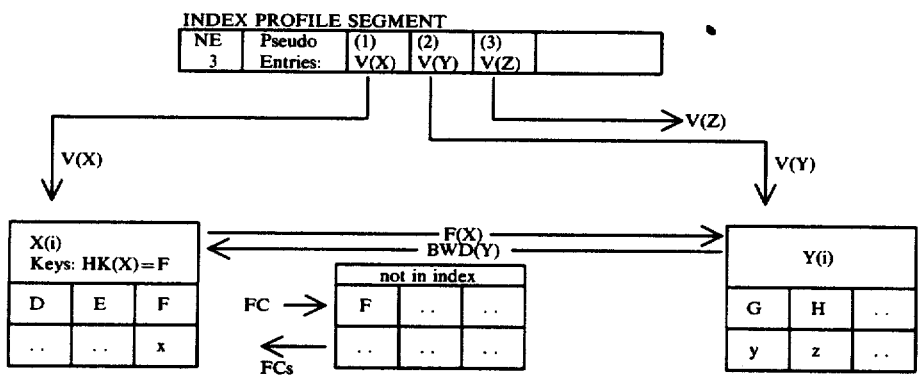

THE STEADY STATE RECOVERY COORDINATES:
```
K(P)     >=  HK(X)    NB > 2
HK(X)     <  LK(Y)
F(X)      =  V(Y)
FC       ¬=  V(Y)
BWD(Y)    =  V(X)
```

Entry-Block Compression - STATE 14 Equivalence,
The End Level Steady State (NB reduced to 2)
APEX Level Processing
A reduction of NB to two will result in STATE 14, a steady state condition for End Level processing.

INDEX PROFILE SEGMENT

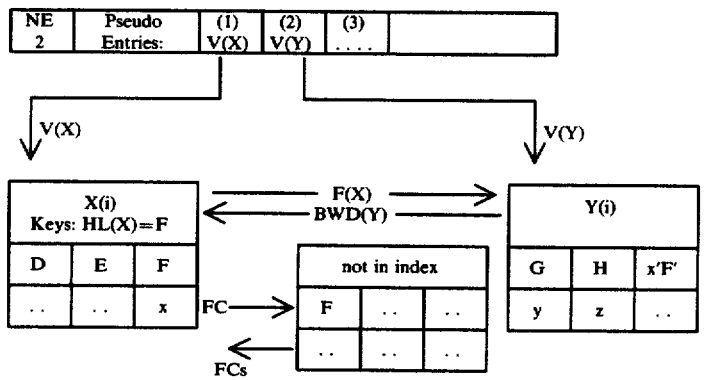

THE STATE 14 RECOVERY COORDINATES:
```
K(P)     >=  HK(X)  NB = 2
HK(X)     <  LK(Y)

F(X)      =  V(Y)
FC       ¬=  V(Y)
BWD(Y)    =  V(X)
```

The following figures describe End Level processing for the APEX level.

STATE 14 - The steady State,
End Level Processing (NB = 2)
APEX Level Processing

INDEX PROFILE SEGMENT

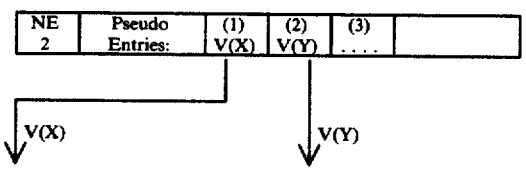

-continued

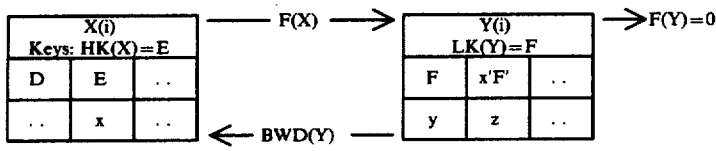

THE STATE 14 RECOVERY COORDINATES:
```
K(P)     >=   HK(X)  NB = 2
HK(X)    <    LK(Y)
F(X)     =    V(Y)
FC       ¬=   V(Y)
BWD(Y)   =    V(X)
```

Entry Compression - STATE 16 Equivalence,
End Level Processing (NB = 2)
APEX Level Processing
Entry Compression Leaves Y Non-empty The first state transformation of compression on the APEX level is the movement of entries from Y to X. If Y is not rendered empty, block X is updated to contain a new high key entry. Since there is no parent level update for the APEX level, the next step will involve the removal of the entries shifted from block Y. Resynchronization begins.

INDEX PROFILE SEGMENT

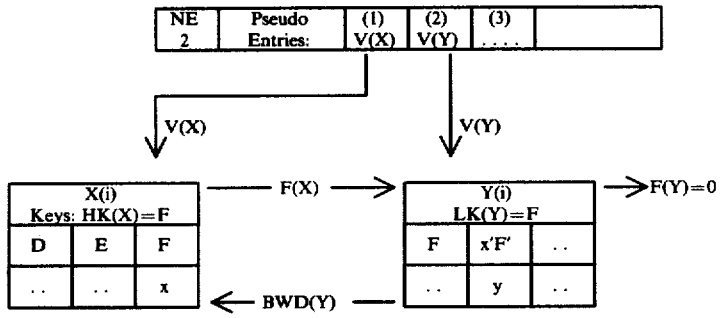

THE STATE 16 RECOVERY COORDINATES:
```
K(P)     >=   HK(X)  NB = 2
HK(X)    ¬<   LK(Y)
F(X)     =    V(Y)
FC       ¬=   V(Y)
BWD(Y)   =    V(X)
```

Entry Compression - Return to STATE 14,
Shifted Entries Removed From Y
End Level Processing (NB = 2)
APEX Level Processing The removal from Y of the entries shifted into X brings the APEX compression level back to steady state.

INDEX PROFILE SEGMENT

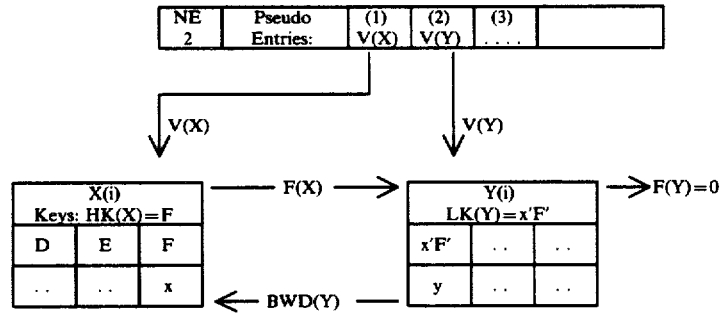

THE STATE 14 RECOVERY COORDINATES:
```
K(P)     >=   HK(X)  NB = 2
HK(X)    <    LK(Y)
F(X)     =    V(Y)
```

```
FC       ¬=   V(Y)
BWD(Y)   =    V(X)
```

Entry-Block Compression - STATE 23,
Y Emptied
End Level Processing (NB = 2)
APEX Level Processing The first state transformation of entry-block compression on the APEX level is the movement of entries from Y into X. Y is rendered empty, so the forward horizontal access path is also adjusted at the same time block is X written containing the shifted entries.

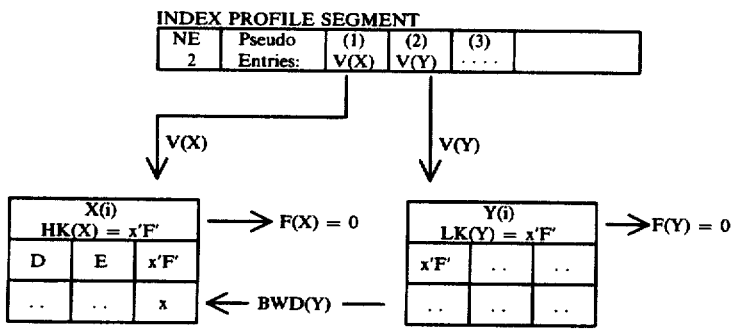

THE STATE 23 RECOVERY COORDINATES:

```
K(P)     >=   HK(X)  NB = 2
HK(X)    ¬>   LK(Y)
F(X)     ¬=   V(Y)
FC       ¬=   V(Y)
BWD(Y)   =    V(X)
```

Entry-Block Compression - STATE 24,
Freechain Disruption
End Level Processing (NB = 2)
APEX Level Processing The next state transformation places an emptied Y on the index freechain (FC), saving the old index freechain pointer in the freechain shadow field (FCs) of the index profile.

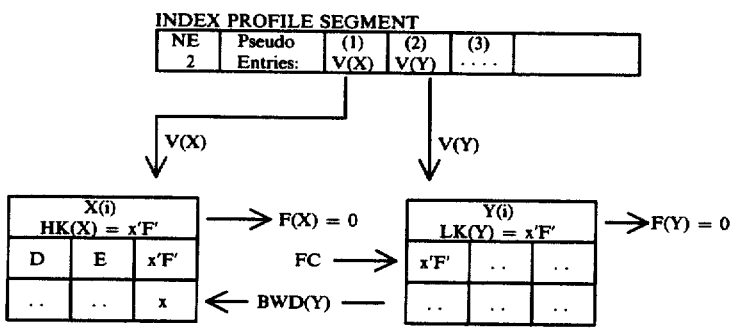

THE STATE 24 RECOVERY COORDINATES:

```
K(P)     >=   HK(X)  NB = 2
HK(X)    ¬<   LK(Y)
F(X)     ¬=   V(Y)
FC       =    V(Y)
BWD(Y)   =    V(X)
```

Entry-Block Compression - STATE 25,
Freechain Adjustment
End Level Processing (NB = 2)
APEX Level Processing The next state transformation adjusts the freechain continuity by setting the block backward pointer for Y to FCs (the previous head of the freechain).

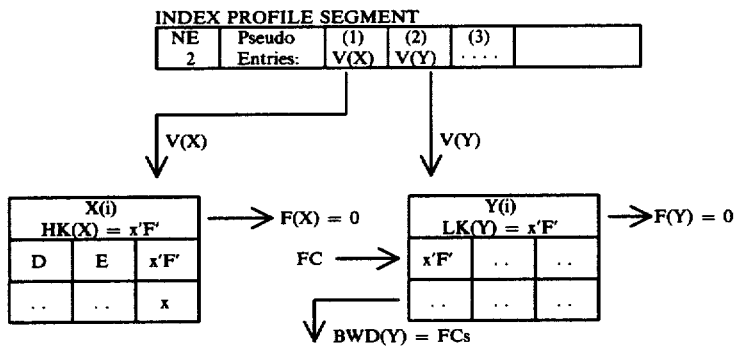

THE STATE 25 RECOVERY COORDINATES:

K(P)     >=   HK(X)  NB = 2
HK(X)    ¬<   LK(Y)
F(X)     ¬=   V(Y)
FC       =    V(Y)
BWD(Y)   ¬=   V(X)

Entry-Block Compression - APEX Level Completion STATE 20,
Parent Entry Removed
End Level Processing
APEX Level Processing The removal of the vertical chaining for the Y APEX level block creates the completion state for APEX level processing.

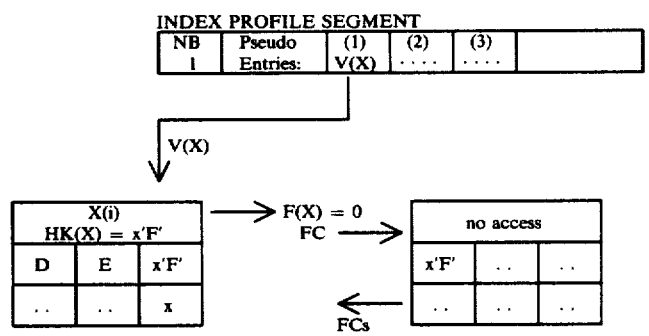

THE STATE 20 RECOVERY COORDINATES:

K(P)     >=   HK(X)  NB = 1

Note that when NB = 1, several recovery coordinates become meaningless. In this case, the meaningless recovery coordinates have designated values (for notational consistency):

HK(X)    ¬<   LK(Y)
F(X)     ¬=   V(Y)
FC       ¬=   V(Y)
BWD(Y)   ¬=   V(X)

Abnormal States

This Section describes the abnormal states which can be encountered during index compression.

The Orphan Index Block

An orphan index block is an index block which cannot be found (directly) via the vertical index access path. Orphan blocks can be created in two ways:
  abnormal termination of index block splitting
  normal access method processing sp Access method recovery procedures must insure that all index entries can be accessed at least via both the forward index access path (for search), and backward index access path (for inserts). This recovery does not include the additional parent entry updates and additional block splits which may sometimes be required to completely chain new index entries into the index such that the vertical index access path is the shortest. (At the index level containing the orphan block, the vertical access path carries the entry search one or more block(s) to the left of the real target block, and a horizontal search on that index level is required to find the orphan.) These orphans can be found on any indexing level.

Orphan blocks are created by normal access method processing for the insert of non-unique keyed entries where upper level entries are only created to address the first (left-most) low level block containing some entries in a set of non-unique keyed entries (non-unique keys can only exist on the lowest indexing level and are rendered unique by augmenting the key with an additional field such as a numeric sequence number).

In the next figure, the current parent entry, $x(i+1)$, bears the high key of $X(i)$ before the block split occurred, and the block to the right of $X(i)$ is not referenced on the vertical access path. Note that key D will be found by first following the vertical path to $X(i)$ and then following the forward horizontal path one block to the right. If the orphan block is not a low level index block, then it has child blocks.

Orphan blocks are not processed during index compression, except to recognize them. Since parent entries do not exist for orphan blocks, compression (and reclamation) of these blocks is a simpler process than is normally required and may be accomplished by a variety of methods which may or may not involve a finite state mechanism.

STATE 26 - The Orphan Index Block (NB > 2)

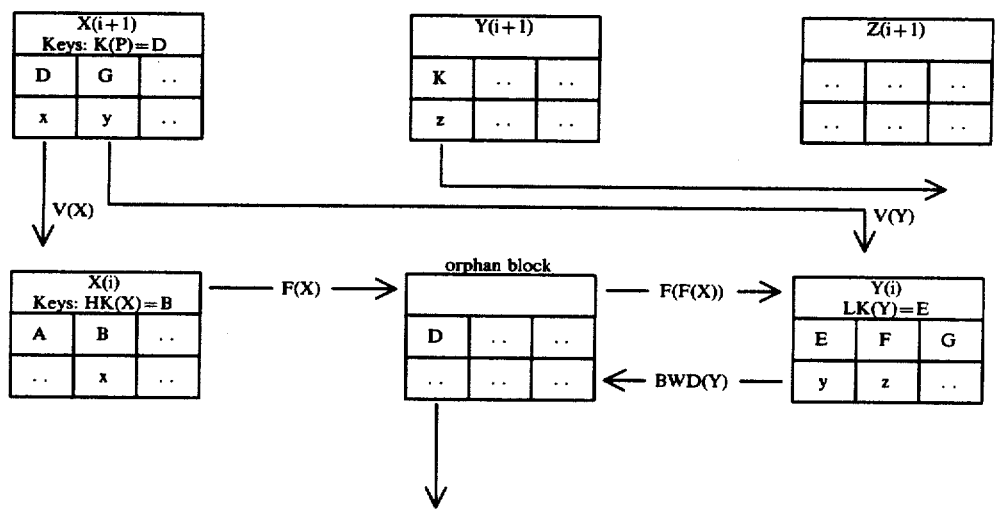

THE STATE 26 RECOVERY COORDINATES:
K(P)      >    HK(X)    NB > 2
HK(X)     <    LK(Y)
F(X)     ¬=    V(Y)
FC       ¬=    V(Y)
BWD(Y)   ¬=    V(X)

STATE 27 - The Orphan Index Block (NB = 2)

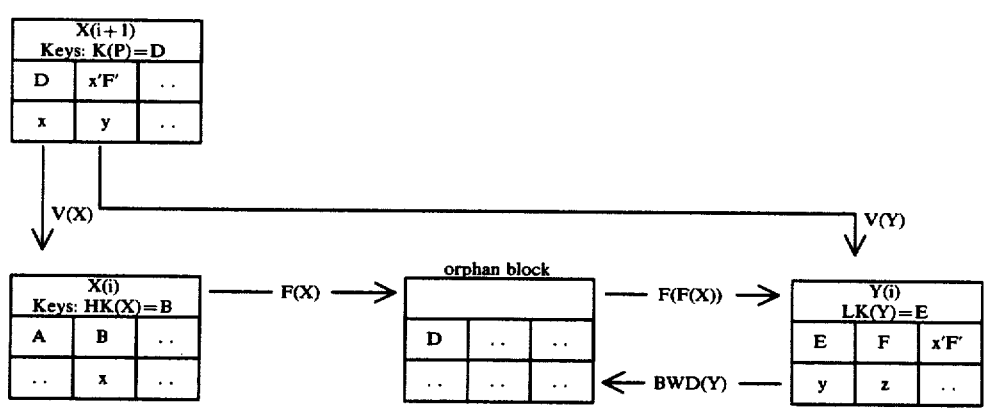

THE STATE 27 RECOVERY COORDINATES:
K(P)      >    HK(X)    NB = 2
HK(X)     <    LK(Y)
F(X)     ¬=    V(Y)
FC       ¬=    V(Y)
BWD(Y)   ¬=    V(X)

The End Level Orphan Index Block (NB = 1)
STATE 20 Equivalence - The Completion State

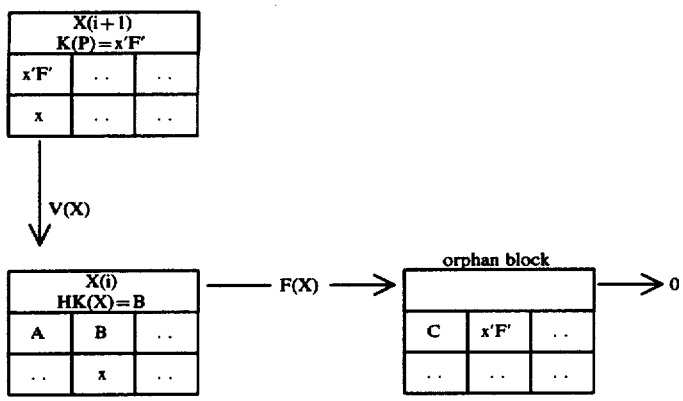

THE STATE 20 RECOVERY COORDINATES:
K(P) > HK(X)  NB = 1

Note that when NB = 1, several recovery coordinates become meaningless. In this case, the meaningless recovery coordinates has designated values (for notational consistency):
HK(X)   ¬<   LK(Y)
F(X)    ¬=   V(Y)
FC      ¬=   V(Y)
BWD(Y)  ¬=   V(X)

The Invalid Backward Horizontal Access Path

Some index insert operations require the receiving index block to be split (generating two blocks) when the block is initially full. An access method failure may occur immediately after the new index block is accessible via the forward horizontal access path. Recovery from such failure is an access method requirement. That is, this condition is not detected during index compression, but is detected and recovered by the access method before the index compression process begins.

The Dangling Freechained Block

When an index block is being put to use to complete a block split operation during insert processing of an index access method, the new block may be simultaneously off the freechain and not in the index (DANGLING) if the new block is obtained from the freechain and the block split process terminates abnormally. This condition is not detected during index compression, but is detected and recovered before the compression process begins. To see how this is accomplished, note the order of operations for the process of reusing a freechained block during the block split process:

Initial State—The freechain is continuous and the first block on the chain is not in the index.

The index profile is written with a new freechain pointer (FC) obtained from the backward block pointer (freechain forward pointer) of the block being removed from the freechain. The freechain shadow field (FCs) of the index profile is updated to point to the block being removed from the freechain. At this point the reclaimed block points backward to the current head of the freechain.

The reclaimed block is written with extra entries from the block split. Forward and backward horizontal index chain pointers are set but the block is not accessable in the index via an index search. At this point the reclaimed block no longer points to the new head of the freechain (via the block backward pointer).

The forward block pointer of the index block being split is updated to point to the reclaimed block. At this point the reclaimed block is accessable via an index search.

The backward block pointer of the block previously to the right of the block being split is updated to point to the reclaimed block. At this point the reclaimed block is accessable both via the forward horizontal access path and via the backward horizontal access path, but not directly via a vertical index search. (The reclaimed block is an orphan block).

An entry to address the reclaimed block is inserted on the next higher index level, establishing a direct vertical access path to the reclaimed block.

Failure correction after operations 1 and 2 consists of using the FCs to obtain the last reclaimed freechain block. If the block backward pointer equals FC, then step 2 of the block reclaim process failed. Otherwise, if the block pointed to by the backward pointer of the reclaimed block does not have a block forward pointer matching FCs, then step 3 failed. Correction consists of putting the partially reclaimed block back onto the index freechain (nullifying the failing block split).

Failure after operation 3 is corrected by performing operation 4.

Failure after operation 4 does not require any corrective action.

Operation 5 is independent of the other operations because it occurs on the next higher indexing level and only after freechain block reclaim is complete on the current indexing level. This operation may involve freechain block reclaim on an upper index level, independently detected.

INTERMEDIATE RESULTS

THE PLACEMENT OF INDEX BLOCKS INTO BUFFERS

Compression restart as well as the possibility of Abnormal states places requirements on the compression process with respect to the placement of index blocks into the buffer pool. Placement of the current block (X) into a buffer is done simply by using the vertical pointer from the level above. That is, initial position on all levels is established by the vertical access path for the lowest possible key value (binary zero).

Placement of the (Y) and (Z) blocks for each level is accomplished using the 'READ WITH BACKWARD CHECK' rule. The (Y) block is read using F(X) (unless F(X)=0). The block's backward pointer is then verified to be equal to the block number of the (X) block. If not, this backward pointer value is used to re-prime the (Y) buffer, and again, this block's backward pointer is then checked. If again this pointer is not equal to the block number of the (X) block, then the block originally pointed to by F(X) is used. Similarly, the (Z) block is read using F(Y), and the backward pointer check is applied, using the (Y) block, rather than the (X) block, as the reference point.

Detecting The Set Of Failure Possibilities

Betweeen every two state conditions on an index level during compression, a disk update occurs (definition of state change). Thus, the set of failure possibilities is illustrated by demonstrating a failure (a permanent process interruption) between every two consecutive states encountered during compression of an index level (and during disruption/adjustment on upper index levels as required). In this section, graphs are provided which illustrate the failure exposure points for an arbitrary cycle of the compression process, with reference to the appropriate case identifier. The case identifiers are explained in section 5.4 (EXPLANATION OF CASES). Note that no failure condition exists which prevents the success of an index search for an arbitrary key value.

Section 5.1 (MIDLEVEL TRANSFORMATION SEQUENCE GRAPHS) applies for the restrictive assumption (NB>2), i.e, (Y) is not the last block on the index level. End Level processing (1< =NB< =2) is shown in section 5.2 (END LEVEL TRANSFORMATION SEQUENCE GRAPHS). APEX level processing (i=n) is shown in section 5.3 (APEX LEVEL TRANSFORMATION SEQUENCE GRAPHS).

The Recursion boundary is used to show those operations which are initiated on the current compression level but are consummated while compressing the parent index level. These operations ultimately produce a state change because of physical updates occuring during compression on the parent index level. Within the recursion boundary are states produced on the parent index level by the specified operations. The states shown outside of the recursion boundary are states produced on the current index (recursion) level by such operations.

Note that it is required to perform the necessary parent level index updates in cases for which parent index level compression will not normally occur.

5.1 MID LEVEL TRANSFORMATION SEQUENCE GRAPHS
ENTRY COMPRESSION TRANSFORMATION SEQUENCE
ORIGINAL COMPRESSION LEVEL

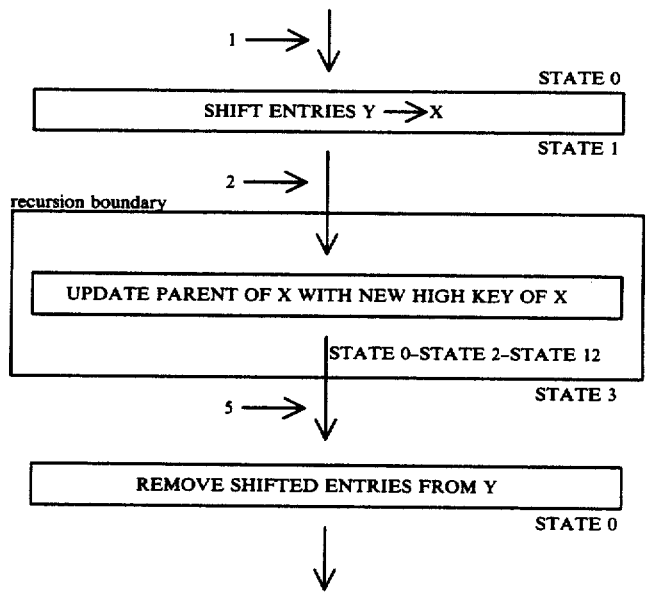

Entry Compression Transformation Sequence
Parent Level Processing

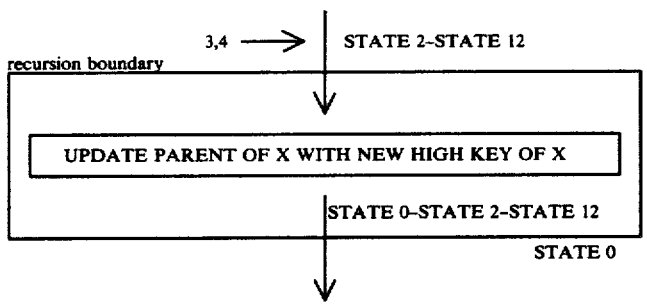
Block Compression Transformation Sequence
Original Compression Level
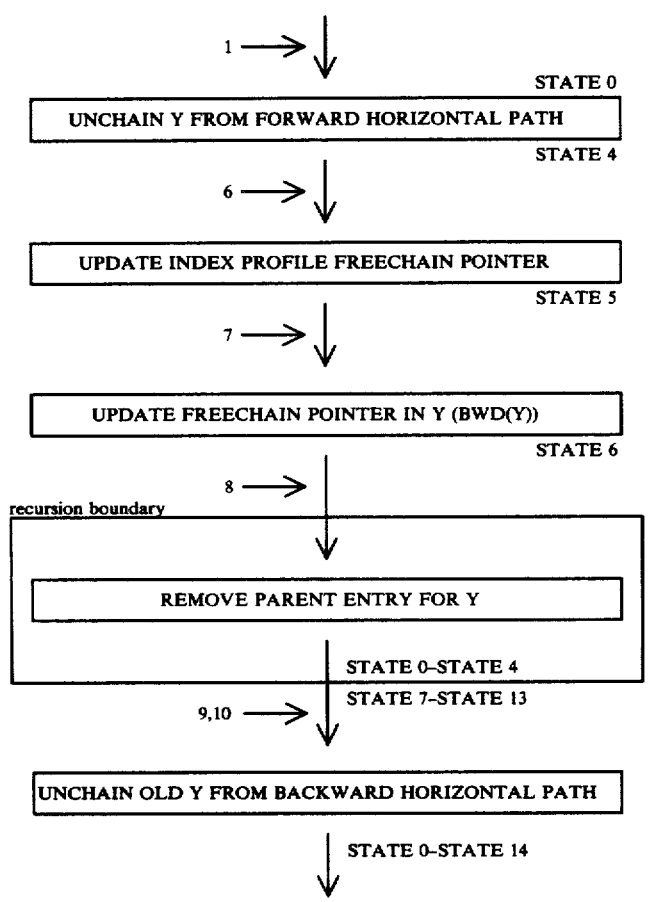
Block Compression Transformation Sequence
Parent Level Processing
Deleting Entry (y) Removes Block (Y)
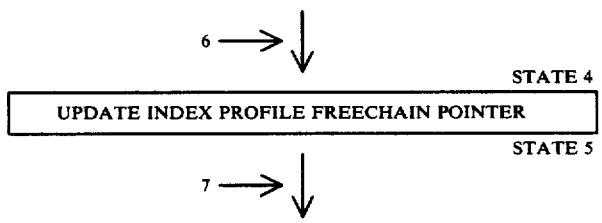

-continued
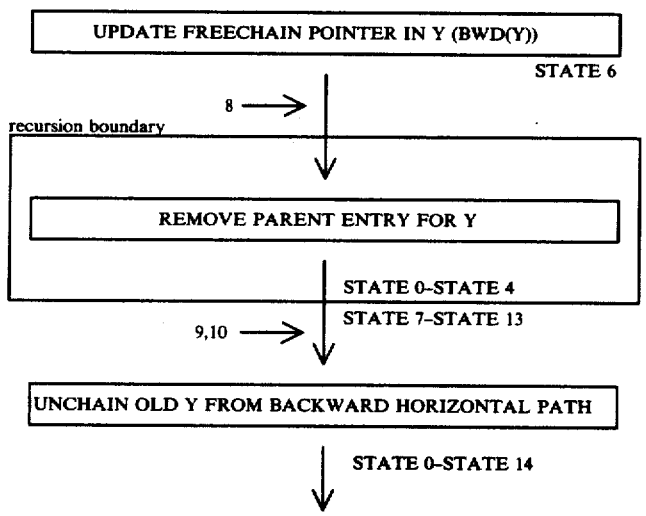
Entry-Block Compression Transformation Sequence
Original Compression Level
Parent Entries For X and Y In The Same Block
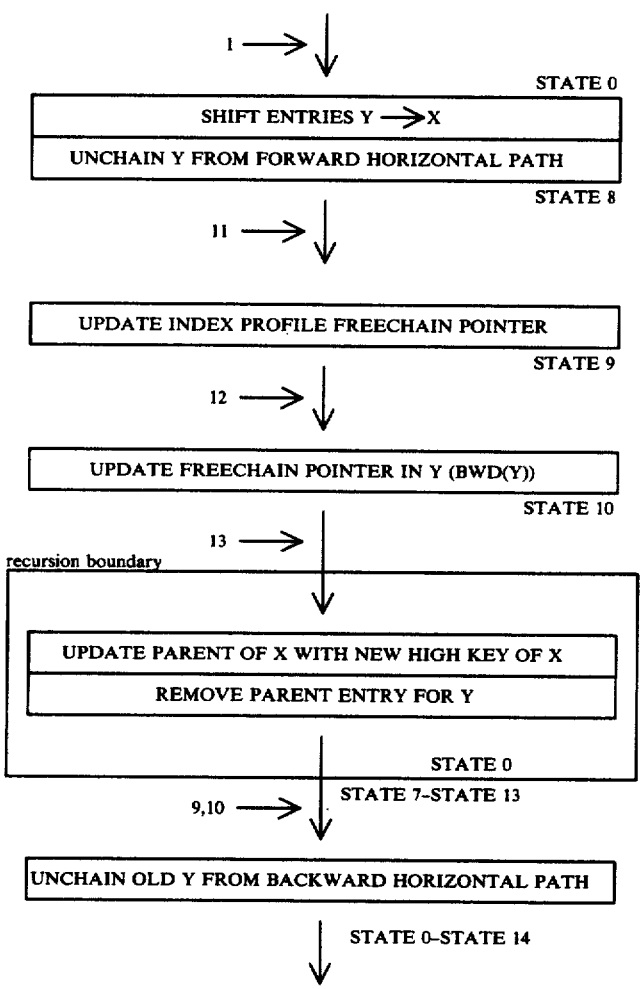
Entry-Block Compression Transformation Sequence
Original Compression Level
Discrete Parent Blocks
Parent For Y Is Not A Singleton Entry

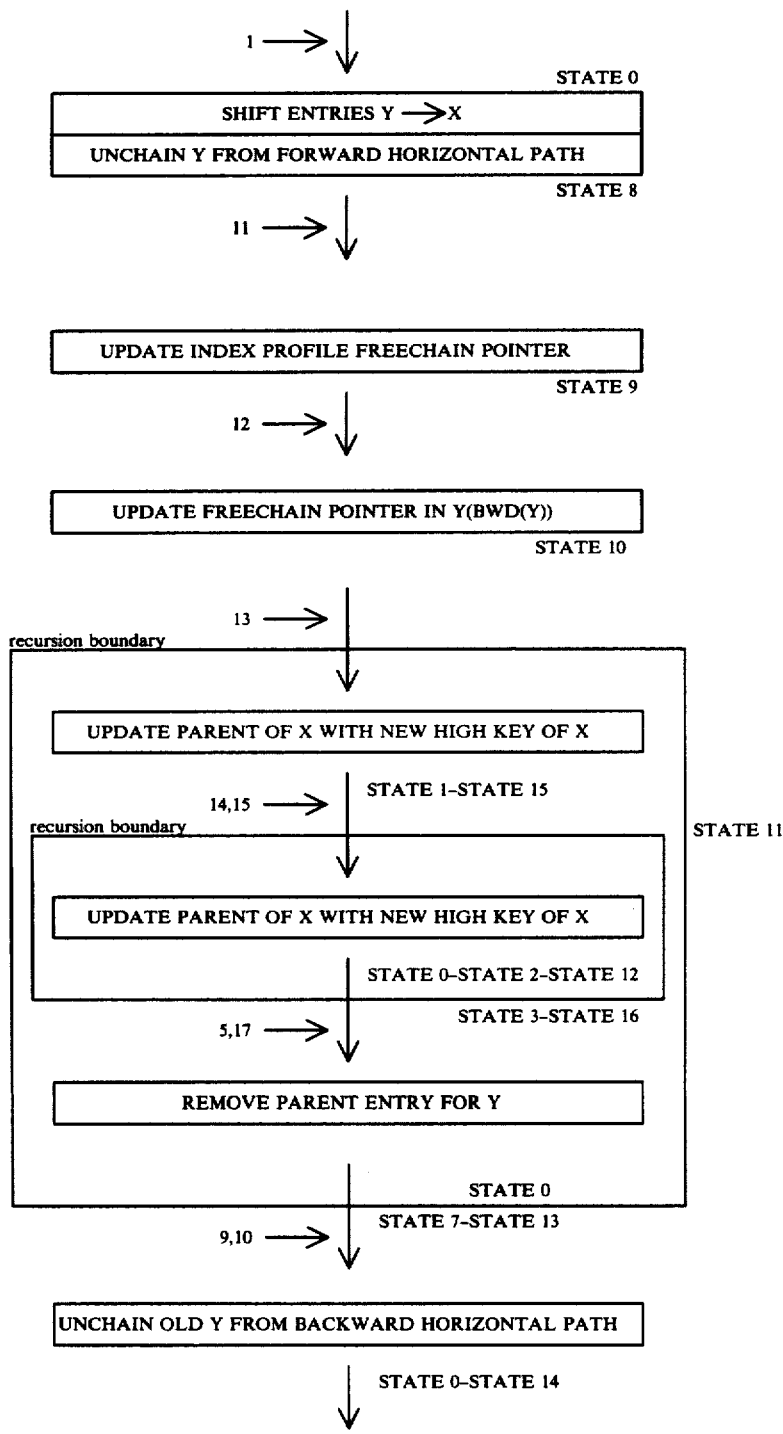
Entry-Block Compression Transformation Sequence
Original Compression Level
Discrete Parent Blocks
Parent For Y Is A Singleton Entry -continued
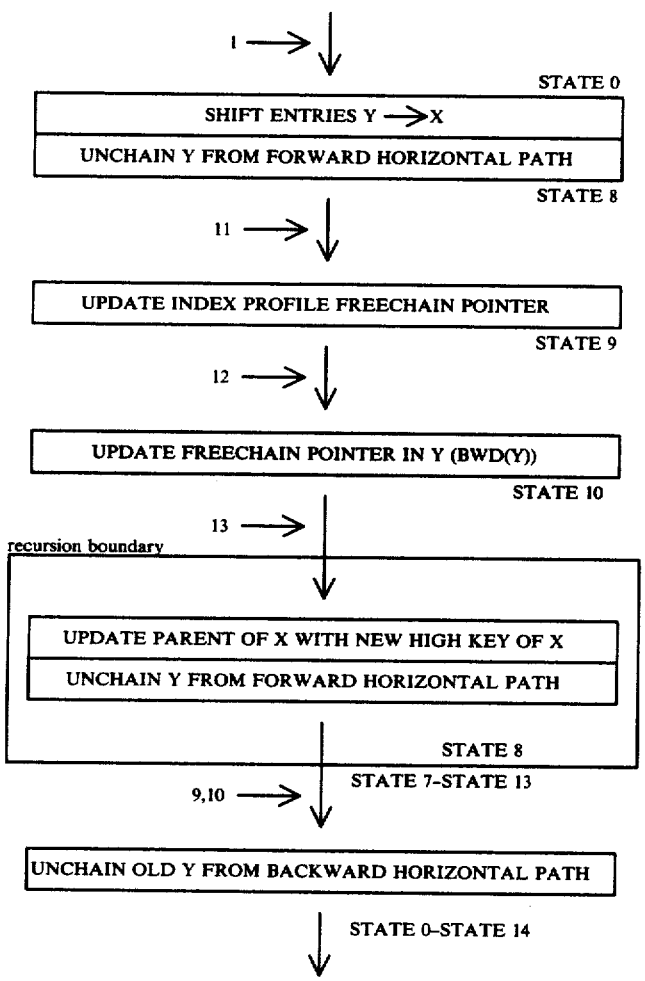
Entry-Block Compression Transformation Sequence
Parent Level Processing
Entry Deletion Removes A Block
Parent Entries For X and Y In The Same Block
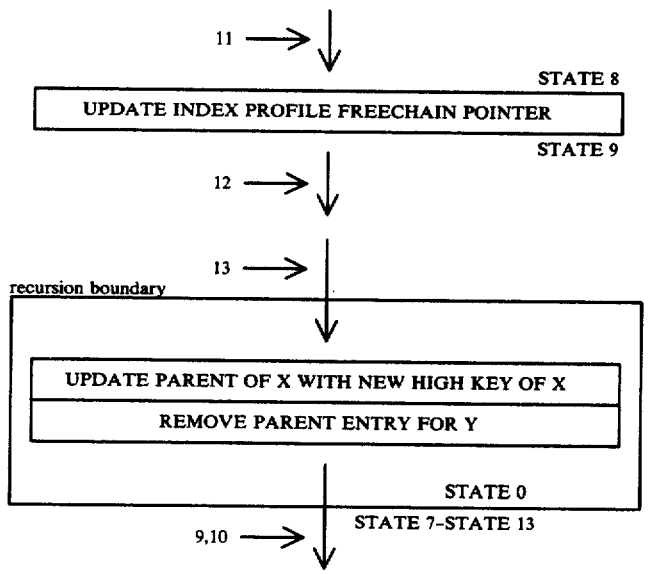

-continued

| UNCHAIN OLD Y FROM BACKWARD HORIZONTAL PATH |

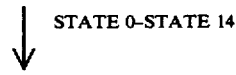  STATE 0–STATE 14

Entry-Block Compression Transformation Sequence
Parent Level Processing
Entry Deletion Removes A Block
Discrete Parent Blocks
Parent For Y Is A Singleton Entry

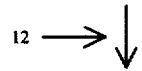
STATE 8

| UPDATE INDEX PROFILE FREECHAIN POINTER |

STATE 9

| UPDATE FREECHAIN POINTER IN Y (BWD(Y)) |

STATE 10

13 ⟶
recursion boundary

| UPDATE PARENT OF X WITH NEW HIGH KEY OF X |
| UNCHAIN PARENT OF Y FROM FORWARD ACCESS PATH |

STATE 8

9,10 ⟶  STATE 7–STATE 13

| UNCHAIN OLD Y FROM BACKWARD HORIZONTAL PATH |

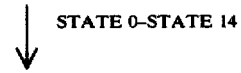  STATE 0–STATE 14

Entry-Block Compression Transformation Sequence
Parent Level Processing
Entry Deletion Removes A Block
Discrete Parent Blocks
Parent For Y Is Not A Singleton Entry

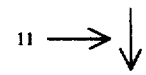
STATE 8

| UPDATE INDEX PROFILE FREECHAIN POINTER |

STATE 9

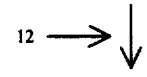

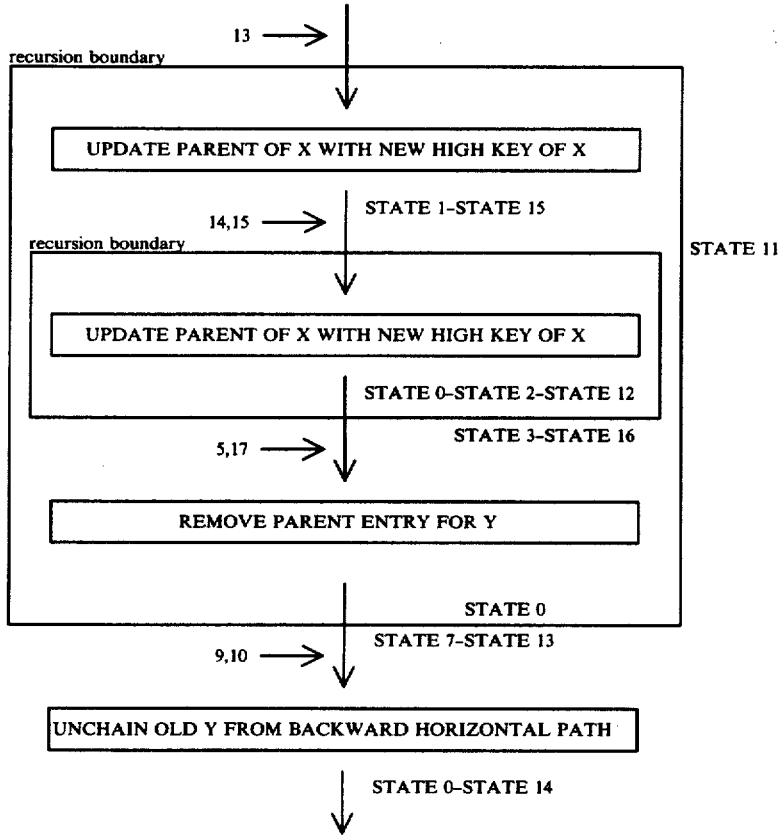
5.2 END LEVEL TRANSFORMATION SEQUENCE GRAPHS
Entry Compression Transformation Sequence
Original Compression Level
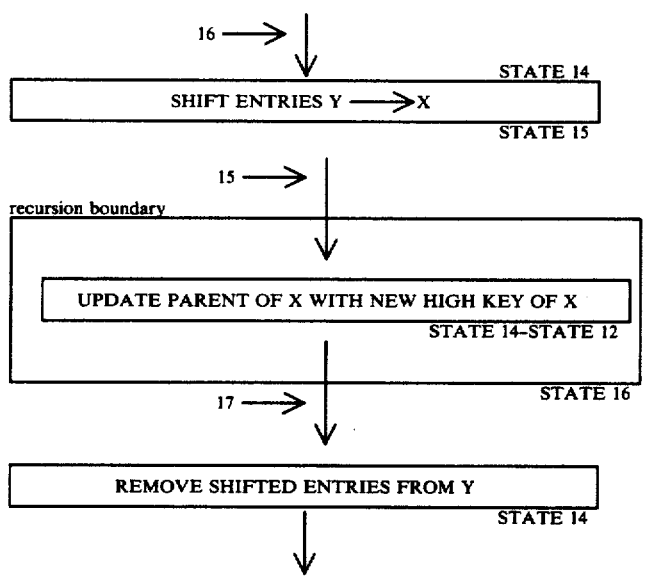
Entry Compression Transformation Sequence
Parent Level Processing -continued
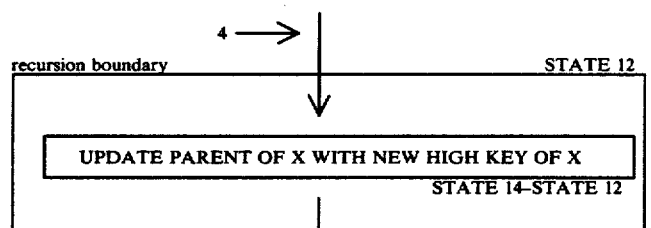
Entry-Block Compression Transformation Sequence
End Level Processing
Original Compression Level
Parent Entries For X and Y In The Same Block
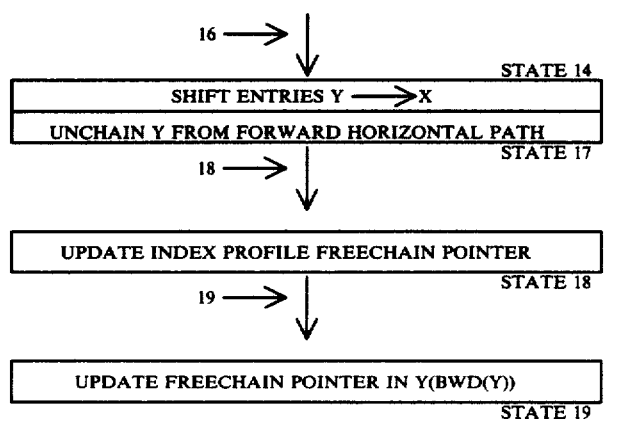
Entry-Block Compression Transformation Sequence
End Level Processing
Original Compression Level
Discrete Parent Blocks
Parent For Y Is A Singleton Entry
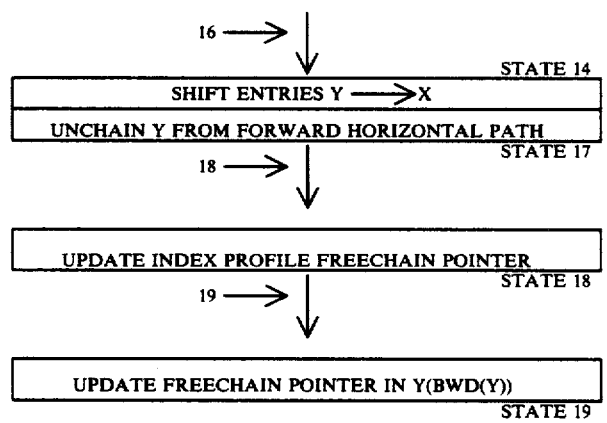

-continued

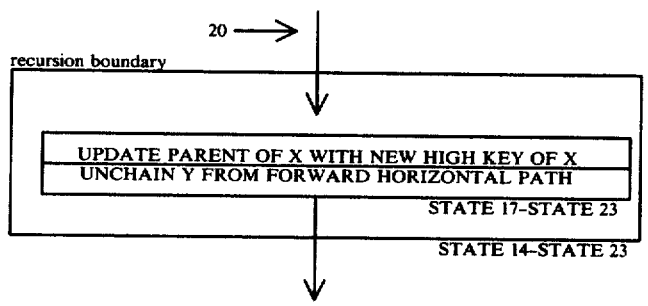

Entry-Block Compression Transformation Sequence
End Level Processing On Present Index Level
Entry Deletion Removes A Block
Parent Entries For X and Y In The Same Block

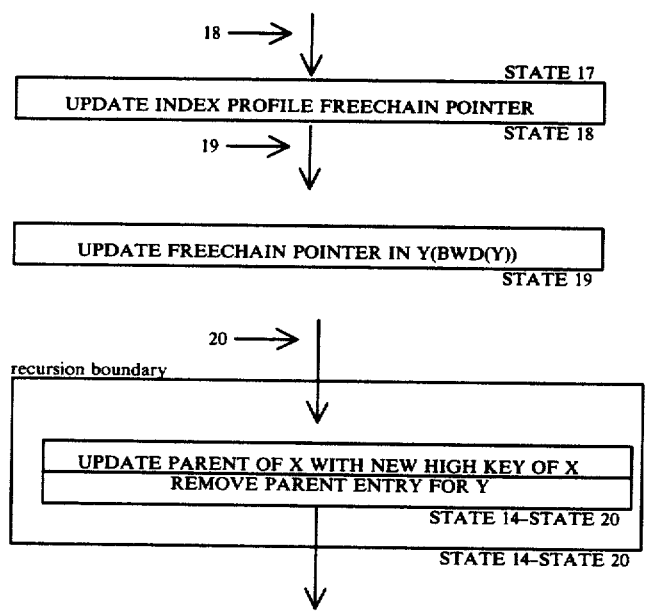

Entry-Block Compression Transformation Sequence
End Level Processing On Parent Index Level
Entry Deletion Removes A Block
Discrete Parent Blocks
Parent For Y Is A Singleton Entry

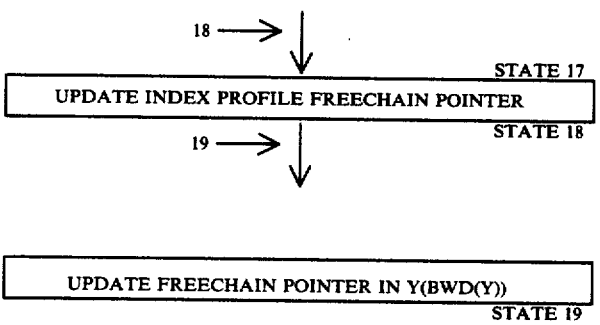

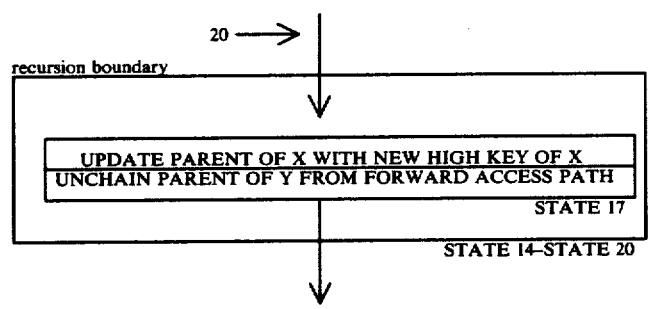

STATE 14–STATE 20

5.3 APEX LEVEL TRANSFORMATION SEQUENCE GRAPHS
Entry Compression Transformation Sequence
APEX Level Processing
Mid Level Processing
Original Compression Level

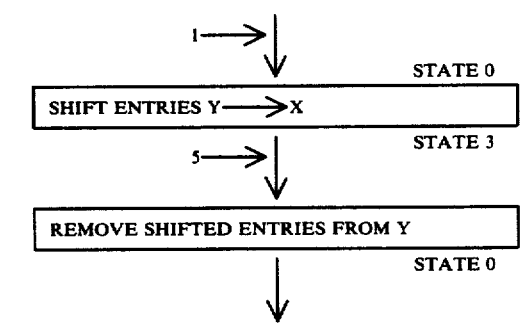

Block Compression Transformation Sequence
APEX Level Processing
Mid Level Processing
Original Compression Level

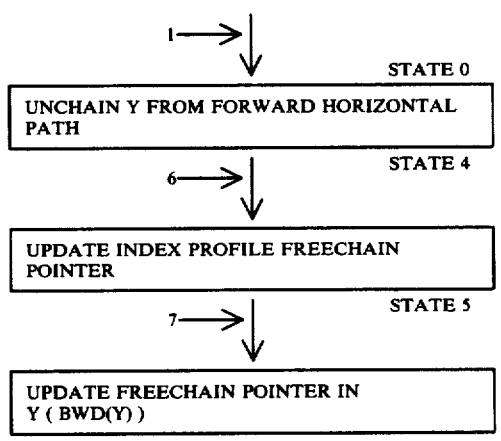

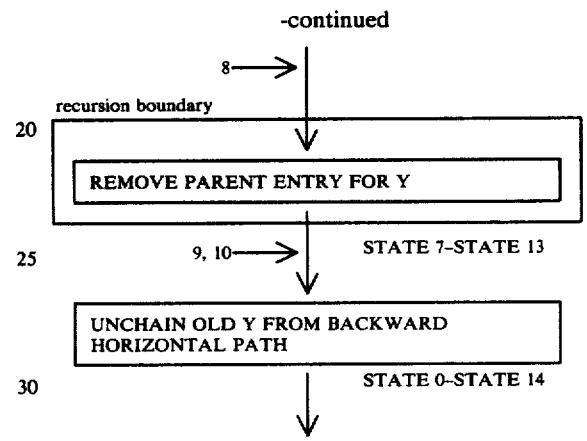

Block Compression Transformation Sequence
Parent Level Processing
Deleting Entry (y) Removes Block (Y)
APEX Level Processing
Mid Level Processing
Original Compression Level

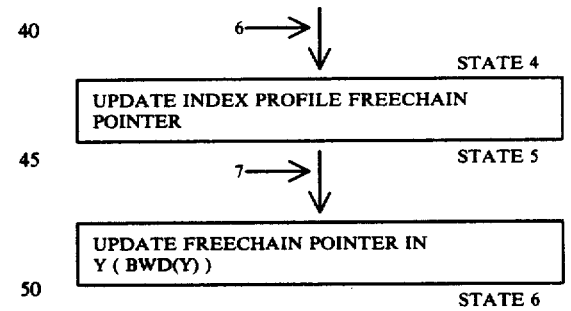

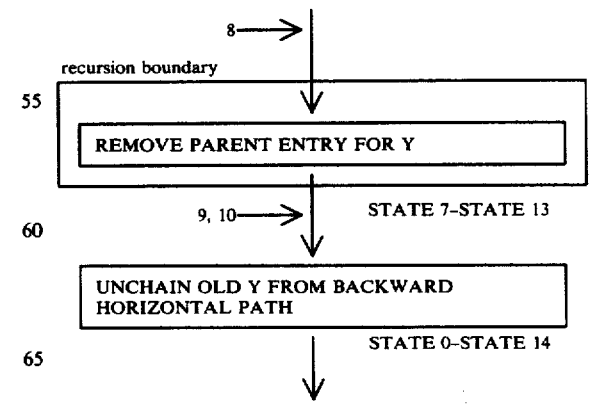

Entry-Block Compression Transformation Sequence

101

-continued
Original Compression Level
APEX Level Processing
Mid Level Processing

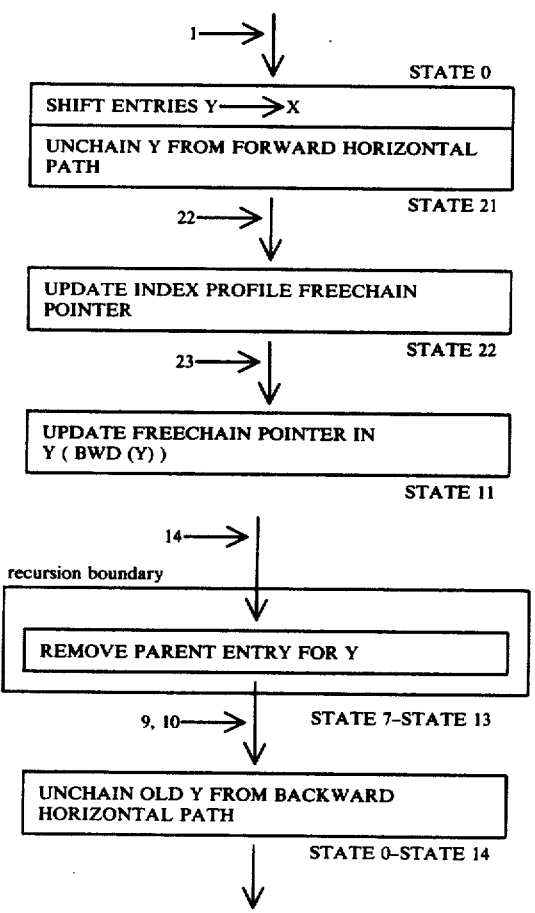

Entry Compression Transformation Sequence
APEX Level Processing
End Level Processing
Original Compression Level Entry-Block Compression Transformation Sequence
APEX Level Processing
End Level Processing

102

-continued
Original Compression Level

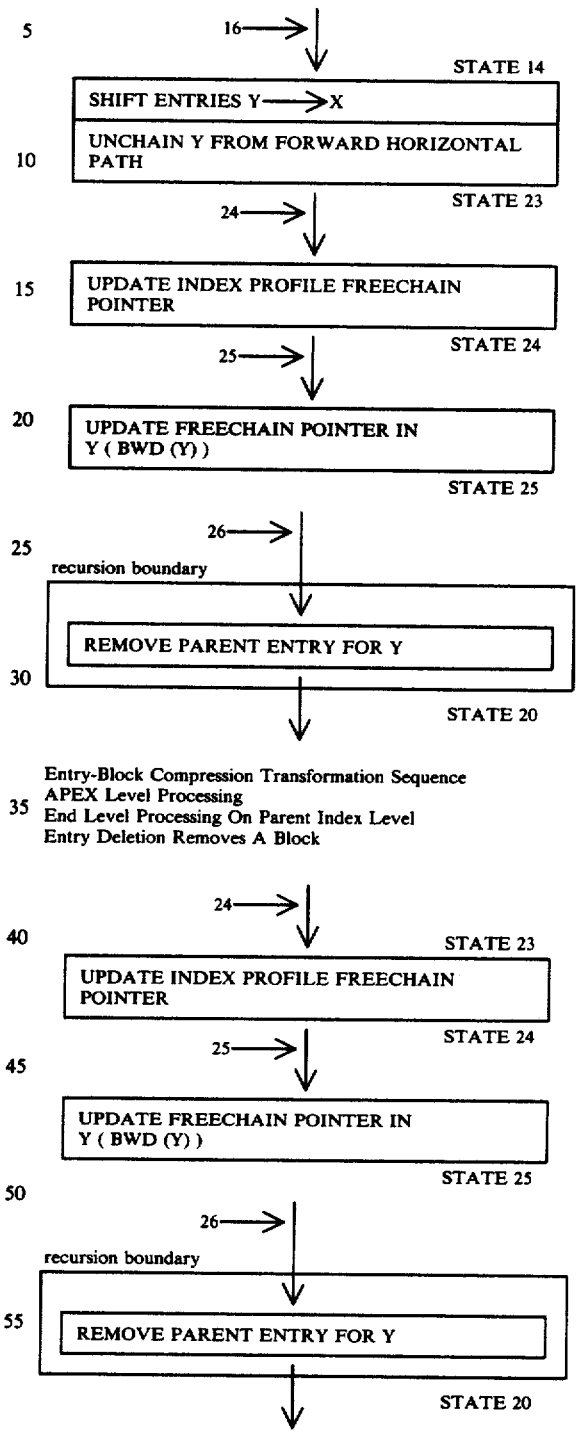

Entry-Block Compression Transformation Sequence
APEX Level Processing
End Level Processing On Parent Index Level
Entry Deletion Removes A Block Explanation Of Cases

| CASE 1 | | No problems are evident. |
|---|---|---|
| Initial State: | 0 | |
| Processing Level: | | |
| | ORIGIN | |
| | MID LEVEL | |

-continued

| | | |
|---|---|---|
| CASE 2 | | On the ORIGIN compression level, |
| Initial State: | 1 | entries have been shifted from block |
| Processing Level: | | (Y) into block (X). (Y) was not |
| | ORIGIN OR PARENT | emptied by the entry shift. A prior |
| | MID LEVEL | compression cycle started at the |
| | | current position in the index an was |
| | | interrupted. On PARENT compression |
| | | levels, compression on a lower index |
| | | level produced a state change on the |
| | | current level. Entry (x) is the last |
| | | entry in block (X) and the key of (x) |
| | | equals the key of (y) because all |
| | | of the entries in the child block |
| | | of (y) have been shifted into the |
| | | child block of (x) on the level |
| | | below. This gives the appearance of |
| | | a shift of one entry from (Y) into |
| | | (X) on the current level. |
| CASE 3 | | Compression on a lower index level |
| Initial State: | 2 | produced a state change on the |
| Processing Level: | | current level. Entries have |
| | PARENT | been shifted into the child of entry |
| | MID LEVEL | (x) (block (X) on the level below). |
| | | The key of (x) has been updated |
| | | to reflect the last entry shifted |
| | | into the child block, but (x) is the |
| | | last entry in its block (another |
| | | parent entry update is required). |
| CASE 4 | | Compression on a low index level |
| Initial State: | 12 | produced a state change on the |
| Processing Level: | | current level. Entries have |
| | PARENT | been shifted into the child of entry |
| | END LEVEL | (x) (block (X) on the level below). |
| | | The key of (x) has been updated |
| | | to reflect the last entry shifted |
| | | into the child block, but (x) is the |
| | | last entry in its block (another |
| | | parent entry update is required). |
| | | This case differs from CASE 3 in |
| | | that only two blocks exist on this |
| | | index level (an END LEVEL state). |
| CASE 5 | | A prior compression cycle started |
| Initial State: | 3 | at the current position in the index |
| Processing Level: | | and was interrupted. On the ORIGIN |
| | ORIGIN OR PARENT | compression level, entries have |
| | MID LEVEL | been shifted from block (Y) into |
| | | block (X), leaving (Y) non-empty. |
| | | All parent level processing is |
| | | complete but the shifted entries |
| | | have not been removed from block |
| | | (Y). On PARENT compression levels, |
| | | entry (x) has been updated to |
| | | be equal to (y) in key, because |
| | | all entries in the child block of |
| | | (y) have been shifted into the |
| | | child block of (x). This leaves |
| | | a redundant entry (y) as the first |
| | | entry in block (Y). Thus, this case |
| | | can only occur on PARENT levels |
| | | when block (Y) contains more than |
| | | one entry. |
| CASE 6 | | A prior compression cycle started |
| Initial State: | 4 | at the current position in the index |
| Processing Level: | | and was interrupted. Block (Y) was |
| | ORIGIN OR PARENT | found to be initially empty or was |
| | MID LEVEL | rendered empty by entry deletion. |
| | | The block has been removed from the |
| | | forward horizontal index access path |
| | | but does not yet appear on the index |
| | | freechain. |
| CASE 7 | | A prior compression cycle started |
| Initial State: | 5 | at the current position in the index |
| Processing Level: | | and was interrupted. Block (Y) was |
| | ORIGIN OR PARENT | found to be initially empty or was |
| | MID LEVEL | rendered empty be entry deletion. |
| | | The block has been removed from the |
| | | forward horizontal index access path |
| | | and appears on the index freechain, |
| | | but the freechain continuity is |
| | | broken (the freechained block has |
| | | not been written to point to the |
| | | previous head of the freechain). |

-continued

| | | |
|---|---|---|
| CASE 8 Initial State: Processing Level: | 6 ORIGIN OR PARENT MID LEVEL | A prior compression cycle started at the current position in the index and was interrupted. Block (Y) was found to be initially empty or was rendered empty by entry deletion. The block has been removed from the forward horizontal index access path and appears on a continuous index freechain, but (Y) has not been removed from the vertical index access path (the parent entry for (Y) must be deleted from the parent index level). |
| CASE 9 Initial State: Processing Level: | 7 ORIGIN OR PARENT MID LEVEL | A prior compression cycle started at the current position in the index and was interrupted. Block (Y) was found to be initially empty or was rendered empty by entry deletion. The block has been removed from both the forward horizontal and the vertical index access paths, but has not been removed from the backward index access path to complete the block removal process. |
| CASE 10 Initial State: Processing Level: | 13 ORIGIN OR PARENT END LEVEL | A prior compression cycle started at the current position in the index and was interrupted. Block (Y) was found to be initially empty or was rendered empty by entry deletion. The block has been removed from both the forward horizontal and the vertical index access paths, but has not been removed from the backward index access path to complete the block removal process. This case differs from CASE 9 in that the removal of the compressed block reduced the number of blocks existing on the index level to two, generating an END LEVEL state. |
| CASE 11 Initial State: Processing Level: | 8 ORIGIN OR PARENT MID LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), and (Y) has been removed from the forward horizontal index access path but does not appear on the index freechain. |
| CASE 12 Initial State: Processing Level: | 9 ORIGIN OR PARENT MID LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index |

|                    |                              |                                                                                                                                                                                                                                                                                                                                                                                                                                                                                                                                                                                                                                                                 |
|--------------------|------------------------------|--------|
|                    |                              | access path and appears on the index freechain, but the freechain continuity has been broken. |
| CASE 13            |                              | A prior compression cycle started |
| Initial State:     | 10                           | at the current position in the index |
| Processing Level:  |                              | and was interrupted. On the ORIGIN |
|                    | ORIGIN OR PARENT MID LEVEL   | compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index access path and appears on a continuous index freechain, but the parent entry for block (X) has not been updated on the level above to contain the high key of (X), and (Y) has not been removed from the vertical index access path. |
| CASE 14            |                              | A prior compression cycle started |
| Initial State:     | 11                           | at the current position in the index |
| Processing Level:  |                              | and was interrupted. On the ORIGIN |
|                    | ORIGIN OR PARENT MID LEVEL   | compression level, entries have been shifted from block (Y) into block (X), rendering (Y) empty. This case can occur in this context only when the PARENT entries for blocks (X) and (Y) appear in different upper level index blocks. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index access path and appears on a continuous index freechain. The parent entry for block (X) has been updated on the level above to contain the high key of (X), but (Y) has not been removed from the vertical index access path. |
| CASE 15            |                              | A prior compression cycle started |
| Initial State:     | 15                           | at the current position in the index |
| Processing Level:  |                              | and was interrupted. On the ORIGIN |
|                    | ORIGIN OR PARENT END LEVEL   | compression level, entries have been shifted from block (Y) into block (X). (Y) was not emptied by the entry shift. On PARENT compression levels, entry (x) is the last entry in block (X) and the key of (x) equals the key of (y) because all of the entries in the child block of (y) have been shifted into the child block of (x) on the level below. This gives the appearance of a shift of one entry from (Y) into (X) on the current level. This case differs from CASE 2 in that only two blocks exist on this index level (an END LEVEL state). |
| CASE 16            |                              | No problems are evident. Only |
| Initial State:     | 14                           | two blocks exist on this index |

-continued

| Processing Level: | ORIGIN END LEVEL | level (from current position). |
|---|---|---|
| CASE 17 Initial State: Processing Level: | 16 ORIGIN OR PARENT END LEVEL | A prior compression cycle started at the current position in the index and was interrupted. On the ORIGIN compression level, entries have been shifted from block (Y) into block (X), leaving (Y) non-empty. All parent level processing is complete but the shifted entries have not been removed from block (Y). On PARENT compression levels, entry (x) has been updated to be equal to (y) in key, because all entries in the child block of (y) have been shifted into the child block of (x). This leaves a redundant entry (y) as the first entry in block (Y). Thus, this case can only occur on PARENT levels when block (Y) contains more than one entry. |
| CASE 18 Initial State: Processing Level: | 17 ORIGIN OR PARENT END LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), and (Y) has been removed from the forward horizontal index access path but does not appear on the index freechain. This case differs from CASE 11 in that there are only two blocks (from current position) on the index level (an END LEVEL state). |
| CASE 19 Initial State: Processing Level: | 18 ORIGIN OR PARENT END LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index access path and appears on the index freechain, but the freechain continuity has been broken. This case differs from CASE 12 in that there are only two blocks (from current position) on the index level (an END LEVEL state). |
| CASE 20 Initial State: Processing Level: | 19 ORIGIN OR PARENT END LEVEL | A prior compression cycle started at the current position in the index and was interrupted. On the ORIGIN compression level, entries have been shifted from block (Y) into block (X), rendering (Y) empty. On PARENT |

-continued

| | | |
|---|---|---|
| | | compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index access path and appears on a continuous index freechain, but the parent entry for block (X) has not been updated on the level above to contain the high key of (X), and (Y) has not been removed from the vertical index access path. This case differs from CASE 13 in that there are only two blocks (from current position) on the index level (an END LEVEL state). |
| CASE 21 Initial State: Processing Level: | 20 ORIGIN END LEVEL | No problems are evident. The completion state has been reached. No further index compression can occur on the current index level. |
| CASE 22 Initial State: Processing Level: | 21 ORIGIN OR PARENT MID LEVEL APEX LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), and (Y) has been removed from the forward horizontal index access path but does not appear on the index freechain. This case differs from CASE 11 in that it occurs only on the APEX index level. |
| CASE 23 Initial State: Processing Level: | 22 ORIGIN OR PARENT MID LEVEL APEX LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index access path and appears on the index freechain, but the freechain continuity has been broken. This case differs from CASE 12 in that it occurs only on the APEX index level. |
| CASE 24 Initial State: Processing Level: | 23 | A prior compression cycle started at the current position in the index and was interrupted. On the ORIGIN |

| | | |
|---|---|---|
| | ORIGIN OR PARENT END LEVEL APEX LEVEL | compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), and (Y) has been removed from the forward horizontal index access path but does not appear on the index freechain. This case differs from CASE 18 in that there it occurs only on the APEX index level. |
| CASE 25 Initial State: Processing Level: | 24 ORIGIN OR PARENT END LEVEL APEX LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index access path and appears on the index freechain, but the freechain continuity has been broken. This case differs from CASE 19 in that it occurs only on the APEX index level. |
| CASE 26 Initial State: Processing Level: | 25 ORIGIN OR PARENT END LEVEL APEX LEVEL | A prior compression cycle started at the current position in the index and was interrupted. On the ORIGIN compression level, entries have been shifted from block (Y) into block (X), rendering (Y) empty. On PARENT compression levels, this case means that entry (x) has been updated to reflect the movement of all the entries from the child block of (y) into the child block of (x). So, on the current level the key of (x) equals the key of (y). This case occurs on PARENT levels when entry (y) is the only entry in block (Y). In both contexts, block (X) has been written such that all entries in (Y) also appear in (X), (Y) has been removed from the forward horizontal index access path and appears on a continuous index freechain, but (Y) has not been removed from the vertical index access path. This case differs from CASE 20 in that it occurs only on the APEX index level. |
| CASE 27 Initial State: Processing Level: | 26 ORIGIN MID LEVEL ABNORMAL | An orphan index block has been encountered. Perform orphan block handling or reposition the compression space beyond the orphan block and its child blocks. (Move forward by one entry on the level above and reinitialize the compression |

| | | | -continued |
|---|---|---|---|
| CASE 28 | | | An orphan index block has been |
| Initial State: | 27 | | encountered. Perform orphan block |
| Processing Level: | | | handling or reposition the |
| | | ORIGIN | compression space beyond the orphan |
| | | END LEVEL | block and its child blocks. (Move |
| | | ABNORMAL | forward by one entry on the level |
| | | | above and reinitialize the compression |
| | | | space from the current level downward). |

Recovery From Failure

The physical state transformations of index compression are strictly ordered and all are subject to failure. That is, given that a compression cycle has progressed from the steady state on a given index level to some arbitrary but known point and stopped, continuation of the cycle always involves performing additional transformations in the same order as would be required if the process had not been interrupted. Reverse transformations, backout processes, are not required and are not used.

The principal requirement on recovery, then, is to identify the point at which a prior compression cycle interruption occurred. This is a main purpose of condition vectors. &P.Before the start of each compression cycle, all levels of the index structure are examined, from the APEX level downward, for the steady state condition. It will be shown that if any index level exhibits a non-steady state condition, then a prior interruption of any and all compression cycles can be fully determined by the set of condition vectors. That is, the index level at which processing was interrupted is known, as well as the transformation being performed at the time of the interruption. Recovery consists of continuing the compression cycle until the steady state is reached for all levels. The condition vector uniquely determines the actions (transformations) required to reach steady state. If an external 'trigger' (such as an indicator in the index profile) is used to signify that the compression process indeed processed to completion the last time it was applied, then failure point identification becomes optional (at processing time).

The compression cycle involves disruption-adjustment from the low index level to the APEX level, followed by resynchronization from the APEX level to the low level to complete the cycle. So, recovery specifically requires resuming the cycle from the highest index level for which disruption-adjustment has occurred but resynchronization has not been performed.

Since index compression is a non-destructive process, the only meaningful course for recovery is to proceed normally from the point of prior failure. The set of states for the compression process and the unique set of circumstances (the order of transformations) which bring them about form the set of failure possibilities, called CASES. If a failure is permitted during any transformation, the set of CASES then uniquely describes index conditions for all failure situations. Since both the STATE and the context of prior processing are then known, the set of actions (the VARIATION) required to return to steady state can be established. The set of actions required to perform and complete a compression cycle occur in a strictly ordered sequence. Their execution is controlled by the Action Vector. Action Vectors are described in section 6.2 (ACTION VECTORS—THE AVT).

Condition Vectors—The CVT

The uniqueness of the states with respect to their recovery coordinates is best understood by observing the recovery coordinate matrix within the Condition Vector Table (CVT). The other columns in the table represent the set of circumstances for which each state may occur. Both sets of evidence comprise the condition vector.

In the VARIATION column of the Condition Vector Table, VARIATION 1 represents the cases for which an abnormal or steady state condition has been observed for the index level. VARIATION 1 represents a point at which additional processes can be introduced (for example, orphan block handling). When no prior failure of the compression process has occured, VARIATION 1 also represents a point at which to introduce compression cycle generation (building the Progress Vector for the level). Progress Vectors are explained in section 7 (COMPRESSION CYCLE GENERATION). Variation numbers refer to entries in the Action Vector Table (AVT) which is described in section 6.2 (ACTION VECTORS—THE AVT).

The Condition Vector Table

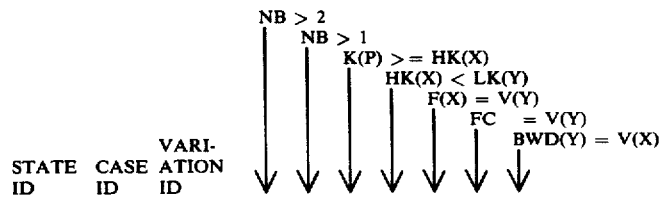

The Condition Vector Table

Note: 1 = true, 0 = false

| Idx | A | B | c1 | c2 | c3 | c4 | c5 | c6 | c7 |
|-----|---|---|----|----|----|----|----|----|----|
| 0   | 1 | 1 | 1  | 1  | 1  | 1  | 1  | 1  | 1  |
| 1   | 2 | 2 | 1  | 1  | 0  | 0  | 1  | 1  | 1  |
| 2   | 3 | 3 | 1  | 1  | 0  | 1  | 1  | 1  | 1  |
| 12  | 4 | 3 | 0  | 1  | 0  | 1  | 1  | 1  | 1  |
| 3   | 5 | 4 | 1  | 1  | 1  | 0  | 1  | 1  | 1  |
| 4   | 6 | 5 | 1  | 1  | 1  | 1  | 0  | 1  | 1  |
| 5   | 7 | 6 | 1  | 1  | 1  | 1  | 0  | 0  | 1  |
| 6   | 8 | 7 | 1  | 1  | 1  | 1  | 0  | 0  | 0  |
| 7   | 9 | 8 | 1  | 1  | 1  | 1  | 1  | 1  | 0  |
| 13  | 10| 8 | 0  | 1  | 1  | 1  | 1  | 1  | 0  |
| 8   | 11| 9 | 1  | 1  | 0  | 0  | 0  | 1  | 1  |
| 9   | 12| 10| 1  | 1  | 0  | 0  | 0  | 0  | 1  |
| 10  | 13| 11| 1  | 1  | 0  | 0  | 0  | 0  | 0  |
| 11  | 14| 7 | 1  | 1  | 1  | 0  | 0  | 0  | 0  |
| 15  | 15| 2 | 0  | 1  | 0  | 0  | 1  | 1  | 1  |
| 14  | 16| 1 | 0  | 1  | 1  | 1  | 1  | 1  | 1  |
| 16  | 17| 4 | 0  | 1  | 1  | 0  | 1  | 1  | 1  |
| 17  | 18| 12| 0  | 1  | 0  | 0  | 0  | 1  | 1  |
| 18  | 19| 13| 0  | 1  | 0  | 0  | 0  | 0  | 1  |
| 19  | 20| 14| 0  | 1  | 0  | 0  | 0  | 0  | 0  |
| 20  | 21| 1 | 0  | 0  | 1  | 0  | 0  | 1  | 0  |
| 21  | 22| 5 | 1  | 1  | 1  | 0  | 0  | 1  | 1  |
| 22  | 23| 6 | 1  | 1  | 1  | 0  | 0  | 0  | 1  |
| 23  | 24| 15| 0  | 1  | 1  | 0  | 0  | 1  | 1  |
| 24  | 25| 16| 0  | 1  | 1  | 0  | 0  | 0  | 1  |
| 25  | 26| 17| 0  | 1  | 1  | 0  | 0  | 0  | 0  |
| 26  | 27| 1 | 1  | 1  | 1  | 1  | 0  | 1  | 0  |
| 27  | 28| 1 | 0  | 1  | 1  | 1  | 0  | 1  | 0  |

Action Vectors—The AVT

For each unique state which an index level can exhibit there exists a fixed sequence of operations required to produce a steady state condition. This includes those operation sequences which begin from a steady state condition and yield the steady state in the result. (Such sequences account for progress of the compression process through Compression Cycle Generation.)

Each fixed sequence of operations is described by an Action Vector (an ordered operation sequence). The set of all Action Vectors forms the Action Vector Table (AVT).

The Action Vector Table

ACTION COORDINATES

The Action Vector Table

| VARIATION ID | SHIFT ENTRIES FROM SOURCE INTO X | UNCHAIN SOURCE FROM FORWARD HORIZONTAL ACCESS | UPDATE (FC) IN INDEX PROFILE | UPDATE FREECHAIN POINTER (BWD(Y)) | UPDATE PARENT OF X WITH HIGH KEY OF X | REMOVE PARENT ENTRY FOR SOURCE | UNCHAIN SOURCE FROM BACKWARD ACCESS | REMOVE SHIFTED SOURCE ENTRIES |
|---|---|---|---|---|---|---|---|---|
| 1  | 0 | 0 | 0 | 0 | 0 | 0 | 0 | 0 |
| 2  | 0 | 0 | 0 | 0 | 1 | 0 | 0 | 1 |
| 3  | 0 | 0 | 0 | 0 | 1 | 0 | 0 | 0 |
| 4  | 0 | 0 | 0 | 0 | 0 | 0 | 0 | 1 |
| 5  | 0 | 0 | 1 | 1 | 0 | 1 | 1 | 0 |
| 6  | 0 | 0 | 0 | 1 | 0 | 1 | 1 | 0 |
| 7  | 0 | 0 | 0 | 0 | 0 | 1 | 1 | 0 |
| 8  | 0 | 0 | 0 | 0 | 0 | 0 | 1 | 0 |
| 9  | 0 | 0 | 1 | 1 | 1 | 1 | 1 | 0 |
| 10 | 0 | 0 | 0 | 1 | 1 | 1 | 1 | 0 |
| 11 | 0 | 0 | 0 | 0 | 1 | 1 | 1 | 0 |
| 12 | 0 | 0 | 1 | 1 | 1 | 1 | 0 | 0 |
| 13 | 0 | 0 | 0 | 1 | 1 | 1 | 0 | 0 |
| 14 | 0 | 0 | 0 | 0 | 1 | 1 | 0 | 0 |
| 15 | 0 | 0 | 1 | 1 | 0 | 1 | 0 | 0 |
| 16 | 0 | 0 | 0 | 1 | 0 | 1 | 0 | 0 |
| 17 | 0 | 0 | 0 | 0 | 0 | 1 | 0 | 0 |
| 18 | 0 | 1 | 1 | 1 | 0 | 1 | 1 | 0 |
| 19 | 1 | 0 | 0 | 0 | 1 | 0 | 0 | 1 |
| 20 | 1 | 1 | 1 | 1 | 1 | 1 | 1 | 0 |
| 21 | 0 | 1 | 1 | 1 | 0 | 1 | 0 | 0 |
| 22 | 1 | 1 | 1 | 1 | 1 | 1 | 0 | 0 |
| 23 | 1 | 0 | 0 | 0 | 0 | 0 | 0 | 1 |
| 24 | 1 | 1 | 1 | 1 | 0 | 1 | 1 | 0 |
| 25 | 1 | 1 | 1 | 1 | 0 | 1 | 0 | 0 |

Note:
1 = perform action
0 = do not perform action

Compression Cycle Generation

Compression Cycle Generation gets index compression started when there is no failure from which to recover.

Preconditions for generating a compression cycle are that

Entry (x) is the last (non-deleted) entry in block (X)

The initial state is a (non-Abnormal) steady state condition
or a recognized non-steady state condition generated by state transformations performed on a lower indexing level Given this, the ability to start a compression cycle on an index level is determined by The existence of a right-hand (source) block (Y)

The number of entries contained in the source block (Y)

The number of entries which can be added to (X)

IMPLEMENTATION NOTE

In the Progress Vector Table entries which follow, an asterisk indicates that the Progress Coordinate has no meaning in the resolution of the Progress Vector. Implementation of the table can be done either by generating additional rows with ones and zeros replacing the asterisk, or by defaulting actions in the process itself.

PROGRESS VECTORS - THE PVT
The Progress Vector Table

<<< PROGRESS COORDINATES >>>
- NB < 2
- NB < 1
- Source Block Empty
- Block (X) Full
- Supply Exceeds Demand
- i = n

| OP-TION ID | VARI-ATION ID | NB<2 | NB<1 | SBE | B(X)F | SED | i=n | |
|---|---|---|---|---|---|---|---|---|
| 1 | 18 | 1 | 1 | 1 | * | * | 0 | block compression |
| 2 | 1 | 1 | 1 | 0 | 0 | * | 0 | forward motion |
| 3 | 19 | 1 | 1 | 0 | 0 | 1 | 0 | entry compression |
| 4 | 20 | 1 | 1 | 0 | 0 | 0 | 0 | entry block compression |
| 5 | 21 | 0 | 1 | 1 | * | * | 0 | block compression |
| 6 | 1 | 0 | 1 | 0 | 0 | * | 0 | forward motion |
| 7 | 19 | 0 | 1 | 0 | 0 | 1 | 0 | entry compression |
| 8 | 22 | 0 | 1 | 0 | 0 | 0 | 0 | entry block compression |
| 9 | 18 | 1 | 1 | 1 | * | * | 1 | block compression |
| 10 | 1 | 1 | 1 | 0 | 0 | * | 1 | forward motion |
| 11 | 23 | 1 | 1 | 0 | 0 | 1 | 1 | entry compression |
| 12 | 24 | 1 | 1 | 0 | 0 | 0 | 1 | entry block compression |
| 13 | 21 | 0 | 1 | 1 | * | * | 0 | block compression |
| 14 | 1 | 0 | 1 | 0 | 0 | * | 0 | forward motion |
| 15 | 23 | 0 | 1 | 0 | 0 | 1 | 0 | entry compression |
| 16 | 25 | 0 | 1 | 0 | 0 | 0 | 0 | entry block compression |
| 17 | 1 | 0 | 1 | * | * | * | * | finis |

CVT—AVT—PVT Relationships: Process Control

Condition Vectors, Action Vectors and Progress Vectors collectively form the process control mechanism for index compression on each index level.

The Condition Vector (CV) is used to reveal Abnormal states and to determine processing requirements generated by compression progress on a lower indexing level (actions at the recursion boundary). The Condition Vector is also used for failure point identification. When the CV is built, the corresponding Action Vector (AV) identifies the process steps neccessary to resume the steady state.

Before each compression cycle, a Condition Vector is built for each indexing level, from the APEX level downward. Thus, Abnormal states are detected for all levels before each compression cycle begins. Abnormal states may be bypassed by first recording the highest indexing level (i) exhibiting the Abnormal state, and then moving forward in the indexing structure by one entry on the next higher level. That is, y(i+1) becomes x(i+1). The buffer pool is re-initialized from level (i) downward. Abnormal state detection is repeated until no indexing level exhibits an Abnormal state.

The Progress Vector (PV) is used to describe the compressability of the index when no prior process failure or Abnormal state is evident.

The compression cycle process steps performed on each indexing level are as follows:
Construct the Condition Vector for the level.
Construct the Progress Vector for the level.
If the PV indicates that progress can be made in the compression process, the corresponding Action Vector (AV) defines the process steps required to achieve that progress.
If the PV indicates that no progress is possible via compression, then the Condition Vector is used to determine any transformations required to reach steady state (via its corresponding Action Vector).
Perform the designated actions.

Thus, when compression can be initiated on an index level, the process control transform is PV→AV→action When compression cannot be initiated on an index level, the process control transformation is PV→AV→CV→AV→action The process control mechanism acknowledges certain overriding actions which are communicated by the process itself across indexing levels—namely, parent entry deletion and parent entry (key) update propagation. Such actions are illustrated within the 'recursion boundaries' of the Transformation Sequence Graphs shown in section 5 (DETECTING THE SET OF FAILURE POSSIBILITIES).

The compression process is a series of cycles, each cycle examining the index (at current position) from the bottom index level to the top assessing compressability, establishing state transforms and performing them for each level. The PV is the result of the progress assessment and the AV identifies the necessary state transforms. At the cycle proceeds, disruption/adjustment of the index structure takes place on the upward phase of the cycle and resynchronization takes place on the downward phase. As soon as an entire cycle completes with no state change, the index can no longer be compressed from the current positioning and forward motion is performed until this is no longer the case (or until the end of the index is reached).

Forward motion starts with forward block motion on the lowest indexing level (1). Forward block motion is the rotation of the elements of Sc(n) for a given level (i) such that the current block on the level is rotated out of view, the right-hand block (if one exists) becomes the current block, the far right-hand block (if one exists) becomes the right-hand block, and a new far right-hand block (if one exists) is read into the buffer pool from the DASD. Note that forward block motion of any level (i) generates forward entry motion on the next higher level (i+1), if one exists. (The current entry on the next higher level is, by definition, the addressing entry for the current block on the current level. So, when the current block changes on level (i), the current entry necessarily changes on level (i+1).)

Generally speaking then, forward motion is a leftward block shift by 1 block on the current level (i) and a simultaneous leftward shift by 1 entry on the level above (i+1). (Entry shifts on level 1 are not meaningful.) Note that a leftward shift of 1 entry at any level (i>1) may involve a leftward shift of a block (when the current entry is the last entry in the current block). Thus, in turn, generates forward entry motion on the level above. Thus, forward block motion on level (1) may involve forward block motion on all levels of the indexing structure.

Forward motion necessarily involves the resetting of entry positioning on each level. That is, forward motion requires re-establishing the position of the current entry (x) and the positions of the right-hand (Y) and far right-hand (z) entries (if they exist).

Failure Point Identification

When a prior compression process failure is evident (as signified by an indicator in the index profile) the main requirement on the compression process is to position at the point of failure and continue from that point.

steps comprising each compression cycle are aimed at finding the HFL.

Compression Restart

On restart from prior failure, each compression cycle is characterized by the following steps:

Scan the index from the APEX level to the bottom level, building a CV for each level.

Continue forward motion until a scan detects a non-steady state condition.

The HFL is the first level encountered at a non-steady state condition.

For all levels at or below the HFL, the CV directs what actions are required.

For all level above the HFL, a PV is built to determine what actions are required to complete the compression cycle. (The cycle proceeds normally).

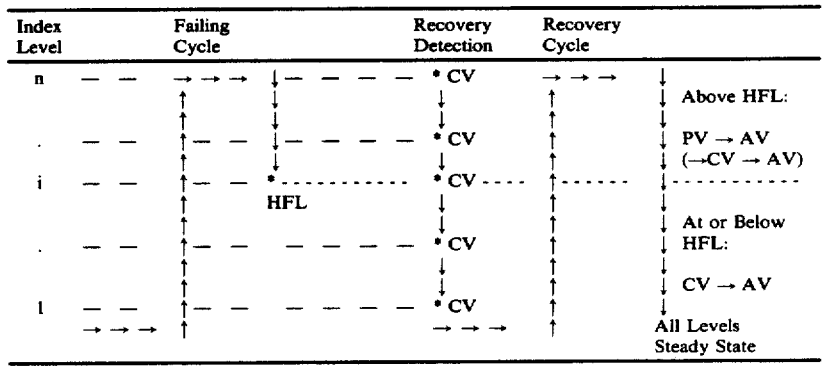

This involves identifying the highest index level showing evidence of prior compression cycle failure (the Highest Failing Level, or HFL). Until its true value is discovered, HFL=0 is assumed.

Note that when no prior failure has occurred, HFL is identically zero for any positioning in the index. In fact, the recovery detection step is replaced by the operation HFL=0.

Each index level is at steady state and is considered non-compressable for all positions up to the position of prior failure. Forward motion automatically brings the compression process to the proper positioning for restart. In this (recovery) mode of processing then, the

Design Options For High Performance (1) DELAYING INDEX BLOCK WRITES FOR LEVEL ONE On index level 1, the writing of block Y to remove shifted entries means that Y may be updated to receive more entries next (or for a block forward pointer update). Recoverability is maintained if the disk update is delayed because all upper levels must be at steady state. Delaying the write can save one DASD access per compression cycle. (The last physical write of one compression cycle may involve the same block as the first physical write of the next cycle). The delayed write technique applies equally to the writing of block Y to update the backward horizontal index access path when a block (a previous Y) is removed from the index. Of course, for both these circumstances, provision must be made to insure that the DASD update takes place on end level processing (when Y is the last block on an index level), or when the (Y) block will not be the first block written in the next compression cycle.

(2) OPTIMAL TIMING OF UPPER LEVEL COMPRESSION

Compression on a given index level causes the propagation of block updates on upper index levels when entry (x) on the current index level is the last entry in the block. So, the propagation of upper level index updates is reduced in frequency by the procedural rule that entry compression takes place on a level when and only when entry (x) is the last entry in the block (X). This is the case for level 1 by definition. For upper levels, this rule keeps entry (y) in block (X), shortstopping the upper level entry update, and simplifying parent level transformations. Additionally, since the deletion of the (Y) block on an index level requires the deletion of (y) on the level above (rendering (X) nonfull on that level), the rule reduces the frequency with which entry compression will occur on upper levels. (It will occur only when entry (y), before deletion, is the last entry in the block (X).).

(3) DISTRIBUTED FREE SPACE

The extent to which index blocks are 'packed' with entries by index compression is independent of the process itself. The mechanism can be set up to fill each index block to maximum capacity (or less) on all indexing levels. Packing rates can be made different for each indexing level via the (Omax) function. Leaving extra room in each index block for additional index entries reduces index compression processing time and improves subsequent access method response times for the insertion of entries into the index.

(4) FAST FORWARD MOTION

Generally speaking, removing entries from a full block with entry compression is counter productive. This is especially true when entry compression requires taking entries from another full block to refill that previously full block. The exception is the case in which a purpose of compression is to insure the complete packing of the index. So, when maximum compression is not specified as the rule for compression (no free slots requested), then full blocks do not give entries if another full block follows in the horizontal access path of the index on the level being compressed.

(5) TOURING AND 'BURST' MODE COMPRESSION

The index compression function may be started automatically by an operating system access method when an attempt to insert an index entry into an index block fails for lack of space in the block and lack of available blocks for index expansion. For an (n) level index, the maximum requirement for new blocks to support an entry insert is (n+1). This is worst case of an entry insert. When started automatically, then, index compression ceases for an (n) level index when (n+1) index blocks exist (on the freechain) for index expansion. This is 'burst' mode compression.

Several 'burst' executions may consecutively occur. If compression always begins at the logical start (bottom left) of the index, the response time for compression will get longer with each consecutive compression request. ('Old ground' is covered again, but is probably in a maximum compressed state). To provide for uniformly short response time on 'burst' mode processing, each burst starts where the last burst finished (prior completion points are 'remembered'). If the end of the index is encountered before a burst completes, the burst continues at the start of the index. This technique is called 'touring'. Non-automatic invocation of the compression function resets the touring start point to the start of the index. A method for remembering the point at which prior compression processing stopped is to record the high key in block (X) on index level one (a 'shadow' key) as a normal event each time the index profile is written. The shadow key value used for restart is taken from the profile. This technique keeps the restart point close to the prior completion point, significantly improving the performance of burst mode compression, especially for large indexes.

(6) CONTINUOUS PROGRESS ACROSS FAILURE

Use of the shadow key (described in item 5) also serves to minimize the processing time required to resume proper positioning for restart after a failure, often establishing the restart point at the precise position (in the collating key sequence) of the prior failure. Thus, if a failure occurs after processing 90% of an index structure, then as little as 10% of the structure need be processed during restart for completion.

The Mechanics Of Index Compression

Each coordinate of the Action Vector represents a step in the process of performing a compression cycle for a given index level. The mechanics of each process step are detailed in this section. Except where otherwise noted, the MOD function is used to signify buffer modification. (X) blocks are physically written to the DASD as part of the disruption/adjustment phase of the compression cycle, before upward transition to the next indexing level (i+1). (Y) blocks are written as part of the resynchronization phase of the compression cycle, after downward transition back to the current indexing level (i).

(1) SHIFT ENTRIES FROM SOURCE INTO X

Determine supply—the number of available entries (specifically, the number of character positions in use for entries) in the right-hand block. Adjust for deleted entries. (Non-zero supply is assumed).

SUPPLY=OL(B(Y))−LENGTH (HEADER)+EL;

IF EDEL(OL(B(Y)))=ON THEN SUPPLY=SUPPLY−EL;

Determine demand—the number of empty entry slots (character positions) in the current block on the level. (Non-zero demand is assumed).

DEMAND=Omax−OL(B(X));

Set the starting position for receiving entries.

TARGET=OL(B(X));

Adjust for deleted entries. If the last entry in the receiving block is deleted, then add one entry to demand. Otherwise, increment the starting position for receiving entries to point one entry beyond the last entry in the block. Thus, shifted entries overlay deleted entries and are appended to valid ones.

IF EDEL(OL(B(X)))=ON THEN DEMAND=DEMAND+EL;
ELSE TARGET=TARGET+EL;

Determine the amount of data to be moved—the minimum of supply and demand.

RANGE=MIN (SUPPLY,DEMAND);

Move the maximum possible number of entries.

B(X)(TARGET:RANGE)=B(Y)(LENGTH-(HEADER):RANGE);

Update the offset of the last entry in the current block.

OL(B(X))=TARGET+RANGE−EL;

Mark the (X) block modified.

MOD(1)=ON;

(2) UNCHAIN SOURCE FROM FORWARD HORIZONTAL ACCESS

Update the forward block pointer in the current block to the value of the forward block pointer from the block being compressed (the right-hand block). This action removes the right-hand block from the horizontal index access path on the current indexing level (i).

F(X)=F(Y);

Mark the (X) block modified.

MOD(1)=ON;

(3) UPDATE (FC) IN INDEX PROFILE

Update the freechain pointer in the index profile. The freechain shadow (FCs) is set equal to the current value of the freechain pointer (FC). The freechain pointer is then set equal to the block number of the compressed (Y) block, and the index profile is written to the DASD.

FCs=FC;
FC=L(Y);

(4) UPDATE FREECHAIN POINTER (BWD(Y))

Set the freechain forward pointer in the block being added to the chain (the index block backward pointer is used). The index block is then written to the DASD.

BWD(Y)=FCs;

The block may be removed from the buffer pool at any time after the write operation.

(5) UPDATE PATENT OF X WITH HIGH KEY OF X

Update the addressing entry on the level above (i+1), if one exists (i<n), with the new last key in the current block on the current level (i).

K(P)=HK(X);

Mark the parent (X) block modified.

PMOD=ON;

If the parent entry is the last entry in its block, then signal that parent entry update propagation will be performed on the next higher indexing level.

IF PE¬=RPE THEN PHKM=ON;

Clear the parent entry update propagation signal.

HKM=OFF;

Note that the parent entry update transform (above) in both an Action Coordinate and a process step performed on the parent indexing level (i) upon signal from the process on the next lower level (i−1). The signal mechanism is the binary valued function HKM. (On the lower indexing level, this function is known as PHKM). Note that for any parent indexing level, the parent entry update can be considered a pre-process with respect to compression cycle generation on that level.

(6) REMOVE PARENT ENTRY FOR SOURCE

This process step is performed on the parent indexing level (i) upon signal from the process on the next lower indexing level (i−1). The signal mechanism is the binary valued function DEL. (On the lower indexing level, this function is known as PDEL and does, in fact, represent the subject action on that level). Detail is shown here for the case in which the signal is generated on levels i<n. For the case i=n, parent entry deletion is accomplished more simply by removing the pseudo entry for block (Y) from the index profile, and resetting the value of the function DEL. Note that for any parent indexing level, entry deletion can be considered to be a pre-process with respect to compression cycle generation on that level, as long as block (Y) is not rendered empty by the deletion of entry (y).

If the right-hand entry is the only entry in the block, then it must be in the right-hand block. (The current block contains at least the current entry). Therefore, the right-hand block will be emptied. Compress the block, preempting compression cycle generation on the level.

```
IF O(y) = OL(B(Y)) THEN
DO;
PDEL = ON;
IF NB > 2 THEN PERFORM (VARIATION 18);
ELSE PERFORM (VARIATION 21);
END;
```

If the right-hand entry is not the only entry in the block, then remove the entry from the block by shifting its right neighbor entries left to overlay it. Determine how much data will be moved (all the entries to the right of the entry being removed, if any). If the right-hand entry (being deleted) is the last entry in the block, then it must be in the current block. In addition, 'RANGE' equals zero.

```
ELSE
DO;
RANGE = OL(E(y)) - O(y);
```

Shift one entry position to the left any entries which lie to the right of the entry being removed.

If none exist, then none will be moved. Note that if the right-hand entry is the last entry in its block, then there are no entries to the right to shift over it, but the entry must still be removed. Thus, decrement the offset to the last entry in the block, whether or not entries are shifted. (If the last entry in the current block is in this way deleted, note that compression cycle generation will take place on this level).

E(y)(O(y):RANGE)=E(y)(O(y)+EL:RANGE);
OL(E(y))=OL(E(y))−EL;

Mark the appropriate block modified.

```
IF E(y) = B(X) THEN MOD(1) = ON;
ELSE MOD(2) = ON;
END;
```

Clear the entry deletion signal.

DEL=OFF;

(7) UNCHAIN SOURCE FROM BACKWARD ACCESS

This process step occurs during the resynchronization phase of the compression cycle. Therefore, it is assumed that when this step is performed the block being removed from the backward access path has been removed from the buffer pool. Thus, the block previously identified as block (Z), the block receiving the backward block pointer update, is now identified as block (Y).

BWD(Y)=L(X);
Mark the block modified.
MOD(2)=ON;

(8) REMOVE SHIFTED SOURCE ENTRIES

This process step occurs during the resynchronization phase of the compression cycle. For this transformation, define that entry (w) is located in block (Y), and further, that the offset of (w) in (Y) is always the offset of the first entry in (Y) which does not also appear in (X). Remove all entries in block (Y) which precede entry (w). (RANGE is the number of character positions in use in the block for entry (w) and the entries which follow it).

RANGE=OL(B(Y))−O(w)+EL;
B(Y)(LENGTH(HEADER):RANGE)=B(Y)-(O(w):RANGE);
Record the new last entry offset in block (Y).
OL(B(Y))=LENGTH(HEADER)+RANGE−EL;
Mark the (Y) block modified.
MOD(2)=ON;

Having thus described our invention, what we claim as new, and desire to secure by Letters Patent is:

1. In a data processing system storing a plurality of discrete entities, each identified by a single parameter within a monotonic parameter spectrum, each resident at an addressable location and each locatable by searching a system maintained addresses, a method of maintaining said multi-level index by said system comprising the steps of:

executing a sequence of processing cycles wherein each cycle progresses through the index levels in a first and then a second direction, selectively performing at each level of the index, while performing a processing cycle in said first direction, a first subset of basic operation iterations, including, basic operations for duplicating the presence of an original parameter, and selectively performing at each level of the index, while performing a processing cycle in said second direction, a second subset of basic operation iterations including, basic operations for deleting the original presence of said duplicated parameter.

2. A method as set forth in claim 1 for an index structure of pointer linked blocks, said blocks each having a storage capacity for plural said parameters and plural said pointers, said first subset of basic operation iterations including basic operations for removing some but not all of said pointers linking one of said blocks into said index;

said second subset of basic operation iterations including basic operations for removing the remaining said pointers linking said one of said blocks into said index.

3. A method as set forth in claim 2 including, in each processing cycle, identifying, at each said level, a window in said index, said window comprising a predetermined number of said blocks at said level and an equal number of said blocks if such exist, at the next adjacent level in said first direction, said blocks being interlinked by said pointers;

selecting basic operations in both said first and second subsets of basic operation iterations in accordance with the contents of said window;

performing said selected basic operations in said first subset of basic operation iterations within said window, and identifying a next window in said index comprising said blocks at said next adjacent level and linked ones of said blocks in the next adjacent level thereto in said first direction.

4. A method as set forth in claim 3 including, in any interrupted processing cycle executing in said second direction, reidentifying each said window;

reselecting said basic operations of said second subset of basic operation iterations; and performing said reselected basic operations.

5. The method as set forth in claim 1 wherein the permitted iterations are defined by action vectors contained in an action vector table, each said action vector having a vector element corresponding to each said basic operation, said vector elements being arranged in sequence order and determining the performance, when of one significance and the non-performance, when of the opposite significance, of the corresponding one of said basic operations in relation to the contents of a window in said index in its current position, said window being movable within said index between a base level of said index and an apex level thereof in said first direction, including selecting, from said action vector table, one of said action vectors in response to the contents of said window in its current position in said index.

6. The method as set forth in claim 5 further including generating a progress vector, element by element in such a way that each element is of one significance when a predetermined relationship obtains in said window in the current position thereof and of the opposite significance when said predetermined relationship does not so obtain, associatively accessing a progress vector table using said generated program vector as a search argument to obtain a result field, accessing said action vector table in response to certain of said result fields and moving said window in response to other of said result fields.

7. The method as set forth in claim 6 further including generating a condition vector, element by element, in such a way that each element is of one significance when a predetermined relationship obtains in said window in the current position thereof and of the opposite significance when said predetermined relationship does not so obtain, associatively accessing a condition vector table using said generated condition vector as a search argument to obtain a result field, accessing said action vector table in response to certain of said result fields and accessing said action vector table in response to result fields from said progress vector table in response to other of said condition vector table result fields.

8. The method as set forth in claim 7 further including, for resumption after interruption, moving said window systematically within said index, generating a condition vector for each current position of said window, detecting that one of said generated condition vectors closest to the apex level of said index that would cause an action vector to be accessed in said action vector table specifying performance of at least one of said basic operations, and resuming processing from that current position of said window.

9. The method as set forth in claim 8 further including recording the current position of said window in said index at interruption and resuming processing at the base level of said index corresponding to said recorded window position when no generated condition vector is detected that would access an action vector specifying performance of at least one of said basic operations.

10. The method as set forth in claim 2 wherein the permitted iterations are defined by action vectors contained in an action vector table, each said action vector having a vector element corresponding to each said basic operation, said vector elements being arranged in sequence order and determining the performance, when of one significance and the non-performance, when of the opposite significance, of the corresponding one of said basic operations in relation to the contents of a window in said index in its current position, said window being movable within said index, including selecting, from said action vector table, one of said action vectors in response to the contents of said window in its current position in said index.

11. The method as set forth in claim 10 further including generating a progress vector, element by element in such a way that each element is of one significance when a predetermined relationship obtains in said window in the current position thereof and of the opposite significance when said predetermined relationship does not so obtain, associatively accessing a progress vector table using said generated program vector as a search argument to obtain a result field, accessing said action vector table in response to certain of said result fields and moving said window in response to other of said result fields.

12. The method as set forth in claim 11 further including generating a condition vector, element by element, in such a way that each element is of one significance when a predetermined relationship obtains in said window in the current position thereof and of the opposite significance when said predetermined relationship does not so obtain, associatively accessing a condition vector table using said generated condition vector as a search argument to obtain a result field, accessing said action vector table in response to certain of said result fields and accessing said action vector table in response to result fields from said progress vector table in response to other of said condition vector table result fields.

13. The method as set forth in claim 12 further including, for resumption after interruption, moving said window systematically within said index, generating a condition vector for each current position of said window, detecting that one of said generated condition vectors closest to the apex level of said index that would cause an action vector to be accessed in said action vector table specifying performance of at least one of said basic operations, and resuming processing from that current position of said window.

14. In a data processing system storing a plurality of discrete entities, each identified by a single parameter within a monotonic parameter spectrum, each resident at an addressable location and each locatable by searching a system maintained hierarchical index mapping parameters to location addresses, a method of compressing said index by said system, by the execution of a variable length ordered sequence of processing cycles, each said cycle comprising a variable length sequence of basic operation iterations, each said iteration comprising the selective performance of basic operations of a first subset and a non-overlapping second subset of said basic operations of an ordered fixed sequence of said basic operations, wherein each said full cycle progresses through all said index levels, in a first direction, performing said first subset of basic operation iterations and subsequently, in a second direction, performing a said second subset of said basic operation iterations, basic operations in said first subset duplicating the presence of an original parameter, basic operations in the said second subset deleting the original presence of the said duplicated parameter.

15. The method as set forth in claim 14 wherein said index comprises a variable plurality of data blocks, each formatted to provide for a forward pointer, a backward pointer and a plurality of slots, each said slot being capable of storing a parameter, in the form of a key, together with a vertical pointer, in the form of an address to an index block, said blocks being organized into sequential levels, extending from an apex level to a base level, by said pointers, said blocks in any one of said levels, where plural blocks exist at that level, being chained in contained parameter order by double links formed by said forward and backward pointers, such parameters as may be contained by said slots being in the same order within each said block, each said vertical pointer in a slot other than a slot at said base level, pointing at that one of said blocks at the next adjacent level towards said base level which contains the same parameter as is contained in said pointer slot, each vertical pointer in a slot at said base level pointing at a storage location.

16. The method as set forth in claim 15 wherein an index profile is maintained by said system, said index profile including a free-chain pointer, said free-chain pointer being the address of the leading block of a single link chain of unused blocks available for inclusion in and or having been excluded from said index, said basic operations comprising, in order, (1) SFT: shift, by copying only, as many as possible of said slot contents, both keys and addresses, from one of said blocks to the next previous block;

(2) UNC: rewrite the forward pointer of the said next previous block to point, not the the said one block but to the next sequential one of said blocks thereto;

(3) UPP: rewrite said free-chain pointer in the index profile to point to said one block and save the old value of said free-chain pointer;

(4) UPF: rewrite the backward pointer in said one block to point to the old leading free-chain block so that said one block now becomes the new leading free-chain block;

(5) UPB: write new entries into the next sequential index level to show changes just made;

(6) DEL: remove from said next sequential level the entry which pointed at a block just transferred to said free-chain;

(7) UNB: rewrite the backward pointer in said next sequential block to point to said next previous block;

(8) REM: remove said slot contents from said one block that were shifted into said next previous block by copying in operation SFT.

17. The method as set forth in claim 16 wherein the permitted iterations are defined by eight element action vectors contained in an action vector table, each said action vector having a vector element corresponding to each said basic operation, said vector elements being arranged in sequence order and determining the performance, when of one significance or the non-performance, when of the opposite significance, of the corresponding one of said basic operations in relation to the contents of a window in said index in its current position, said window being movable within said index, said window spanning three adjacent index blocks in two adjacent ones of said index levels, or all remaining blocks at said level if fewer than three blocks remain at said levels, said vertical pointers in one of said window levels pointing to said blocks in said other or current window level including selecting, from said action vector table, one of said action vectors in response to the contents of said window in its current position in said index.

18. The method as set forth in claim 17 further including generating a six element progress vector, element by element, in such a way that each element is of one significance when a predetermined relationship obtains in said window in the current position thereof and of the opposite significance when said predetermined relationship does not obtain, associatively accessing a progress vector table using said generated progress vector as a search argument to obtain a result field, accessing said action vector table in response to certain of said result fields and moving said window in response to other of said result fields.

19. A method as set forth in claim 18 wherein said relationships are:

(i) the number of blocks in said window at the current level is 3;

(ii) the number of blocks in said window at the current level is 2 or 3;

(iii) the second in sequence of said blocks at said current level, the source block, is empty;

(iv) the first in sequence of said blocks at said current level, the index block, is full;

(v) supply exceeds demand in that there are more full slots in said source block than there are free slots in said index block;

(vi) said current level is said apex level.

20. The method as set forth in claim 19 further including generating a seven element condition vector, element by element, in such a way that each element is of one significance when a predetermined relationship obtains in said window in the current position thereof and of the opposite significance when said predetermined relationship does not obtain, associatively accessing a condition vector table using said generated condition vector as a search argument to obtain a result field, accessing said action vector table in response to certain of said result fields and accessing said action vector table in response to result fields from said progress vector table in response to other of said condition vector table result fields.

21. The method as set forth in claim 20 wherein said predetermined relationships are:

(i) the number of blocks in said window at said current level is 3;

(ii) the number of blocks in said window at said current level is 2 or 3;

(iii) the key associated with that said vertical pointer in a parent block which points to the first or index block at the current level is not less than the last or highest key in the said index block;

(iv) said highest key in said index block is less than the first or lowest key in the second or source block, at the current level;

(v) the forward pointer in said index block equals the vertical pointer of the parent of said source block directed at said source block;

(vi) the pointer to the leading free-chain block in said index profile does not equal the address pointer of the parent of said source block directed at said source block;

(vii) the backward pointer of said source block equals the address pointer of the parent of said index block directed at said index block.

22. The method as set forth in claim 21 further including moving said window progressively from said base level to said apex level and back to said base level during each said processing cycle, said first block at said one level where such exists, pointing at said first block at said current level, and moving said window periodically at said base level by one block in the direction corresponding to said parameter sequence.

23. The method as set forth in claim 22 wherein said index blocks are normally resident in peripheral storage, the effects of said basic operations invoked in relation to any one said index block being accumulated in a buffer of said system, whereby rewriting of each said block is delayed until processing of said block in the current one of said processing cycles is complete.

24. The method as set forth in claim 23 wherein said basic operation SFT is further limited to maintain a predetermined number of said slots in said blocks unoccupied by upkeep processing operations.

25. The method as set forth in claim 24 wherein the effects of a generated one of said progress vectors at a level other than the base level are inhibited until the next previous said basic operation UPB and/or DEL is effective in relation to the last occupied one of said slots in said index block at that level.

26. The method as set forth in claim 25 wherein said basic operation SFT is inhibited in relation to any said source block when it is chained to a full said next sequential index block and is, itself, full.

27. The method as set forth in claim 26 wherein upkeep processing is invoked in response to the detected failure by said system to insert a key into any said block due to said target block being full.

28. In a data processing system storing a plurality of discrete entities, each identified by a single parameter within a monotonic parameter spectrum, resident at an addressable location and locatable by searching a system maintained hierarchical index mapping parameters onto location addresses, said index comprising a variable plurality of data blocks, each formatted to provide for a forward pointer, a backward pointer and a plurality of slots, each said slot being capable of storing a parameter, in the form of a key, together with a vertical pointer, in the form of an address to an index block, said blocks being organized into sequential levels, extending from an apex level to a base level, by said pointers, said blocks in any one of said levels, where plural blocks exist at that level, being chained in contained parameter order by double links formed by said forward and backward pointers, such parameters as may be contained by said slots being in the same order within each said block, each said vertical pointer in a slot, other than a slot at said base level, pointing at that one of said blocks at the next adjacent level towards said base level which contains the same parameter as is contained in said pointer slot, each vertical pointer in a slot at said base level being the corresponding location address, a method of compressing said index by the system, which method is interruptable to permit valid searching of the said index, by the execution of a variable length ordered sequence of processing cycles, each said cycle comprising a variable length sequence of split iterations, each said interation comprising the selective performance or non-performance of each of the basic operations of an ordered fixed sequence of said basic operations, wherein each said full cycle progresses through the index levels, in the direction opposite to that in which the said index is searched, performing a first subset of basic operations of each of the said component iterations and completes, in the index searching direction, performing the second subset of said basic operations of each of the said component iterations, parameter relocation being performed by basic operations in the said first subset duplicating the original presence of a parameter, basic operations in said second subset deleting the original presence of the said duplicated parameter, moving said window progressively from said base level to said apex level and back to said base level during each said processing cycle, said first block at said one level, where such exists, pointing at said first block at said current level and moving said window periodically at said base level by one block in the direction corresponding to said parameter sequence.

29. The method as set forth in claim 28 wherein the permitted iterations are defined by the action vectors contained in an action vector table, each said action vector having a vector element corresponding to each said basic operation, said vector elements being arranged in sequence order and determining the performance, when of one significance, or the non-performance, when of the opposite significance, of the corresponding one of said basic operations in relation to the contents of a window in said index in its current position, including selecting, from said action vector table, one of said action vectors in response to the contents of said window in its current position in said index.

30. The method as set forth in claim 29 further including generating a progress vector, element by element in such a way that each element is of one significance when a predetermined relationship obtains in said window in the current position thereof and of the opposite significance when said predetermined relationship does not so obtain, associatively accessing a progress vector table using said generated program vector as a search argument to obtain a result field, accessing said action vector table in response to certain of said result fields and moving said window at said base level in response to other of said result fields.

31. The method as set forth in claim 30 further including generating a condition vector, element by element, in such a way that each element is of one significance when a predetermined relationship obtains in said window in the current position thereof and of the opposite significance when said predetermined relationship does not so obtain, associatively accessing a condition vector table using said generated condition vector as a search argument to obtain a result field, accessing said action vector table in response to certain of said result fields and accessing said action vector table in response to result fields from said progress vector table in response to other of said condition vector table result fields.

32. The method as set forth in claim 29 wherein an index profile is maintained by said system, said index profile including a free-chain pointer, said free-chain pointer being the address of the leading block of a single link chain of unused blocks available for inclusion in and/or having been excluded from said index, said basic operations determined by said action vector elements comprising, in order, (1) SFT: shift, by copying only, as many as possible of said slot contents, both keys and addresses, from one of said blocks to the next previous block;

(2) UNC: rewrite the forward pointer of the said next previous block to point, not to the said one block but to the next sequential one of said blocks thereto;

(3) UPP: rewrite said free-chain pointer in the index profile to point to said one block and save the old value of said free-chain pointer;

(4) UPF: rewrite the backward pointer in said one block to point to the old leading free-chain block so that said one block now becomes the new leading free-chain block;

(5) UPB: write new entries into the next higher index level to show changes just made to the lower level;

(6) DEL: remove, from said next higher level, the entry which pointed at a block just transferred to said free-chain;

(7) UNB: rewrite the backward pointer in said next sequential block to point to said next previous block;

(8) REM: remove said slot contents from said one block that were shifted into said next previous block by copying in operation SFT.

33. The method as set forth in claim 32 wherein an index profile is maintained by said system, said index profile including a free-chain pointer, said free-chain pointer being the address of the leading block of a single link chain of unused blocks available for inclusion in and/or having been excluded from said index, said basic operations determined by said action vector elements comprising, in order, (1) SFT: shift, by copying only, as many as possible of said slot contents, both keys and addresses, from one of said blocks to the next previous block;

(2) UNC: rewrite the forward pointer of the said next previous block to point, not to the said one block but to the next sequential one of said blocks thereto;

(3) UPP: rewrite said free-chain pointer in the directory profile to point to said one block and save the old value of said free-chain pointer;

(4) UPF: rewrite the backward pointer in said one block to point to the old leading free-chain block so that said one block now becomes the new leading free-chain block;

(5) UPB: write new entries into the next higher index level to show changes just made to the lower level;

(6) DEL: remove, from said next higher level, the entry which pointed at a block just transferred to said free-chain;

(7) UNB: rewrite the backward pointer in said next sequential block to point to said next previous block;

(8) REM: remove said slot contents from said one block that were shifted into said next previous block by copying in operation SFT.

34. The method as set forth in claim 33 wherein the effects of a generated one of said progress vectors at a level other than the base level are inhibited until the next previous said basic operation UPB and/or DEL is effective in relation to the last occupied one of said slots in said index block at that level.

35. The method as set forth in claim 34 wherein said basic operation SFT is inhibited in relation to any said source block when it is chained to a full said next sequential index block and is, itself, full.

36. The method as set forth in claim 35 wherein said basic operation SFT is further limited to maintain a predetermined number of said slots in said blocks unoccupied by upkeep processing operations.

37. The method as set forth in claim 36 wherein said basic operation SFT is further limited to maintain a predetermined number of said slots in said block at other than said base level, and a greater predetermined number of said slots at said base level, unoccupied by upkeep processing operations.

* * * * *